US 7,882,537 B2

(12) United States Patent
Okajo et al.

(10) Patent No.: US 7,882,537 B2
(45) Date of Patent: Feb. 1, 2011

(54) METHOD AND APPARATUS FOR SECURITY POLICY MANAGEMENT

(75) Inventors: Sumitaka Okajo, Tokyo (JP); Katsushi Matsuda, Tokyo (JP)

(73) Assignee: NEC Corporation, Tokyo (JP)

(*) Notice: Subject to any disclaimer, the term of this patent is extended or adjusted under 35 U.S.C. 154(b) by 1414 days.

(21) Appl. No.: 11/155,767

(22) Filed: Jun. 20, 2005

(65) Prior Publication Data

US 2005/0283823 A1    Dec. 22, 2005

(30) Foreign Application Priority Data

Jun. 21, 2004    (JP) ............................. 2004-182214
Sep. 29, 2004    (JP) ............................. 2004-283160

(51) Int. Cl.
*G06F 17/00* (2006.01)
*H04L 29/06* (2006.01)

(52) U.S. Cl. .......................................................... 726/1
(58) Field of Classification Search ...................... 726/1
See application file for complete search history.

(56) References Cited

U.S. PATENT DOCUMENTS

| 6,535,227 | B1* | 3/2003 | Fox et al. ..................... 715/736 |
| 6,738,908 | B1* | 5/2004 | Bonn et al. ..................... 726/4 |
| 6,779,120 | B1* | 8/2004 | Valente et al. ................. 726/1 |
| 6,876,613 | B2 | 4/2005 | Byun et al. |
| 6,941,471 | B2* | 9/2005 | Lin ................................ 726/1 |
| 7,062,649 | B2* | 6/2006 | Daniell et al. ............... 713/165 |
| 7,246,370 | B2* | 7/2007 | Valente et al. ................. 726/1 |
| 7,340,770 | B2* | 3/2008 | Freund ......................... 726/11 |
| 7,430,760 | B2* | 9/2008 | Townsend et al. ............ 726/13 |
| 7,478,422 | B2* | 1/2009 | Valente et al. ................. 726/4 |
| 2001/0018746 | A1* | 8/2001 | Lin ............................ 713/201 |
| 2003/0083877 | A1 | 5/2003 | Sugimoto |
| 2003/0084351 | A1 | 5/2003 | Sugimoto |
| 2003/0110192 | A1* | 6/2003 | Valente et al. .............. 707/513 |
| 2004/0111643 | A1 | 6/2004 | Farmer |
| 2004/0193606 | A1* | 9/2004 | Arai et al. ....................... 707/9 |
| 2005/0125687 | A1* | 6/2005 | Townsend et al. ........... 713/200 |
| 2007/0169168 | A1* | 7/2007 | Lim .............................. 726/1 |

FOREIGN PATENT DOCUMENTS

| EP | 1118925 A1 * | 7/2001 |
| JP | 2000-227855 | 8/2000 |
| JP | 2001-016204 A | 1/2001 |

(Continued)

OTHER PUBLICATIONS

T. Sugimoto, "Security compendium for building secure enterprise networks," SunWorld vol. 9:8, Aug. 1999, Japan IDG Communications Co., Ltd. pp. 66-75.

*Primary Examiner*—Christian LaForgia
(74) *Attorney, Agent, or Firm*—Foley & Lardner LLP

(57) ABSTRACT

A security policy management system for deriving a security policy from setting details of security devices as components of an information system includes a setting information storage unit for storing setting information representing settings with regard to security functions of devices included in a network system to be managed, and a general-purpose security policy generator for generating a security policy including a description expressed in a format independent of descriptions depending on particular devices, based on the setting information stored in the setting information storage unit.

49 Claims, 65 Drawing Sheets

FOREIGN PATENT DOCUMENTS

| | | |
|---|---|---|
| JP | 2002-237033 A | 8/2002 |
| JP | 2002-247033 A | 8/2002 |
| JP | 2002-261839 | 9/2002 |
| JP | 2002-352062 | 12/2002 |
| JP | 2003-099602 A | 4/2003 |
| JP | 2003-140890 | 5/2003 |
| JP | 2003-203140 | 7/2003 |
| JP | 2004-062416 | 2/2004 |
| JP | 2004-086880 A | 3/2004 |
| JP | 2006-516339 A | 6/2006 |
| WO | WO 2004/051437 A2 | 6/2004 |

* cited by examiner iptables -P FORWARD DROP iptables -A FORWARD -p tcp -s 0.0.0.0/0 -d 192.168.1.248/29 -j DROP
iptables -A FORWARD -p tcp -s 0.0.0.0/0 -d 192.168.1.224/27 -j ACCEPT

| Notations | Meaning | Object/attribute in general-purpose secuity policy |
|---|---|---|
| -t, --table *table* | Packet filtering rule when table=filter (Default for case where -t is omitted) | Function is packet_filtering |
| | Address translation rule when table=nat | Function is address_translation |
| -P, --policy | Default rule | Policy at end of packet filtering policies |
| -A, --append | One packet filtering rule | Policy one of packet filtering policies |
| -p, --protocol *protocol* | Protocol tcp when protocol=tcp | Attribute Protocol of object Packet is tcp |
| | Protocol udp when protocol=udp | Attribute Protocol of object Packet is udp |
| | ---- | ---- |
| -s, --source, --src | Source IP address | Attribute SrcIP of packet filtering policy |
| -d, --destination, --dst | Destination IP address | Attribute DestIP of packet filtering policy |
| -j, --jump ACCEPT | Permitting packet to pass | Action of packet filtering policy is accept |
| -j, --jump DROP | Inhibiting packet from passing | Action of packet filtering policy is deny |
| | ---- | ---- |

FIG. 13

```xml
<PolicyGroup policyGroupID="firewallPolicy001" policyCombiningAlg="first-applicable"
            target="firewall">
  <Policy policyID="packet_filtering001" policyRuleCombiningAlg="ordered-deny-overrides">
    <PolicyRule policyRuleID="packet_filtering001-1" effect="permit">
      <Target>
        <Function>packet_filtering</Function>
        <InputObject>
          <Packet>
            <SrcIP>0.0.0.0/0</SrcIP>
            <Protocol>tcp</Protocol>
            <DestIP>192.168.1.224/27</DestIP>
          </Packet>
        </InputObject>
        <Action>deny</Action>
      </Target>
    </PolicyRule>
  </Policy>
  <Policy policyID="packet_filtering002" policyRuleCombiningAlg="ordered-deny-overrides">
    <PolicyRule policyRuleID="packet_filtering002-1" effect="permit">
      <Target>
        <Function>packet_filtering</Function>
        <InputObject>
          <Packet>
            <SrcIP>0.0.0.0/0</SrcIP>
            <Protocol>tcp</Protocol>
            <DestIP>192.168.1.248/29</DestIP>
          </Packet>
        </InputObject>
        <Action>accept</Action>
      </Target>
    </PolicyRule>
  </Policy>
  <Policy policyID="packet_filtering003" policyRuleCombiningAlg="ordered-deny-overrides">
    <PolicyRule policyRuleID="packet_filtering003-1" effect="permit">
      <Target>
        <Function>packet_filtering</Function>
        <InputObject>
          <Packet>
            <SrcIP>0.0.0.0/0</SrcIP>
            <Protocol>all</Protocol>
            <DestIP>0.0.0.0/0</DestIP>
          </Packet>
        </InputObject>
        <Action>deny</Action>
      </Target>
    </PolicyRule>
  </Policy>
</PolicyGroup>
```

FIG. 14

| Function | InputObject | OutputObject | Action |
|---|---|---|---|
| packet_filtering | Type : Packet<br>Attributes :<br>SrcIP<br>DestIP<br>Protocol<br>SrcPort (If Protocol == tcp or udp)<br>DestPort (If Protocol == tcp or udp)<br>Type/Code (If Protocol == icmp) | Type : Packet<br>Attributes :<br>SrcIP<br>DestIP<br>Protocol<br>SrcPort (If Protocol == tcp or udp)<br>DestPort (If Protocol == tcp or udp)<br>Type/Code (If Protocol == icmp) | *Either one of* accept, drop, reject |
| snat | Type : OriginalPacket<br>Attributes :<br>OriginalSrcIP<br>OriginalSrcPort<br>OriginalProtocol | Type : TranslatedPacket<br>Attributes :<br>TranslagedSrcIP<br>TranslatedSrcPort<br>TranslatedProtocol | translate |
| ------ | ------ | ------ | ------ |

FIG. 17

| Attribute name | Meaning | Value |
|---|---|---|
| SrcIP | Source IP address | NetworkAddress or IPAddress |
| DestIP | Destination IP address | NetworkAddress or IPAddress |
| Protocol | Protocol | Either one of tcp, udp, icmp, any |
| SrcPort | Source port number | PortNumber or any |
| DestPort | Destination port number | PortNumber or any |
| Type/Code | icmp type/code | Type is either one of 0, 3, 4, 5, 8, 9, 10, 11, 12, 13, 14, 17, 18, any; Code is integer of 0~15 |
| NetworkAddress | Network address | IPAddress/NetMask |
| IPAddress | IP address | 0.0.0.0~255.255.255.255 |
| NetMask | Netmask | Integer of 0~31 |
| PortNumber | Port number | Integer of 0~65535 |
| ------ | ------ | ------ |

FIG. 18

| Attribute <-> Attribute | Relationship between attributes |
|---|---|
| IPAddress<->PortNumber | One IP address has port numbers ranging from 0 to 65535. |
| NetworkAddress<->IPAddress | NetworkAddress represents a set of IP addresses ranging from an IP address where as many bits from the most significant bit (MSB) as the number of bits of a netmask are fixed and all the remaining bits are 0, to another IP address where as many bits from the most significant bit as the number of bits of the netmask are fixed and all the remaining bits are 1. |
| ⋮ | ⋮ |

FIG. 19

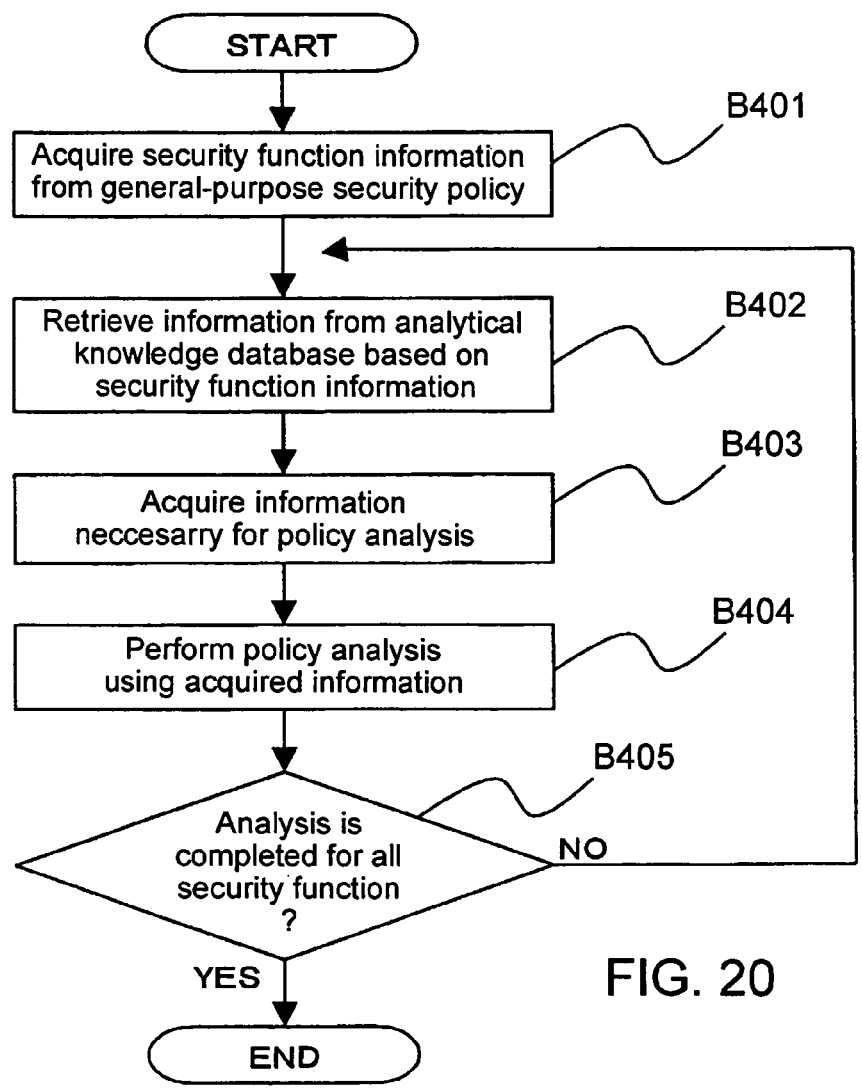

FIG. 20 iptables -P FORWARD DROP iptables -A FORWARD -p tcp -s 172.16.1.0/24 -d 192.168.1.248/29 -j DROP
iptables -A FORWARD -p tcp -s 172.16.1.0/24 -d 192.168.1.224/27 -j ACCEPT iptables -P FORWARD DROP iptables -A FORWARD -p icmp --icmp-type 8 -s 172.16.1.100 -d 192.168.1.250 -j ACCEPT
iptables -A FORWARD -p icmp --icmp-type 0 -s 192.168.1.250 -d 172.16.1.100 -j ACCEPT

```xml
<PolicyGroup policyGroupID="firewallPolicy010" policyCombiningAlg="first-applicable"
            target="firewall">
  <Policy policyID="packet_filtering010" policyRuleCombiningAlg="ordered-deny-overrides">
    <PolicyRule policyRuleID="packet_filtering010-1" effect="permit">
      <Target>
        <Function>packet_filtering</Function>
        <InputObject>
          <Packet>
            <SrcIP>172.16.1.0/24</SrcIP>
            <Protocol>tcp</Protocol>
            <DestIP>192.168.1.10</DestIP>
            <DestPort>1:1023</DestPort>
          </Packet>
        </InputObject>
        <Action>accept</Action>
      </Target>
    </PolicyRule>
  </Policy>
  <Policy policyID="packet_filtering011" policyRuleCombiningAlg="ordered-deny-overrides">
    <PolicyRule policyRuleID="packet_filtering011-1" effect="permit">
      <Target>
        <Function>packet_filtering</Function>
        <InputObject>
          <Packet>
            <SrcIP>172.16.1.0/24</SrcIP>
            <Protocol>tcp</Protocol>
            <DestIP>192.168.1.10</DestIP>
            <DestPort>1024</DestPort>
          </Packet>
        </InputObject>
        <Action>accept</Action>
      </Target>
    </PolicyRule>
  </Policy>
  <Policy policyID="packet_filtering013" policyRuleCombiningAlg="ordered-deny-overrides">
    <PolicyRule policyRuleID="packet_filtering013-1" effect="permit">
      <Target>
        <Function>packet_filtering</Function>
        <InputObject>
          <Packet>
            <SrcIP>172.16.1.0/24</SrcIP>
            <Protocol>tcp</Protocol>
            <DestIP>192.168.1.10</DestIP>
          </Packet>
        </InputObject>
        <Action>deny</Action>
      </Target>
    </PolicyRule>
  </Policy>
</PolicyGroup>
```

FIG. 31

```xml
<PolicyGroup policyGroupID="firewallPolicy020" policyCombiningAlg="first-applicable"
            target="firewall">
  <Policy policyID="packet_filtering021" policyRuleCombiningAlg="ordered-deny-overrides">
    <PolicyRule policyRuleID="packet_filtering021-1" effect="permit">
      <Target>
        <Function>packet_filtering</Function>
        <InputObject>
          <Packet>
            <SrcIP>172.16.1.0/24</SrcIP>
            <Protocol>tcp</Protocol>
            <DestIP>192.168.1.10</DestIP>
            <DestPort>1:1024</DestPort>
          </Packet>
        </InputObject>
        <Action>accept</Action>
      </Target>
    </PolicyRule>
  </Policy>
  <Policy policyID="packet_filtering022" policyRuleCombiningAlg="ordered-deny-overrides">
    <PolicyRule policyRuleID="packet_filtering022-1" effect="permit">
      <Target>
        <Function>packet_filtering</Function>
        <InputObject>
          <Packet>
            <SrcIP>172.161.1.0/24</SrcIP>
            <Protocol>tcp</Protocol>
            <DestIP>192.168.1.10</DestIP>
          </Packet>
        </InputObject>
        <Action>deny</Action>
      </Target>
    </PolicyRule>
  </Policy>
</PolicyGroup>
```

FIG. 32

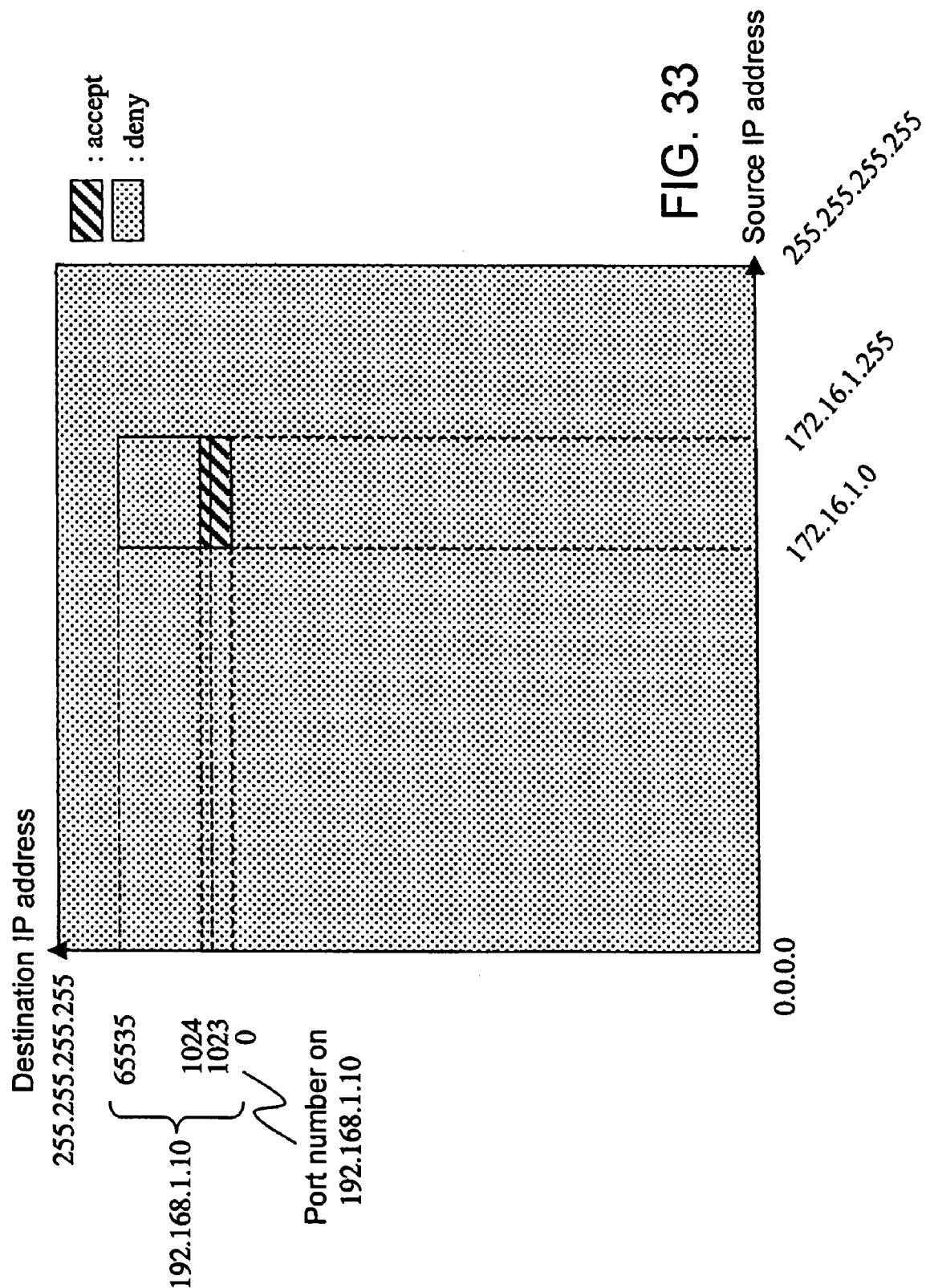

```
<PolicyGroup policyGroupID="firewallPolicy100" policyCombiningAlg="first-applicable"
            target="firewall">
    <Policy policyID="packet_filtering100" policyRuleCombiningAlg="ordered-deny-overrides">
        <PolicyRule policyRuleID="packet_filtering100-1" effect="permit">
            <Target>
                <Function>packet_filtering</Function>
                <InputObject>
                    <Packet>
                        <SrcIP>172.16.10.192/26</SrcIP>
                        <Protocol>tcp</Protocol>
                        <DestIP>10.56.100.0/24</DestIP>
                    </Packet>
                </InputObject>
                <Action>deny</Action>
            </Target>
        </PolicyRule>
    </Policy>
    <Policy policyID="packet_filtering101" policyRuleCombiningAlg="ordered-deny-overrides">
        <PolicyRule policyRuleID="packet_filtering101-1" effect="permit">
            <Target>
                <Function>packet_filtering</Function>
                <InputObject>
                    <Packet>
                        <SrcIP>172.16.10.0/24</SrcIP>
                        <Protocol>tcp</Protocol>
                        <DestIP>10.56.100.0/24</DestIP>
                    </Packet>
                </InputObject>
                <Action>accept</Action>
            </Target>
        </PolicyRule>
    </Policy>
</PolicyGroup>
```

FIG. 37

```xml
<PolicyGroup policyGroupID="firewallPolicy200" policyCombiningAlg="first-applicable"
            target="firewall">
    <Policy policyID="packet_filtering200" policyRuleCombiningAlg="ordered-deny-overrides">
        <PolicyRule policyRuleID="packet_filtering200-1" effect="permit">
            <Target>
                <Function>packet_filtering</Function>
                <InputObject>
                    <Packet>
                        <SrcIP>172.16.10.224/27</SrcIP>
                        <Protocol>tcp</Protocol>
                        <DestIP>10.56.100.0/24</DestIP>
                    </Packet>
                </InputObject>
                <Action>accept</Action>
            </Target>
        </PolicyRule>
    </Policy>
</PolicyGroup>
```

FIG. 38

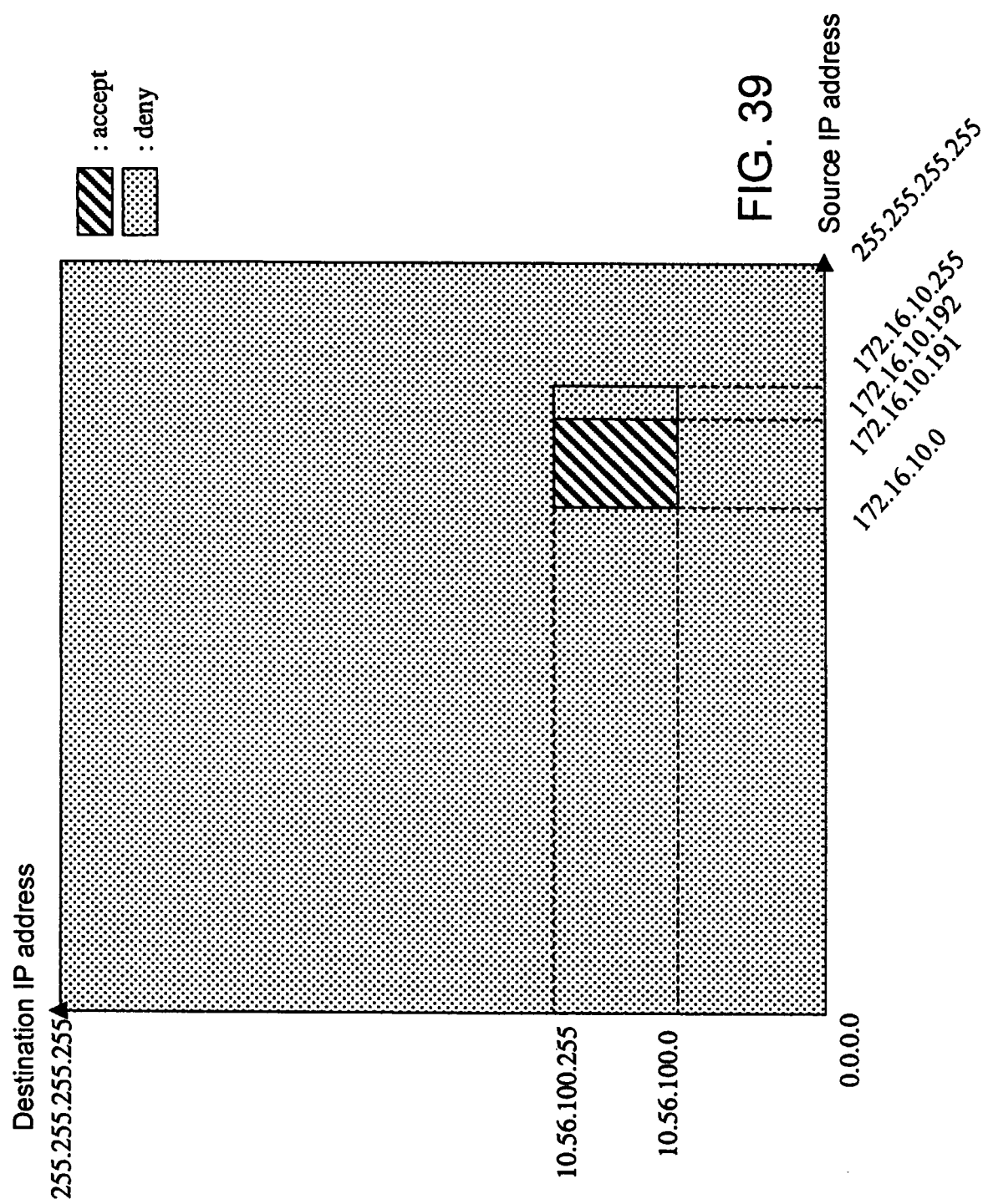

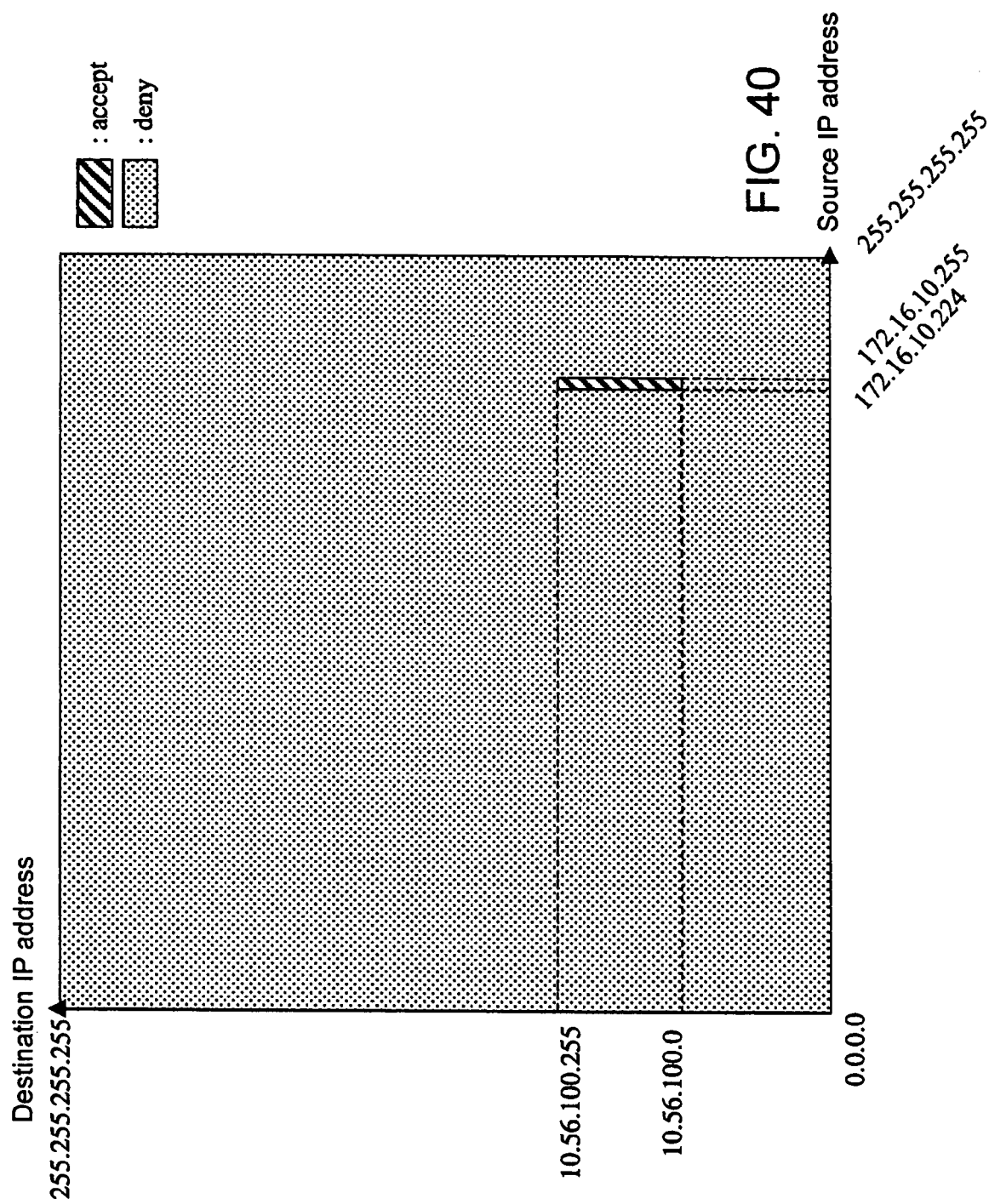

FIG. 42

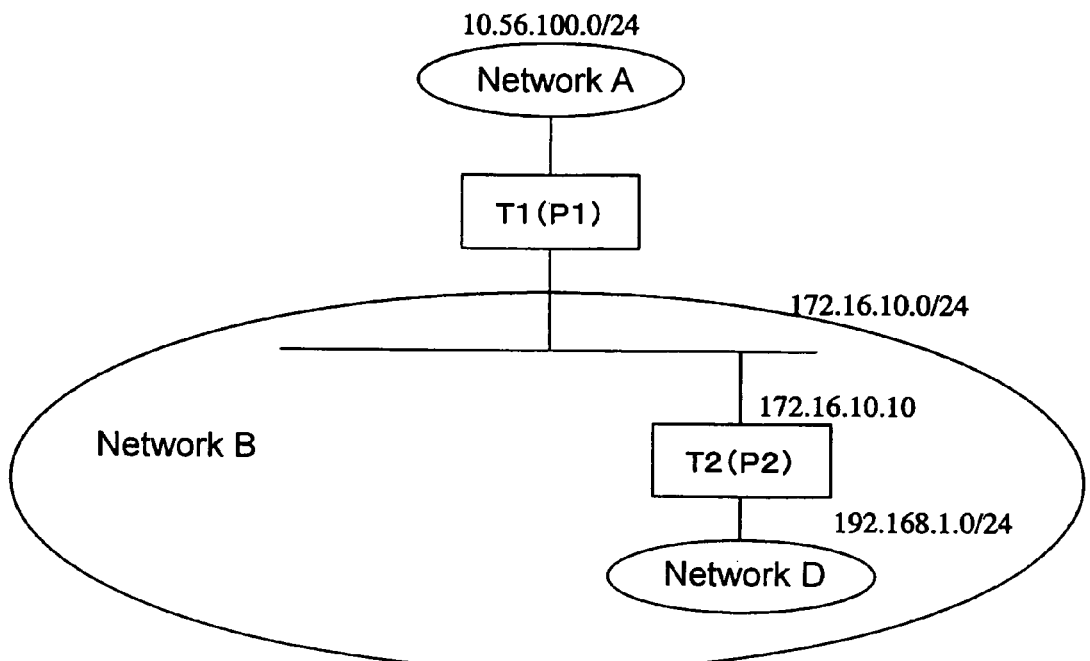

FIG. 44

```
<PolicyGroup policyGroupID="firewallPolicy300" policyCombiningAlg="first-applicable"
        target="firewall">
    <Policy policyID="packet_filtering300" policyRuleCombiningAlg="ordered-deny-overrides">
        <PolicyRule policyRuleID="packet_filtering300-1" effect="permit">
            <Target>
                <Function>packet_filtering</Function>
                <InputObject>
                    <Packet>
                        <SrcIP>172.16.10.0/24</SrcIP>
                        <Protocol>tcp</Protocol>
                        <DestIP>10.56.100.0/24</DestIP>
                    </Packet>
                </InputObject>
                <Action>accept</Action>
            </Target>
        </PolicyRule>
    </Policy>
</PolicyGroup>
```

FIG. 45

```xml
<PolicyGroup policyGroupID="firewallPolicy400" policyCombiningAlg="first-applicable"
            target="firewall">
   <Policy policyID="packet_filtering400" policyRuleCombiningAlg="ordered-deny-overrides">
      <PolicyRule policyRuleID="packet_filtering400-1" effect="permit">
         <Target>
            <Function>packet_filtering</Function>
            <InputObject>
               <Packet>
                  <SrcIP>192.168.1.0/24</SrcIP>
                  <Protocol>tcp</Protocol>
                  <DestIP>10.56.100.0/24</DestIP>
               </Packet>
            </InputObject>
            <Action>accept</Action>
         </Target>
      </PolicyRule>
   </Policy>
   <Policy policyID="address_translation410" policyRuleCombiningAlg="ordered-permit-overrides">
      <PolicyRule policyRuleID="address_translation410-1" effect="permit">
         <Target>
            <Function>address_translation</Function>
            <InputObject>
               <Packet>
                  <SrcIP>192.168.1.0/24</SrcIP>
                  <DestIP>10.56.100.0/24</DestIP>
               </Packet>
            </InputObject>
            <Action>snat</Action>
            <OutputObject>
               <Packet>
                  <SrcIP>172.16.10.10</SrcIP>
                  <DestIP>10.56.100.0/24</DestIP>
               </Packet>
            </OutputObject>
         </Target>
      </PolicyRule>
   </Policy>
</PolicyGroup>
```

FIG. 46

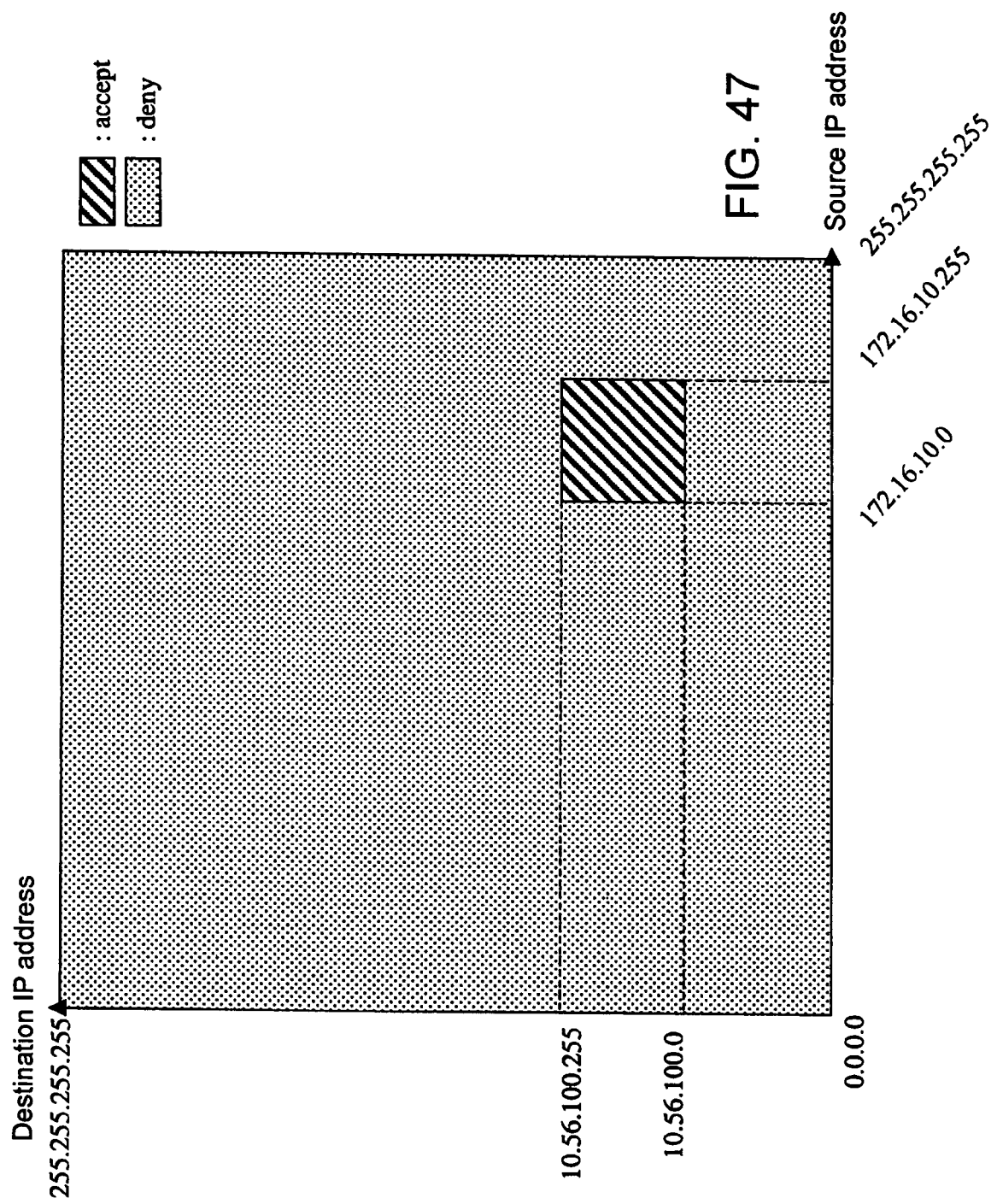

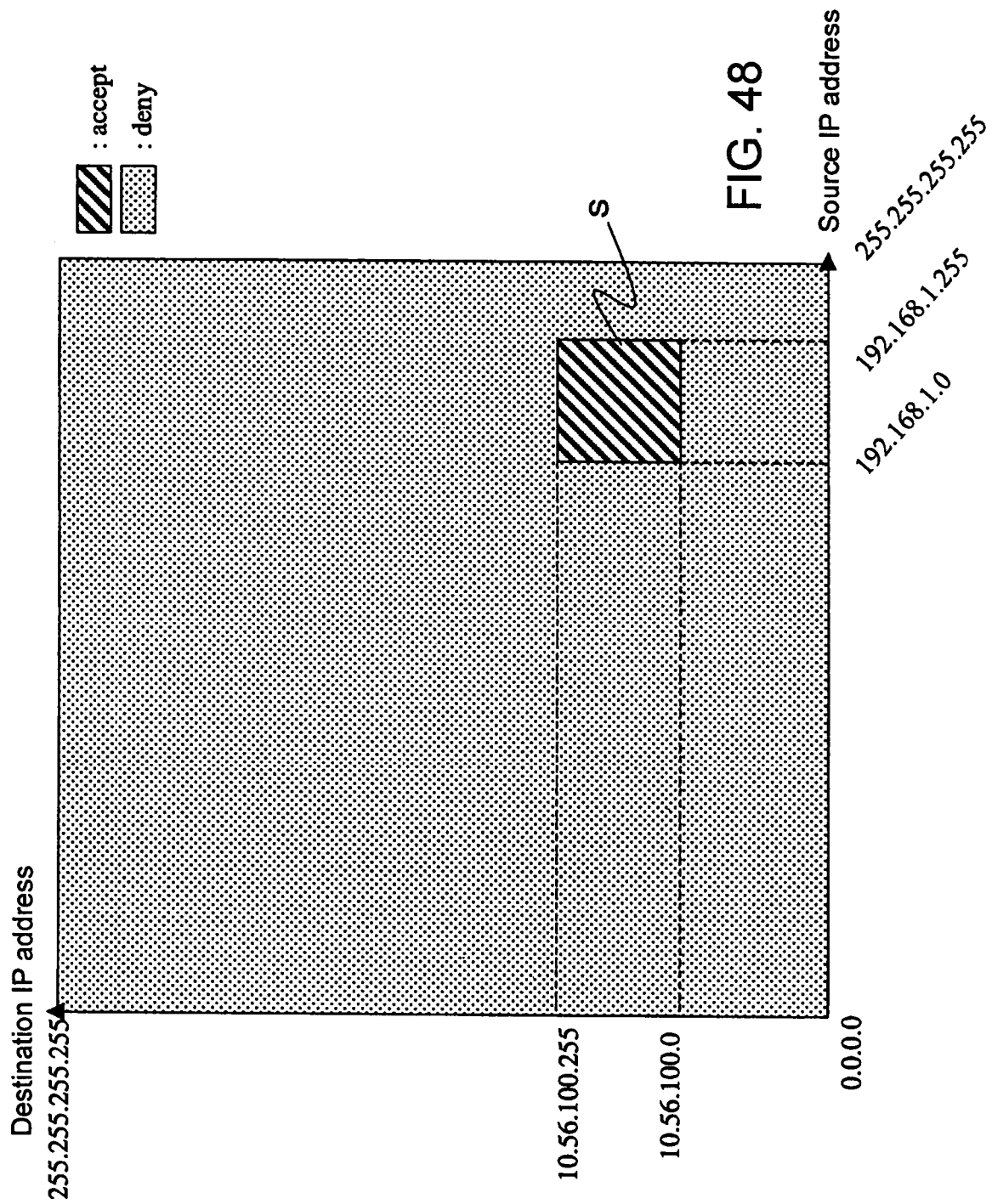

```xml
<PolicyGroup policyGroupid="127.0.0.1:network_sensor_1"
policyCombiningType=independent
target="nids">
 <PolicyGroupDescription>Policy with regard to NIDS </PolicyGroupDescription>
 <Policy policyID="packetMonitoring0188">
  <PolicyDescription>Decode FTP get file command</PolicyDescription>
  <Target>
   <MonitoredObject>
    <SecurityEvent>
     <EventName>FTP_Get</EventName>
    </SecurityEvent>
   </MonitoredObject>
   <Function>
    <PacketMonitoring>
     <Enabled>false</Enabled>
     <Priority>Low</Priority>
    </PacketMonitoring>
   </Function>
   <Responses>
    <Response>
     <EMAIL>
      <Gateway>10.10.10.5</Gateway>
      <Account>admin@abcde.com</Account>
     </EMAIL>
    </Response>
    <Response>
     <SNMP>
      <Manager>10.10.10.10</Manager>
      <Community>public</Community>
     </SNMP>
    </Response>
   </Responses>
  </Target>
 </Policy>
 <Policy>
  ...
 </Policy>
 ...
</PolicyGroup>
```

FIG. 54

| EventName | CategoryName | VulnerabilityProtocol | | |
| --- | --- | --- | --- | --- |
| | | Protocol | SrcPort | DestPort |
| FTP_Get | FTP | tcp | any | 21 |
| FTP_Put | FTP | tcp | any | 21 |
| ----- | ----- | ----- | ----- | ----- |
| HTTP_Head | HTTP | tcp | any | 80 |
| ----- | ----- | ----- | ----- | ----- |

FIG. 55

```xml
<PolicyGroup policyGroupid="127.0.0.1:network_sensor_1"
 policyCombiningType=independent
 target="nids">
  <PolicyGroupDescription>Policy with regard to NIDS</PolicyGroupDescription>
  <Policy policyID="packetMonitoring0188">
    <PolicyDescription>Decode FTP get file command</PolicyDescription>
    <Target>
      <MonitoredObject>
        <SecurityEvent>
          <EventName>FTP_Get</EventName>
          <CategoryName>FTP</CategoryName>
          <VulnerabilityProtocol>
            <Protocol>tcp</Protocol>
            <SrcPort>any</SrcPort>
            <DestPort>21</DestPort>
          </VulnerabilityProtocol>
        </SecurityEvent>
      </MonitoredObject>
      <Function>
        <PacketMonitoring>
          <Enabled>false</Enabled>
          <Priority>Low</Priority>
        </PacketMonitoring>
      </Function>
      <Responses>
        <Response>
          <EMAIL>
            <Gateway>10.10.10.5</Gateway>
            <Account>admin@abcde.com</Account>
          </EMAIL>
        </Response>
        <Response>
          <SNMP>
            <Manager>10.10.10.10</Manager>
            <Community>public</Community>
          </SNMP>
        </Response>
      </Responses>
    </Target>
  </Policy>
  <Policy>
   ...
  </Policy>
  ...
</PolicyGroup>
```

FIG. 57

```
<PolicyGroup policyGroupID="firewallPolicy500" policyCombiningAlg="first-applicable"
        target="firewall">
    <Policy policyID="packet_filtering500" policyRuleCombiningAlg="ordered-deny-overrides">
        <PolicyRule policyRuleID="packet_filtering500-1" effect="permit">
            <Target>
                <Function>packet_filtering</Function>
                <InputObject>
                    <Packet>
                        <SrcIP>0.0.0.0/0</SrcIP>
                        <SrcPort>any</SrcPort>
                        <Protocol>tcp</Protocol>
                        <DestIP>200.100.100.10</DestIP>
                        <DestPort>21</DestPort>
                    </Packet>
                </InputObject>
                <Action>accept</Action>
            </Target>
        </PolicyRule>
    </Policy>
</PolicyGroup>
```

FIG. 59

| categoryName | Protocol | SrcPort | DestPort | NIDS policy attribute policyID list | Packet filtering policy attribute policyID list |
|---|---|---|---|---|---|
| FTP | tcp | any | 21 | packetMonitoring060<br>packetMonitoring061<br>packetMonitoring065 | packet_filtering011<br>packet_filtering022 |
| ----- | ----- | ----- | ----- | ----- | ----- |

UNMATCHED CATEGORY (91)

| Type of unmatch | Category | TransportLayer | SrcPortNumber | DestPortNumber |
|---|---|---|---|---|
| Insufficient monitoring or filtering | HTTP | tcp | | 80 |
| Excessive monitoring or filtering | Finger | tcp | | 79 |

UNMATCHED NIDS POLICY ID (92)

packetMonitoring0108
packetMonitoring0109
packetMonitoring0110

UNMATCHED FW POLICY ID (93)

packetFiltering0011
packetFiltering0052

NIDS POLICY (94)

```
<Policy policyID="packetMonitoring0110">
 <PolicyDescription>HTTP_hogehoge Event</PolicyDescription>
 <Target>
  <MonitoredObject>
   <SecurityEvent>
    <EventName>HTTP_hogehoge</EventName>
   </SecurityEvent>
  </MonitoredObject>
  <Function>
   ...  ...
```

FW POLICY (95)

```
<Policy policyID="packet_filtering501" policyRuleCombiningAlg
 <PolicyRule policyRuleID="packet_filtering501-1" effect="per
  <Target>
   <Function>packet_filtering</Function>
   <InputObject>
    <Packet>
     <SrcIP>200.100.100.0/24</SrcIP>
     <SrcPort>any</SrcPort>
     <Protocol>tcp</Protocol>
     <DestIP>200.100.200.100</DestIP>
     <DestPort>25</DestPort>
    </Packet>
   </InputObject>
   <Action>deny</Action>
```

```xml
<PolicyGroup policyGroupID="firewallPolicy500" policyCombiningAlg="first-applicable"
          target="firewall">
   <Policy policyID="packet_filtering500" policyRuleCombiningAlg="ordered-deny-overrides">
      <PolicyRule policyRuleID="packet_filtering500-1" effect="permit">
        <Target>
           <Function>packet_filtering</Function>
           <InputObject>
             <Packet>
                <SrcIP>0.0.0.0/0</SrcIP>
                <SrcPort>any</SrcPort>
                <Protocol>tcp</Protocol>
                <DestIP>200.100.100.10</DestIP>
                <DestPort>21</DestPort>
             </Packet>
           </InputObject>
           <Action>accept</Action>
        </Target>
      </PolicyRule>
   </Policy>
   <Policy policyID="packet_filtering501" policyRuleCombiningAlg="ordered-deny-overrides">
      <PolicyRule policyRuleID="packet_filtering501-1" effect="permit">
        <Target>
           <Function>packet_filtering</Function>
           <InputObject>
             <Packet>
                <SrcIP>200.100.100.0/24</SrcIP>
                <SrcPort>any</SrcPort>
                <Protocol>tcp</Protocol>
                <DestIP>200.100.200.100</DestIP>
                <DestPort>25</DestPort>
             </Packet>
           </InputObject>
           <Action>deny</Action>
        </Target>
      </PolicyRule>
   </Policy>
</PolicyGroup>
```

FIG. 68

```xml
<PolicyGroup policyGroupid="127.0.0.1:network_sensor_1"
policyCombiningType=independent
target="nids">
 <PolicyGroupDescription>Policy with regard to NIDS </PolicyGroupDescription>
 <Policy policyID="packetMonitoring0188">
  <PolicyDescription>Decode FTP get file command</PolicyDescription>
  <Target>
   <MonitoredObject>
    <SecurityEvent>
     <EventName>FTP_Get</EventName>
     <CategoryName>FTP</CategoryName>
     <VulnerabilityProtocol>
      <Protocol>tcp</Protocol>
      <SrcPort>any</SrcPort>
      <DestPort>21</DestPort>
     </VulnerabilityProtocol>
    </SecurityEvent>
   </MonitoredObject>
   <Function>
    <PacketMonitoring>
     <Enabled>true</Enabled>
     <Priority>Low</Priority>
    </PacketMonitoring>
   </Function>
   <Responses>
    <Response>
     <EMAIL>
      <Gateway>200.100.200.100</Gateway>
      <Account>admin@abcde.com</Account>
     </EMAIL>
    </Response>
   </Responses>
  </Target>
 </Policy>
 <Policy>
   ...
 </Policy>
 ...
</PolicyGroup>
```

FIG. 69

METHOD AND APPARATUS FOR SECURITY POLICY MANAGEMENT

BACKGROUND OF THE INVENTION

1. Field of the Invention

The present invention relates to a security policy management system and method for deriving a security policy from setting details of a security device that is a component of an information system.

2. Description of the Related Art

With the development of the information technology, information security is acquiring growing importance. Today's organizations including enterprises and other institutions are required to have a security policy established from security setting details in their network systems, so that the system administrators and security managers can understand the security policy.

One technique for grasping a security policy is disclosed as a status grasping method in Japanese laid-open patent publication No. 2003-203140 (JP, P2003-203140A). The disclosed status grasping method comprises the steps of asking questions of the members of the target organization, grasping a security situation of the information system of the target organization based on the answers to the questions, grasping a security situation of the information system of the target organization based on the results of an investigation performed by an investigation tool, and establishing a security policy by integrating the information obtained from the above two grasping steps. Publication JP, P2003-203140A also discloses an integrating apparatus for use in carrying out the above status grasping method. The integrating apparatus compares the status of the information system according to the answers to the questions and the status of the information system according to the investigation tool. Portions of these two statuses that match each other are referred to as matched portions, and portions of these two statuses that do not match each other are referred to as unmatched portions. The integrating apparatus separates the unmatched portions from the matched portions, takes out the unmatched portions, and displays the unmatched portions. The integrating apparatus then prompts the user as the system administrator to enter the user's selection with respect to the unmatched portions, displays the result selected by the user, and combines the matched portions and the result selected by the user.

Since the method and apparatus disclosed in JP, P2003-203140A uses not only questions for the members of the organization but also the investigation tool, it is not necessary to ask questions about items that can be investigated with the investigation tool. Furthermore, as the unmatched portions are displayed to prompt the user to make a selection, the user can make a suitable selection from the displayed details, allowing a more appropriate security policy to be established.

The conventional method and apparatus depends upon the experiences and knowledge of the security manager, and constructs a security policy based on the answers to the questions that the members of the organization were asked. Consequently, the conventional method and apparatus suffer problems, to be described below, that are caused by the fact that a security policy is constructed by manual intervention.

First, a large expenditure of labor and time is required to construct and grasp a security policy. A security policy needs to be constructed for each individual organization, and the security manager has to create a security policy from scratch based on his or her experiences and knowledge, and to gather the answers to the questions that the members of the organization were asked. Setting information of existing security devices in the information system of the organization is described according to a format inherent in each security device. There is a tacit understanding with respect to each security device that the description of some information is omitted. A security policy derived from such setting information lacks integrity and is difficult to grasp unless the security policy is manually corrected and adjusted. As a result, a large expenditure of labor and time is required to construct and grasp a security policy.

A second problem is that there is a high possibility of errors and omissions occurring in constructing a security policy and grasping a security status. The reasons for such a high possibility of errors and omissions are that the manual intervention in the process of constructing a security policy is likely to cause errors and omissions due to assumptions and illusions that the security manager and the respondents to the questions may have.

According to JP, P2003-203140A, a scanner is disclosed as the investigation tool for investigating the security status of the information system. However, such an investigation tool may possibly collect erroneous information which is different from the setting details that are actually set in a security device to be investigated.

Security policy management systems for deriving a security policy from setting details of a security device that is a component of an information system are to meet the following demands:

When a security policy is constructed, a security policy management should preferably be able to present the details of the security policy in an understandable way to the manager. A security policy management system should preferably be able to compare the security policies of a plurality of systems, and to compare not only the security policies of a plurality of systems, but also security policies with each other, e.g., the security policy of one system and a predetermined reference security policy with each other.

A security policy management system should preferably be able to analyze a plurality of security policies of the same type in an integrated manner. For example, if there are a plurality of packet filtering devices, then a security policy management system should preferably be able to analyze security policies grasped respectively from the packet filtering devices and specify packets that can pass through all the packet filtering devices.

A security policy management system should preferably be able to interlink security policies or the like having settings for different functions and grasp the relation between those security policies. For example, a security policy management system should preferably be able to interlink a security policy having settings for a packet filtering function and the results of an analysis of settings for an intrusion detecting function, and to determine whether there is an unmatch between the settings or not.

SUMMARY OF THE INVENTION

It is an object of the present invention to provide a security policy management system and method which are capable of generating a security policy that can easily be grasped by the manager with reduced human intervention by the manager or the like.

Another object of the present invention to provide a security policy management system and method which are capable of presenting a generated security policy in an understandable way.

Still another object of the present invention to provide a security policy management system and method which are capable of comparing the security policies of a plurality of systems, and comparing security policies with each other.

Yet another object of the present invention to provide a security policy management system and method which are capable of analyzing a plurality of security policies of the same type in an integrated manner.

Yet still another object of the present invention to provide a security policy management system and method which are capable of interlinking security policies or the like having settings for different functions and grasping the relation between those security policies.

According to a first aspect of the present invention, there is provided a security policy management system comprising setting information storage means for storing setting information representing settings with regard to security functions of devices included in a network system to be managed, and general-purpose security policy generating means for generating a security policy including a description expressed in a format independent of descriptions depending on particular devices, based on the setting information stored in the setting information storage means.

According to a second aspect of the present invention, there is provided a security policy management system comprising setting information inputting means for inputting setting information representing settings with regard to security functions of devices included in a network system to be managed, and general-purpose security policy generating means for generating a security policy including a description expressed in a format independent of descriptions depending on particular devices, based on the setting information inputted by the setting information inputting means.

According to the present invention, since a generated security policy contains descriptions expressed in a format independent of descriptions dependent on particular devices, the details of the security policy can easily be grasped. Because the general-purpose security policy generating means generates a security policy containing descriptions expressed in a format independent of descriptions dependent on particular devices, based on the setting information, the security policy can automatically be generated based on the setting information without human intervention. As a result, assumptions and illusions that the operator such as the system administrator or the like may have are eliminated, and description errors and omissions of a security policy are minimized. Furthermore, a security policy can be generated accurately within a short period of time.

According to the present invention, the security policy management system may further include setting information inputting subroutine storage means for storing a setting information inputting subroutine for inputting the setting information, with regard to each of the devices, and the setting information inputting means may read the setting information inputting subroutine corresponding to each of the devices from which the setting information is to be collected, and input the setting information according to the read setting information inputting subroutine. With this arrangement, by additionally storing a new setting information inputting subroutine in the setting information inputting subroutine storage means, setting information can be inputted from a newly added device.

According to the present invention, the security policy management system may further include security policy generating subroutine storage means for storing, with regard to each of the devices, a security policy generating subroutine for generating a security policy including a description expressed in a format independent of descriptions depending on particular devices, and the general-purpose security policy generating means may read the security policy generating subroutine corresponding to a device holding the setting information from the security policy generating subroutine storage means based on the setting information inputted by the setting information inputting means, and generate the security policy according to the security policy generating subroutine. With this arrangement, by additionally storing a new security policy generating subroutine in the security policy generating subroutine storage means, a security policy depending on a newly added device can be generated.

According to the present invention, the security policy management system may further include an analytical knowledge database for storing information used to analyze details of the security policy generated by the general-purpose security policy generating means, and security policy analyzing means for analyzing details of the security policy generated based on the setting information, using the information stored in the analytical knowledge database. With this arrangement, since the security policy analyzing means analyzes details of the security policy, the system administrator finds it easier to grasp the details of the security policy.

According to the present invention, the security policy management system may further include security policy analyzing subroutine storage means for storing, with regard to each of the security functions, a security policy analyzing subroutine for analyzing details of the security policy generated by the general-purpose security policy generating means, and the security policy analyzing means may read the security policy analyzing subroutine for each of the security functions from the security policy analyzing subroutine storage means, and analyze details of the security policy generated by the general-purpose security policy generating means according to the security policy analyzing subroutine. With this arrangement, the security policy analyzing means can analyze the details of the security policy for each of the security functions. By additionally storing a new security policy analyzing subroutine in the security policy analyzing subroutine storage means, the details of a security policy depending on a new security function can be analyzed.

According to the present invention, the security policy management system may further include security policy comparing means for, when the security policy analyzing means generates a plurality of analyzed results of security policies with regard to one security function, comparing the analyzed results and identifying a difference between the security policies of respective devices which are analyzed by the security policy analyzing means. With this arrangement, since the security policy comparing means identifies a difference between the security policies of respective devices, it is possible to determine whether the details of a security policy derived from the setting information are different between security devices of different types having the same security function or between security devices of the same type.

According to the present invention, the security policy management system may further include comparing subroutine storage means for storing, with regard to each of the security functions, a comparing subroutine for comparing the analyzed results generated by the security policy analyzing means, and the security policy comparing means may read the comparing subroutine for each of the security functions from the comparing subroutine storage means, and compare the analyzed results and identify a difference between the security policies of respective devices which are analyzed by the security policy analyzing means, according to the comparing subroutine. With this arrangement, by additionally storing a new comparing subroutine in the comparing subroutine storage means, analyzed results depending on a new security function can be compared with each other.

According to the present invention, the security policy analyzing subroutine storage means may store a security policy analyzing subroutine for identifying information of a source of a packet and information of a destination of a packet, which information permits the packets to pass, as a security policy analyzing subroutine corresponding to a packet filtering function, based on information of a source of a packet, information of a destination of a packet, protocol information, and information as to whether packets are to pass or not, the information being described in the security policy, and the security policy analyzing means may identify information of a source of a packet and information of a destination of a packet, which information permits the packets to pass, according to the security policy analyzing subroutine. With this arrangement, it is possible to obtain, as an analyzed result, information of a source of a packet and information of a destination of a packet, which information permits the packets to pass.

According to the present invention, the security policy management system may further include output means for outputting the analyzed result generated by the security policy analyzing means, and the security policy analyzing means may control the output means to display a diagram representing the information of the source of the packet and the information of the destination of the packet, which information permits the packets to pass, in a two-dimensional area having a horizontal axis representing either values which can be taken by the information of the source of the packet or values which can be taken by the information of the destination of the packet, and a vertical axis representing the other values. Alternatively, according to the present invention, the security policy management system may further include output means for outputting the analyzed result generated by the security policy analyzing means, and the security policy analyzing means may control the output means to display a diagram in an area defined by a first axis representing values which can be taken by the information of the source of the packet and a second axis representing values which can be taken by the information of the destination of the packet. The diagram represents, on the first axis, the information of the source of the packet, which information permits the packets to pass, and represents, on the second axis, the information of the destination of the packet, which information permits the packets to pass. With the above arrangement, it is possible to present, in an easily understandable fashion, information of a source of a packet and information of a destination of a packet, which information permits the packets to pass.

According to the present invention, the security policy management system may further include security policy integrating means for, when the security policy analyzing means generates a plurality of analyzed results of security policies with regard to the same type of security function, further analyzing the analyzed results and deriving an analyzed result for entire security policies. With this arrangement, an analyzed result of a plurality of analyzed results as a whole can be presented to the system administrator.

According to the present invention, the security policy management system may further include integrating subroutine storage means for storing, with regard to each of the security functions, an integrating subroutine for further analyzing the analyzed results, and the security policy integrating means may read the integrating subroutine for each of the security functions from the integrating subroutine storage means, further analyze the analyzed results and derive an analyzed result for entire security policies according to the integrating subroutine. With this arrangement, by additionally storing a new integrating subroutine in the integrating subroutine storage means, an integrated analysis depending on a new security function can be performed.

According to the present invention, the security policy management system may further include security policy interlinking means for referring to security policies generated based on setting information of a plurality of devices having different security functions or analyzed results of the security policies, and relating the security policies generated based on the setting information of the devices to each other. With this arrangement, a result produced by relating the security policies to each other can be presented to the system administrator.

According to the present invention, the security policy management system may further include interlinking subroutine storage means for storing, with regard to each combination of the different security functions, an interlinking subroutine for relating the security policies generated based on the setting information of a plurality of devices having different security functions to each other, and the security policy interlinking means may read the interlinking subroutine for each combination of the different security functions from the interlinking subroutine storage means, and relate the security policies to each other according to the interlinking subroutine. With this arrangement, by additionally storing a new interlinking subroutine in the interlinking subroutine storage means, security policies depending on a combination of new security functions can be related to each other.

As described above, the security policy management system according to the present invention has the general-purpose security policy generating means for generating a general-purpose security policy including a description expressed in a format independent of descriptions depending on particular devices, based on the setting information. Since the generated security policy contains descriptions expressed in a format independent of descriptions dependent on particular devices, the details of the security policy can easily be grasped. Because the general-purpose security policy generating means generates a security policy, the security policy can automatically be generated based on the setting information without human intervention. As a result, assumptions and illusions that the operator such as the system administrator or the like may have are eliminated, and description errors and omissions of a security policy are minimized. Furthermore, a security policy can be generated accurately within a short period of time.

The above and other objects, features, and advantages of the present invention will become apparent from the following description with reference to the accompanying drawings which illustrate examples of the present invention.

BRIEF DESCRIPTION OF THE DRAWINGS

FIG. 13 is a diagram showing an example of knowledge with regard to descriptive specifications for setting information;

FIG. 14 is a diagram showing an example of a generated general-purpose security policy;

FIG. 17 is a diagram showing an example of information stored in an analytical knowledge database;

FIG. 18 is a diagram showing an example of information stored in the analytical knowledge database;

FIG. 19 is a diagram showing an example of information stored in the analytical knowledge database;

FIG. 20 is a flowchart illustrating an example of an analyzing process;

FIG. 31 is a diagram showing an example of a generated general-purpose security policy;

FIG. 32 is a diagram showing an example of a generated general-purpose security policy;

FIG. 33 is a diagram showing an example of an output image of a compared result;

FIG. 37 is a diagram showing an example of a generated general-purpose security policy;

FIG. 38 is a diagram showing an example of a generated general-purpose security policy;

FIG. 39 is a diagram showing an example of an output image of a result produced by analyzing a generated general-purpose security policy;

FIG. 40 is a diagram showing an example of an output image of a result produced by analyzing a generated general-purpose security policy;

FIG. 42 is a diagram showing an example of an output image of a result of the integrating process;

FIG. 44 is a diagram showing an example of a network system for simultaneously performing packet filtering and address translation;

FIG. 45 is a diagram showing an example of a generated general-purpose security policy;

FIG. 46 is a diagram showing an example of a generated general-purpose security policy;

FIG. 47 is a diagram showing an example of an output image of a result produced by analyzing a generated general-purpose security policy;

FIG. 48 is a diagram showing an example of an output image of a result produced by analyzing a generated general-purpose security policy when an address converting policy is not applied;

FIG. 54 is a diagram showing an example of a general-purpose security policy of an NIDS (network intrusion detection system);

FIG. 55 is a diagram showing an example of information required to analyze a general-purpose security policy of an NIDS;

FIG. 57 is a diagram showing an example of a general-purpose security policy with category information added thereto;

FIG. 59 is a diagram showing an example of a general-purpose security policy that is determined for a packet filtering function;

FIG. 61 is a diagram showing an example of an insufficient monitoring or filtering unmatched list;

FIG. 63 is a diagram showing another example of an output image of detected results of an unmatch between a packet filtering policy and an NIDS policy;

FIG. 68 is a diagram showing an example of a general-purpose security policy derived from a packet filtering security device;

FIG. 69 is a diagram showing an example of a result produced by analyzing an NIDS policy;

DETAILED DESCRIPTION OF THE PREFERRED EMBODIMENTS

First Embodiment

Figure 1:
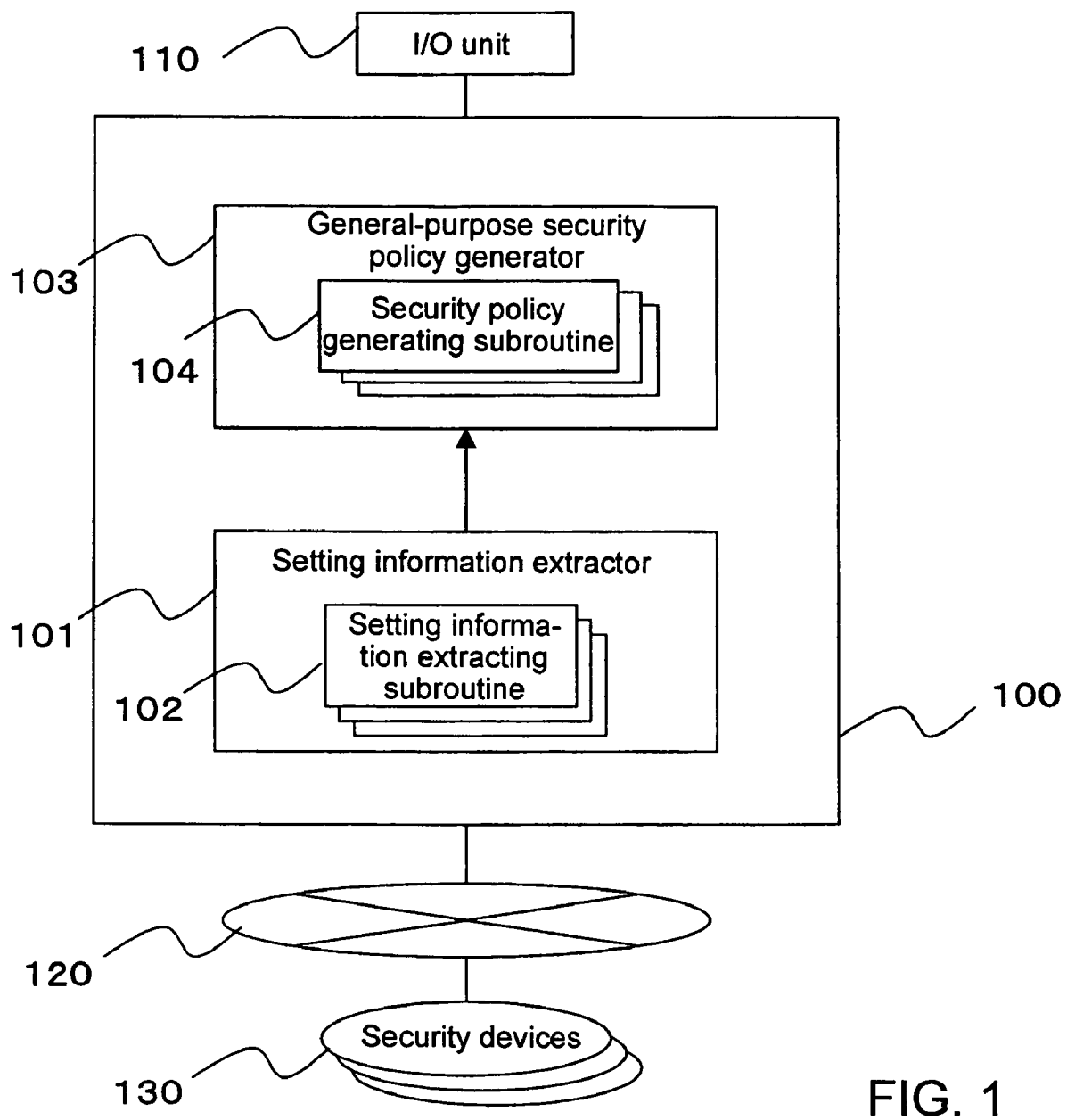
FIG. 1 is a block diagram illustrating a security policy management system according to a first embodiment of the present invention.

A security policy management system according to a first embodiment of the present invention as shown in FIG. 1 has a data processing apparatus 100 comprising a computer which operates according to a program and an I/O unit 110 for inputting and outputting information. The I/O unit 110 includes an input device such as a keyboard, a mouse, etc. and an output device such as a display device or the like.

A security device 130 is a device having a security function, among devices that are components of a network system (not shown) which is used by a certain organization or enterprise. The network system is to be managed by the system administrator. The devices as the components of the network system are interconnected by a communication network 120. The network system includes at least one security device 130, which is connected to the communication network 120. The data processing apparatus 100 is connected to the security device 130 through the communication network 120. Each security device 130 holds setting information representing settings with regard to a security function that the security device 130 has. The setting information held by the security device 130 may represent settings with regard to a security function realized by hardware, for example. Alternatively, the setting information held by the security device 130 may represent settings with regard to a security function realized by software installed in the security device 130. The setting information is specified according to a format inherent in each security device 130.

The data processing apparatus 100 includes a setting information extractor 101 and a general-purpose security policy generator 103. The setting information extractor 101 and the general-purpose security policy generator 103 are realized by a CPU (central processing unit) that operates according to a program, for example. The program includes, as subroutines, at least one setting information extracting subroutine 102 and at least one security policy generating subroutine 104. Each setting information extracting subroutine 102 is held in one-to-one correspondence to each security device 130. Each security policy generating subroutine 104 is held in one-to-one correspondence to each security device 130.

The setting information extractor 101 extracts and collects setting information from at least one of security devices 130 connected to the communication network 130. At this time, the setting information extractor 101 calls the setting information extracting subroutine 102 which corresponds to a security device from which setting information is to be extracted, and extracts and collects setting information from the security device according to the setting information extracting subroutine 102. The setting information is inherent in the security device from which the setting information is to be collected.

The general-purpose security policy generator 103 generates a security policy that is determined depending on the operation of the security device from which the setting information is collected, from the setting information that is collected by the setting information extractor 101. At this time, the general-purpose security policy generator 103 generates a security policy including a description expressed in a format independent of the description which depends on the particular security device 130. The "format independent of the description which depends on the particular security device 130" is a format that does not depend on the particular security device 130. Since a security policy generated by the general-purpose security policy generator 103 includes a description expressed in a format independent of the description which depends on the security device 130, the security policy generated by the general-purpose security policy generator 103 will be referred to as "general-purpose security policy".

The general-purpose security policy may include only a description expressed in a format independent of the description which depend on the security device 130. The general-purpose security policy may partly include a description which depends on the particular security device 130.

The general-purpose security policy generator 103 calls the security policy generating subroutine 104 which corresponds to a security device from which setting information is to be collected, and generates a general-purpose security policy according to the security policy generating subroutine 104. The general-purpose security policy generator 103, therefore, generates a general-purpose security policy for each security device.

The setting information extracting subroutine 102 and the security policy generating subroutine 104, which correspond to each security device 130, are stored in advance in a storage device (not shown in FIG. 1) of the data processing apparatus 100. Reading a subroutine stored in the storage device (not shown in FIG. 1) will be referred to as "calling a subroutine".

That setting information is present in the security device 130 means that a security policy has already been generated and settings have already been made according to the security policy. According to the present invention, a general-purpose security policy described in a format not depending on a particular security device is newly generated separately from an existing security policy.

Next, The security device and its functions will be described. Examples of security devices include a firewall, a WWW (World Wide Web) server, an FTP (File Transfer Protocol) server, a superserver, and a device with logging software installed therein. Examples of security functions that these security devices 130 have include a packet filtering function, an address translating function, an URL (uniform resource locator) filtering function, a virus checking function, a contents screening function, an authenticating function, a log outputting function, an access controlling function, etc. The URL filtering function is a function to inhibit the browsing of some harmful Web pages. The virus checking function is a function to perform a virus check on files that are downloaded via FTP or HTTP (hypertext transfer protocol). The contents screening function is a function not to display contents of Web pages that are based on Java scrip® or ActiveX®. The security device 130 and the security functions described above are illustrated by way of example only, and are not limited to the illustrated details.

The setting information held by the security device 130 includes rules relating to security. One rule may be expressed by only a description with regard to one security function, or may be expressed by a description with regard to a plurality of security functions. For example, the rule "a packet sent from address A to address B is discarded" is expressed by only a description with regard to one security function (i.e., the packet filtering function in the present embodiment). The rule that "a packet sent from an address A to an address B shall be passed, but contents based on Java script shall not be displayed" is expressed by a description with regard to two security functions (i.e., the packet filtering function and the contents screening function in the present embodiment). According to the setting information, each rule is expressed in a format inherent in each security device.

Figure 2:
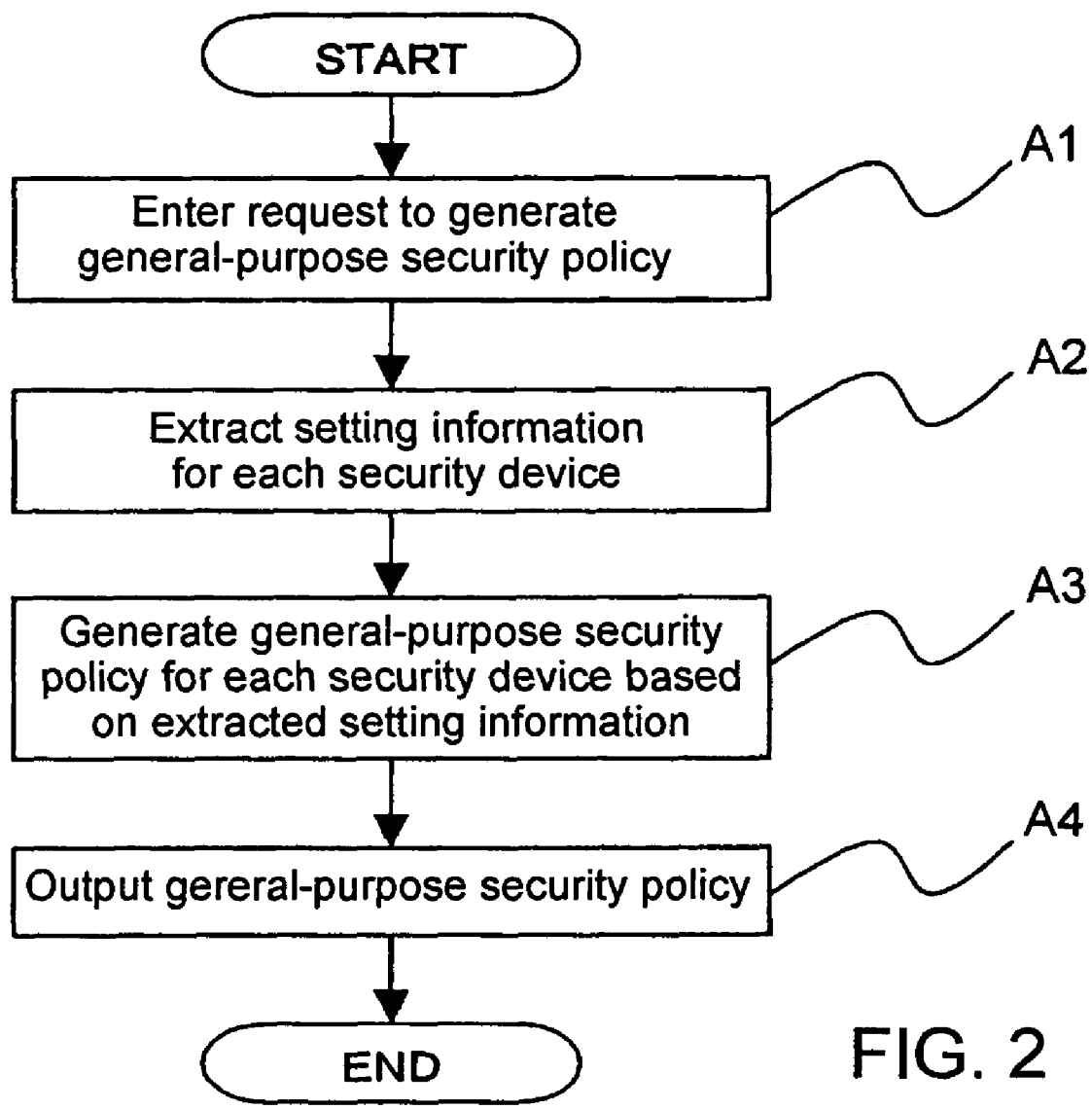
FIG. 2 is a flowchart illustrating an example of an operation sequence of the security policy management system shown in FIG. 1.

Operation of the security policy management system shown in FIG. 1 will be described below with reference to FIG. 2.

In step A1, the system administrator, for example, enters a request to generate a general-purpose security policy through the I/O unit 110 into the data processing apparatus 100. The setting information extractor 101 then calls a setting information extracting subroutine 102 for at least one security device 130 that is included in the network system. In step A2, the setting information extractor 101 extracts and collects setting information from the security device 130 according to the setting information extracting subroutine 102. If setting information is to be collected from a plurality of security devices 130, then the setting information extractor 101 collects setting information from each of the security devices 130.

After step S2, the general-purpose security policy generator 103 calls a security policy generating subroutine 104 corresponding to the security device 130 from which the setting information is collected in step A2. In step A3, the general-purpose security policy generator 103 generates a general-purpose security policy from the setting information collected in step A2 according to the security policy generating subroutine 104. If the setting information is collected from a plurality of security devices 130 in step A2, then the general-purpose security policy generator 103 generates a general-purpose security policy for each of the security devices 130. Thereafter, in step A4, the general-purpose security policy generator 103 outputs the general-purpose security policy generated in step A3 from the I/O unit 110, which presents the general-purpose security policy to the system administrator. For example, the general-purpose security policy is displayed on the display device.

Figure 3:
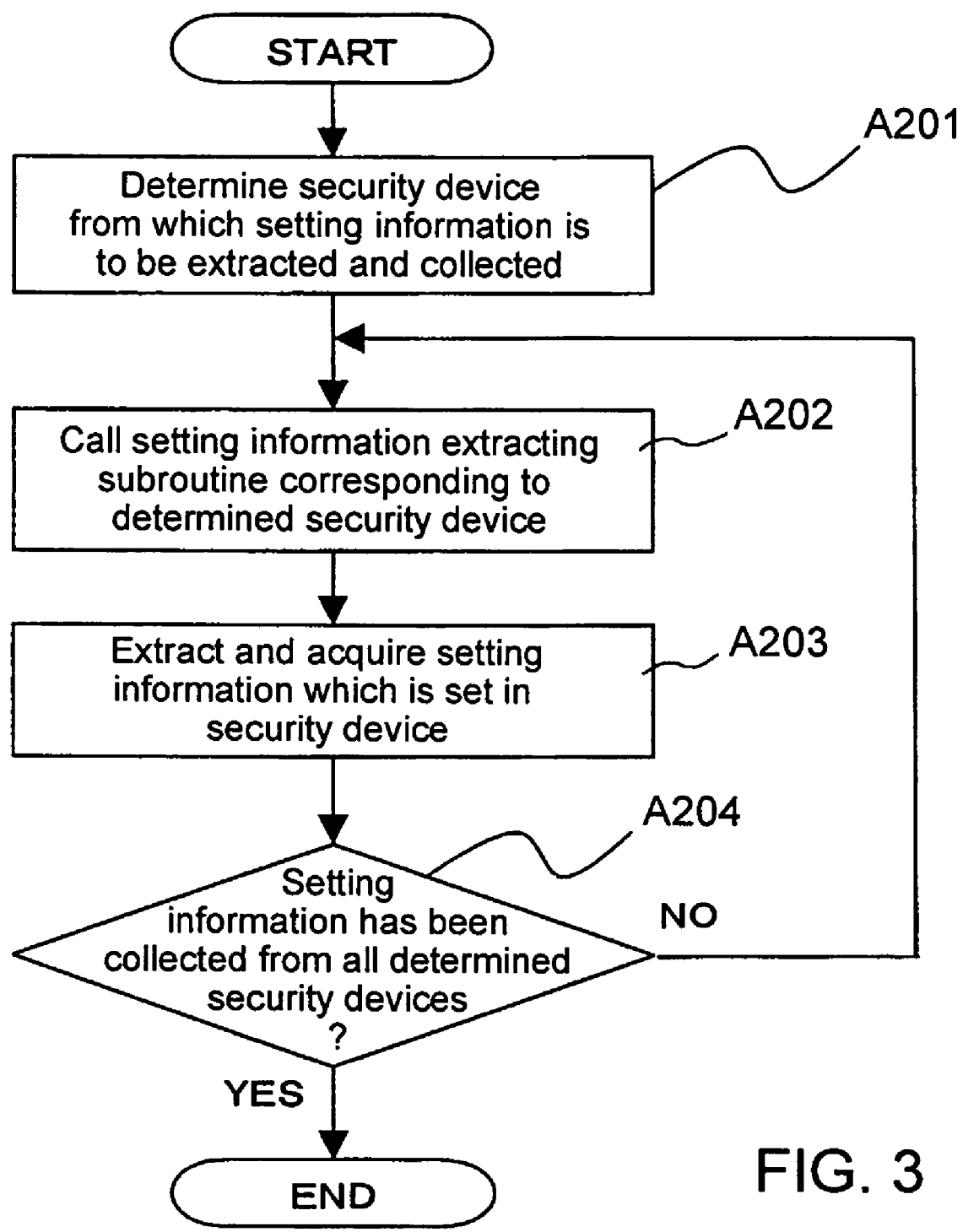
FIG. 3 is a flowchart illustrating an example of a setting information extracting and collecting process.

The setting information extracting and collecting process in step A2 will be described below. FIG. 3 is a flowchart illustrating an example of the setting information extracting and collecting process in step A2.

When a request to generate a general-purpose security policy is entered through the I/O unit 110 into the data processing apparatus 100 in step A1, the setting information extractor 101 determines, in step A201, a security device from which setting information is to be extracted and collected. For example, the setting information extractor 101 displays an image for prompting the system administrator to specify a security device, and determines a security device which is specified through the I/O unit 110 as a security device from which setting information is to be extracted and collected. Alternatively, the setting information extractor 101 may store in advance topological information of the network system including security devices 130, display the security devices described by the topological information to prompt the system administrator to select one of the security devices, and determine a security device which is specified through the I/O unit 110 as a security device from which setting information is to be extracted and collected. The topological information is information representing connections between the devices of the network system. Further alternatively, the setting information extractor 101 may search for a security device 130 connected to the communication network 120, and determine the security device which is searched for as a security device from which setting information is to be extracted and collected. The setting information extractor 101 may use an SNMP (Simple Network Management Protocol) to search for a security device 130. If the setting information extractor 101 searches for a security device having software for performing a security function, then the setting information extractor 101 may search for the security device using commands included in an OS (Operating System) that is installed in the security device.

Then, in step A202, the setting information extractor 101 calls the setting information extracting subroutine 102 corresponding to the security device that is determined in step A201. In step A203, the setting information extractor 101 extracts and acquires setting information which is set in the security device according to the setting information extracting subroutine 102. Information to be extracted from each security device 130 is determined in the setting information extracting subroutine corresponding to the security device 130. The setting information extractor 101 extracts and collects setting information by using the SNMP or executing a setting information acquiring command provided in a security device that is determined as a security device from which setting information is to be collected.

After step A203, the setting information extractor 101 determines, in step A204, whether setting information has been extracted and collected from all the security devices determined in step A201 or not. If setting information has been extracted and collected from all the security devices, then the setting information extracting and collecting process in step A2 is put to an end. If there is still a security device or devices from which setting information is to be extracted and collected, then control goes back to step A202, and steps A202, A203, A204 are repeated.

Figure 4:
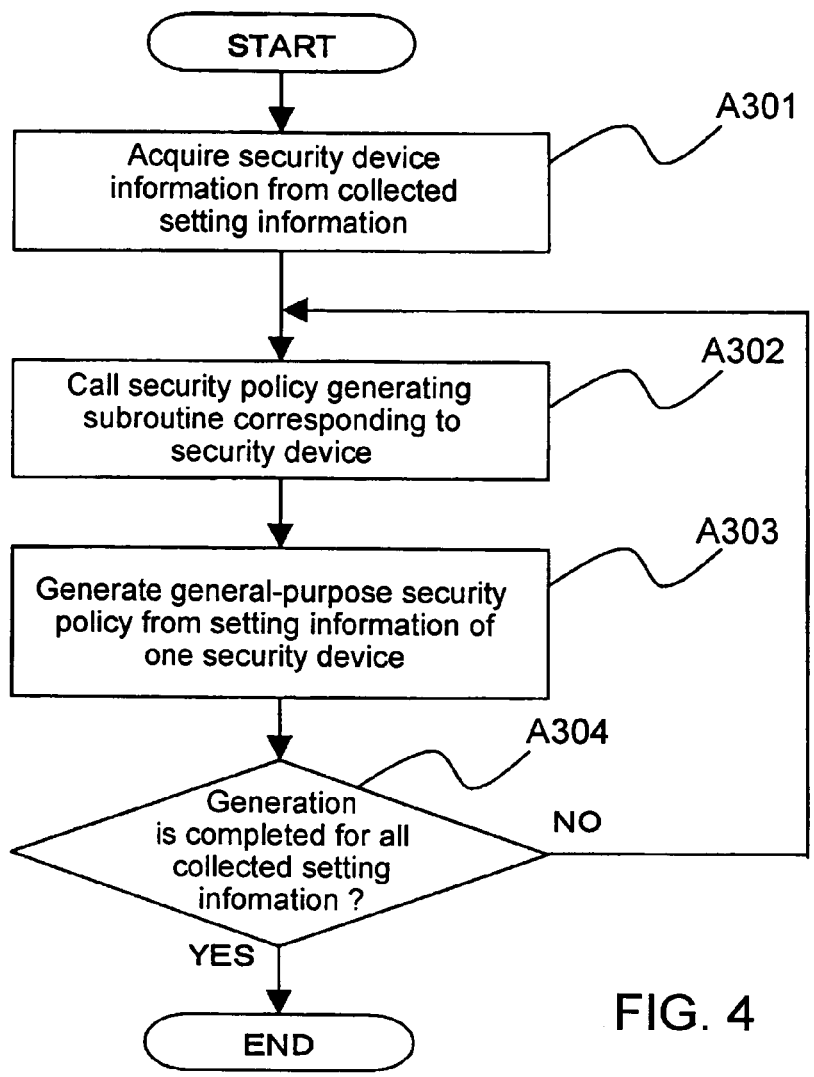
FIG. 4 is a flowchart illustrating an example of a general-purpose security policy generating process.

The general-purpose security policy generating process in step A3 will be described below. FIG. 4 is a flowchart illustrating an example of the general-purpose security policy generating process in step A3.

After step A2, the general-purpose security policy generator 103 acquires, in step A301, security device information for specifying a security device 130 which originally holds the setting information, from the setting information collected in step A2. The security device information includes the name and version information of the security device, and is described in the setting information. The general-purpose security policy generator 103 may acquire security device information including the name and version information of the security device, described in the collected setting information, for example.

Then, the general-purpose security policy generator 103 determines which security device the setting information is collected from, according to the security device information. In step A302, the general-purpose security policy generator 103 calls the security policy generating subroutine 104 corresponding to the security device.

Next, in step A303, the general-purpose security policy generator 103 interprets details of the setting information described in a format inherent in the security device, and generates a general-purpose security policy described in a format not dependent on the security device, according to the security policy generating subroutine 104. Since the security policy generating subroutine 104 is held in one-to-one correspondence to the security device 130, the general-purpose security policy generator 103 generates a general-purpose security policy corresponding to one security device 130 from the setting information of that security device 130 in step A303. The security policy generating subroutine 104 includes knowledge about descriptive specifications for setting information of the corresponding security device, and format information about the general-purpose security policy to be generated. The format information about the general-purpose security policy is information in a format not dependent on the security device 130. Therefore, the security policy generating subroutine 104 can generate a general-purpose security policy from the setting information described according to the descriptive specifications inherent in the security device. As described above, the security policy generating subroutine 104 is stored in advance in the storage device (not shown in FIG. 1) of the data processing apparatus 100.

Then, in step A304, the general-purpose security policy generator 103 determines whether general-purpose security policies have been generated from all the setting information collected in step A2 or not. If the general-purpose security policies has been generated from all the collected setting information, then the general-purpose security policy generating process in step A3 is put to an end. If there is still setting information from which a general-purpose security policy is to be generated, then control goes back to step A302, and steps A302, A303, A304 are repeated. A general-purpose security policy is generated for each security device by the general-purpose security policy generating process shown in FIG. 4.

A description format of a general-purpose security policy generated in step A3 will be described below. A general-purpose security policy is expressed not in a description format inherent in security devices, but in a format not depending on security devices, which is made abstract based on the security function that is common to security devices of the similar type. Such a format is realized by modeling the operation of a security device having a security function, defining objects and actions on the model, and describing setting information of the security device, specifically rules included in the setting information, as attributes to the objects and the actions. By modeling the operation of a security device, it is possible to describe the setting information of security devices belonging to the same category and having the same security function, generally in a format not depending on the security devices.

Figure 5:
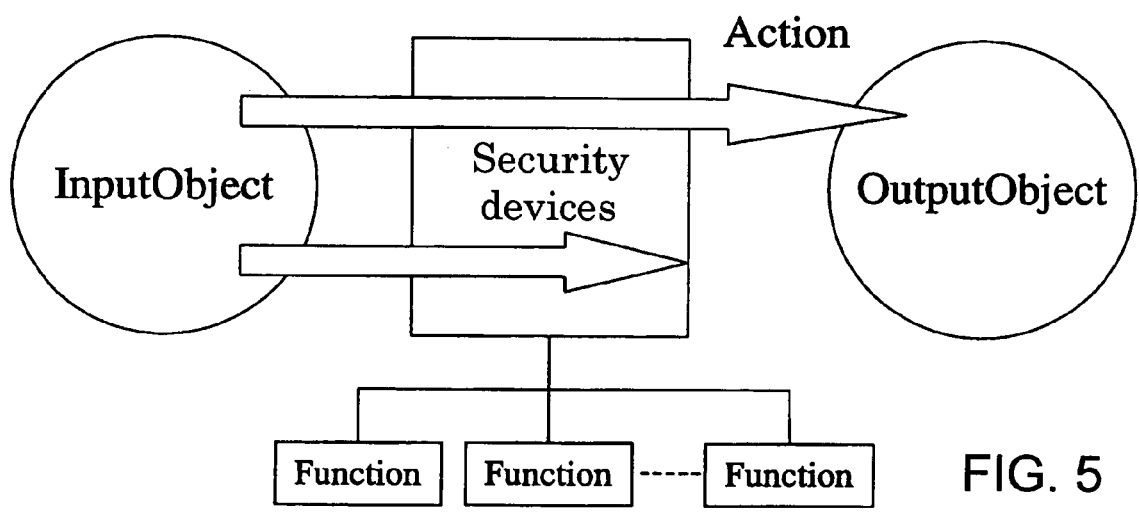
FIG. 5 is a diagram showing an example of an operation model of a security function.

FIG. 5 shows an example of a model of the operation of a security device. In FIG. 5, an operation model of a security device for performing access control, such as packet filtering or the like is illustrated. The security device represented by the model has two modes of operation. The first mode of operation is a mode in which when an object represented by InputObject is input, the passage of the object is permitted or denied. The second mode of operation is a mode in which when an object represented by InputObject is input, an object represented by OutputObject is output. One security device may have a plurality of security functions. For example, some firewalls serving as a security device have a plurality of functions including a packet filtering function, an authenticating function, an address translating function, etc. Such a security device operates to combine those security functions (Function).

Security devices whose operation can be represented by the operation model shown in FIG. 5 include a firewall, a WWW server, an FTP server, a superserver, and a device with logging software installed therein. Security functions that those security devices have include a packet filtering function, an address translating function, an URL filtering function, a virus checking function, a contents screening function, an authenticating function, a log outputting function, an access controlling function, etc. Even different security devices are represented by a general-purpose security policy having a common format if they are represented by a common operation model. Since those security devices described above have a common operation model, they can be represented by a general-purpose security policy that does not depend on the security devices having a common operation model. If the operation model is different, the setting information is described in a general-purpose security policy of a different format. Therefore, general-purpose security policies are classified into respective sets of security devices each having a common operation model.

Items described by a general-purpose security policy of a security device having the operation model shown in FIG. 5 will be described below. An operation according to security functions is expressed by a set of Function (a security function for access control), InputObject (an object inputted to Function), OutputObject (an object outputted from Function), and Action (operation of Function).

In addition to Function, InputObject, OutputObject, and Action which represent an operation according to one security function, effect for representing whether the operation is permitted or not is combined. A value that can be taken by effect is "permit" or "deny". As described above, the setting information expressed in a format inherent in each security device includes a rule expressed by only a description with regard to one security function and a rule expressed by a description with regard to a plurality of security functions. If either rule is described as a general-purpose security policy, a description with regard to each security function is expressed as a combination of Function, InputObject, OutputObject, Action, and effect. A description with regard to a security function for expressing rules, expressed in a format that does not depend on security devices, will hereinafter referred to as PolicyRule. PolicyRule represents a combination of Function, InputObject, OutputObject, Action, and effect.

Generally, access control rules are often expressed by subject (who), resource (to which), action (what), and effect (whether to permit or not). However, the operation of such security functions may not be expressed by a combination of these four items. One example is the operation of an address translating function. An address translating function is a function to translate the source IP (Internet protocol) address (and port number) and the destination IP address (and port number) of a certain packet that enters a router or a gateway, and output the translated addresses. The association between the addresses before translated and the addresses after translated is stored in a translation table for allowing a returned packet to be transferred to a correct source address before it is translated. An address translating function cannot be expressed by general access control rules. However, if a description with regard to each security function is expressed as a combination of Function, InputObject, OutputObject, Action, and effect, a description with regard to an address translating function can be expressed as PolicyRule. Specifically, if packet information including a source IP address (and port number) and a destination IP address (and port number) before being translated is described in InputObject of PolicyRule expressed in a general-purpose security policy, packet information including a source IP address (and port number) and a destination IP address (and port number) after being translated is described in OutputObject of PolicyRule, and "SNAT" for changing the source address and "DNAT" for changing the destination address are described as a security function in Function of PolicyRule, then a description with regard to an address translating function can be described as PolicyRule.

A rule expressed in a format not depending on security devices is referred to as Policy. One Policy is generated from one rule. If a rule expressed by only a description with regard to one security function is expressed as Policy included in a general-purpose security policy, then one PolicyRule is included in that Policy. If a rule expressed by a description with regard to a plurality of security functions is expressed as Policy, then a plurality of PolicyRules are included in that Policy. A process of combining a plurality of PolicyRules included in one Policy is represented by a PolicyRule combining algorithm. PolicyRule combining algorithms include "ordered-deny-overrides" and "ordered-permit-overrides". "ordered-deny-overrides" is a PolicyRule combining algorithm for evaluating Policy including a plurality of PolicyRules as "deny" if either effect of the plurality of PolicyRules is evaluated as "deny". "ordered-permit-overrides" is a PolicyRule combining algorithm for evaluating Policy including a plurality of PolicyRules as "permit" if either effect of the plurality of PolicyRules is evaluated as "permit". According to such a PolicyRule combining algorithm, a rule expressed by a description with regard to a plurality of security functions can be expressed as one Policy.

If necessary, Condition and Obligation can be added to Policy. Condition represents a condition for applying Policy, and Obligation represents an obligation when Policy is applied. Therefore, according to a general-purpose security policy, one Policy may be expressed by a combination of one or plural PolicyRules, Condition, and Obligation. Usually, one rule is often accompanied by a condition for making the rule valid. According to a general-purpose security policy, Condition can be added to Policy in order to express such a condition. Furthermore, one rule may be accompanied by a process as an obligation, which has to be performed other than a process according to a security function described by the rule, when the rule is applied. According to a general-purpose security policy, Obligation can be added to Policy in order to express such an obligation.

A set of rules which are set in one security device, which is expressed in a format not depending on the security device, is referred to as PolicyGroup. A general-purpose security policy that is generated based on setting information extracted from one security device is represented as one PolicyGroup. Therefore, each security device is held in one-to-one correspondence to each PolicyGroup. If a plurality of rules are described in setting information that is extracted from one security device, then a plurality of Policies are included in PolicyGroup. A process of combining a plurality of Policies included in PolicyGroup is represented by a Policy combining algorithm. Policy combining algorithms include "first-applicable" and "independent". "first-applicable" indicates that the order of Policies has an important meaning and Policies have to be applied in the order of their descriptions. "independent" indicates that no consideration is given to the order in which to apply Policies. Each security policy generating subroutine 104 includes a parameter representing a Policy combining algorithm in case each rule set in the corresponding security device 130 is expressed as Policy.

Figure 6:
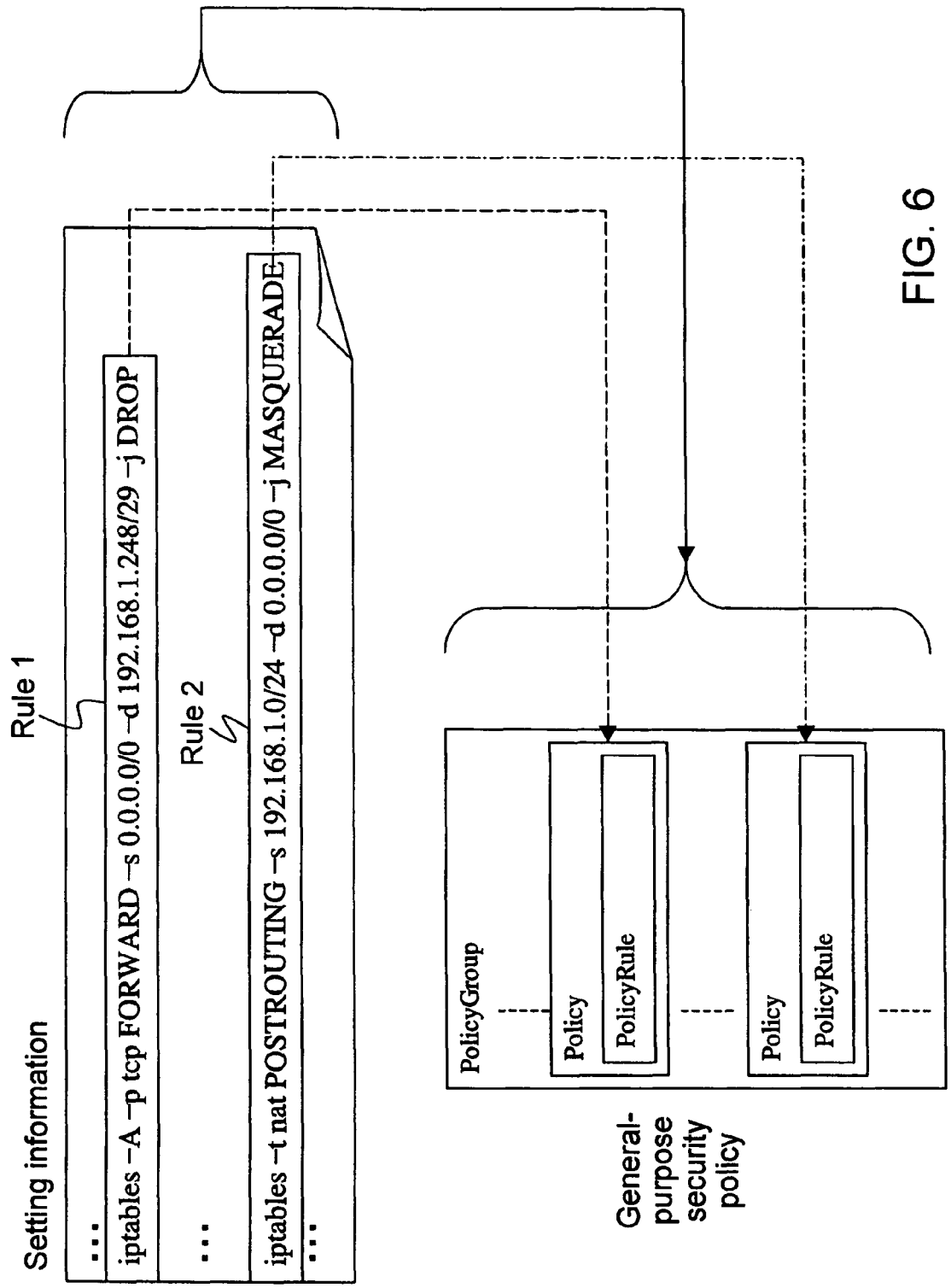
FIG. 6 is a diagram showing the inclusion relation of PolicyGroup, Policy, and PolicyRule.
Figure 7:
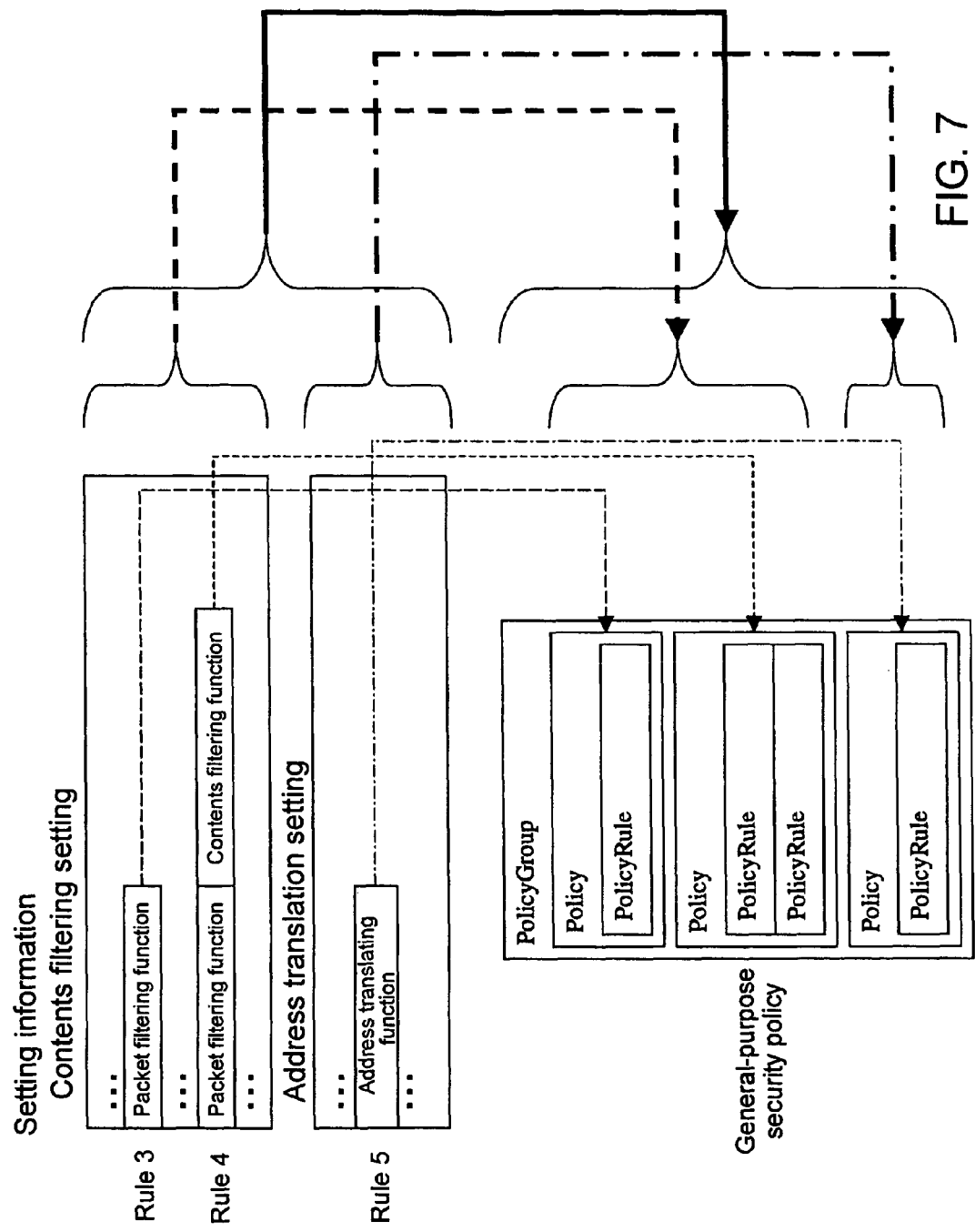
FIG. 7 is a diagram showing the inclusion relation of PolicyGroup, Policy, and PolicyRule.

FIGS. 6 and 7 show the inclusion relation of PolicyGroup, Policy, and PolicyRule in a general-purpose security policy that is generated from setting information inherent in a security device. FIG. 6 shows an example of setting information in a security device in which access control software "iptables" (software product name) is installed. It is assumed that rules 1, 2 shown in FIG. 6 are described in the setting information. The rule 1 prescribes that a packet sent from a particular IP address to a particular IP address shall be revoked. The rule 1 contains a description with regard to only a packet filtering function. One PolicyRule is generated from the description with regard to the packet filtering function in the rule 1. One Policy is generated from one rule. Therefore, Policy generated from the rule 1 includes one PolicyRule corresponding to the description with regard to the packet filtering function. The rule 2 contains a description with regard to only an address translating function. Therefore, Policy generated from the rule 2 includes one PolicyRule corresponding to the description with regard to the address translating function. One PolicyGroup is generated from the entire setting information of one security device in which iptables is installed. This PolicyGroup includes respective Policies corresponding to the rules 1, 2.

The setting information shown in FIG. 7 represents setting information of another security device. It is assumed that rules 3 to 5 shown in FIG. 7 are described in the setting information. The rules 3, 4 are rules relating to the contents filtering. The rule 5 is a rule relating to the address translation. The rule 3 contains a description with regard to only a packet filtering function. Therefore, Policy generated from the rule 3 includes one PolicyRule corresponding to the description with regard to the packet filtering function.

The rule 4 contains a description with regard to a packet filtering function and a description with regard to a contents screening function. One example of this rule is that "a packet sent from an address A to an address B shall be passed, but contents based on Java script shall not be displayed". This rule contains a description with regard to a packet filtering function, i.e., "a packet sent from an address A to an address B shall be passed", and a description with regard to a contents screening function, i.e., "contents based on Java script shall not be displayed". Policy generated from the rule 4 includes one PolicyRule corresponding to the description with regard to the packet filtering function and one PolicyRule corresponding to the description with regard to the contents screening function.

The rule 5 contains a description with regard to only an address translating function. Therefore, Policy generated from the rule 5 includes one PolicyRule corresponding to the description with regard to the address translating function. One PolicyGroup corresponding to one security device is generated from the entire setting information. This PolicyGroup includes respective Policies corresponding to the rules 3 to 5.

Figure 8:
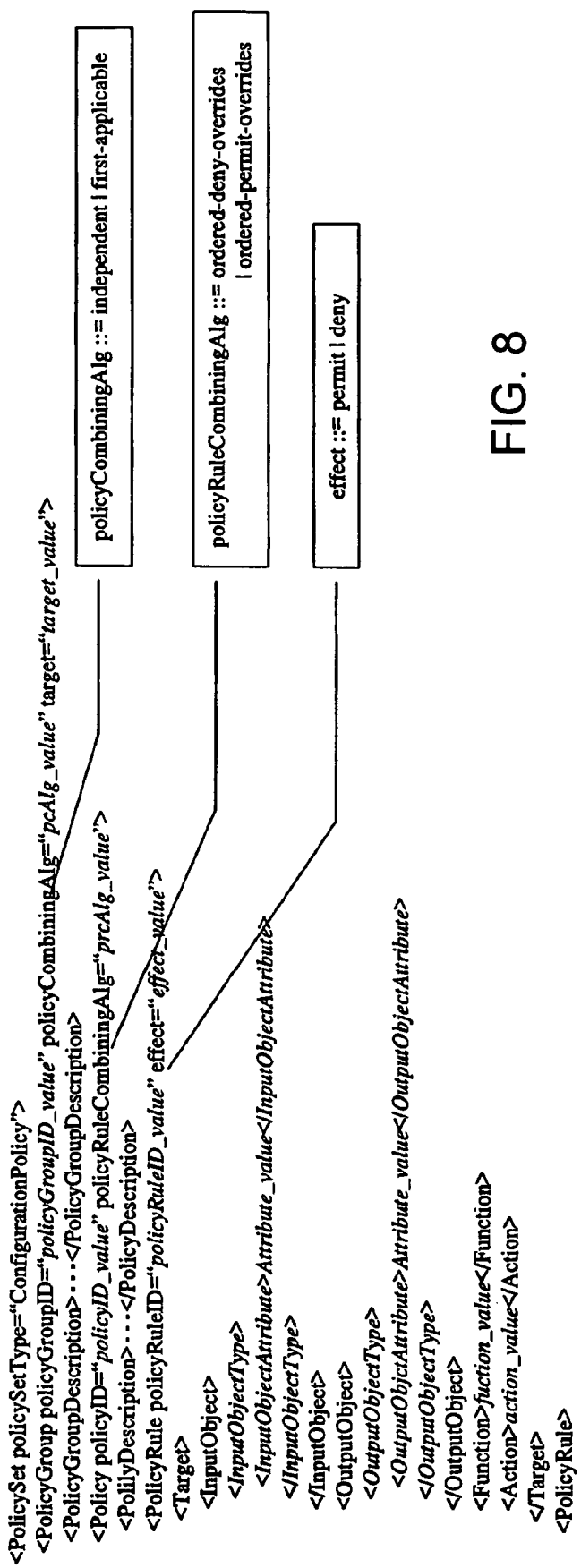
FIG. 8 is a diagram showing an example of a general-purpose security policy expressed by XML (extensible markup language)
Figure 9:
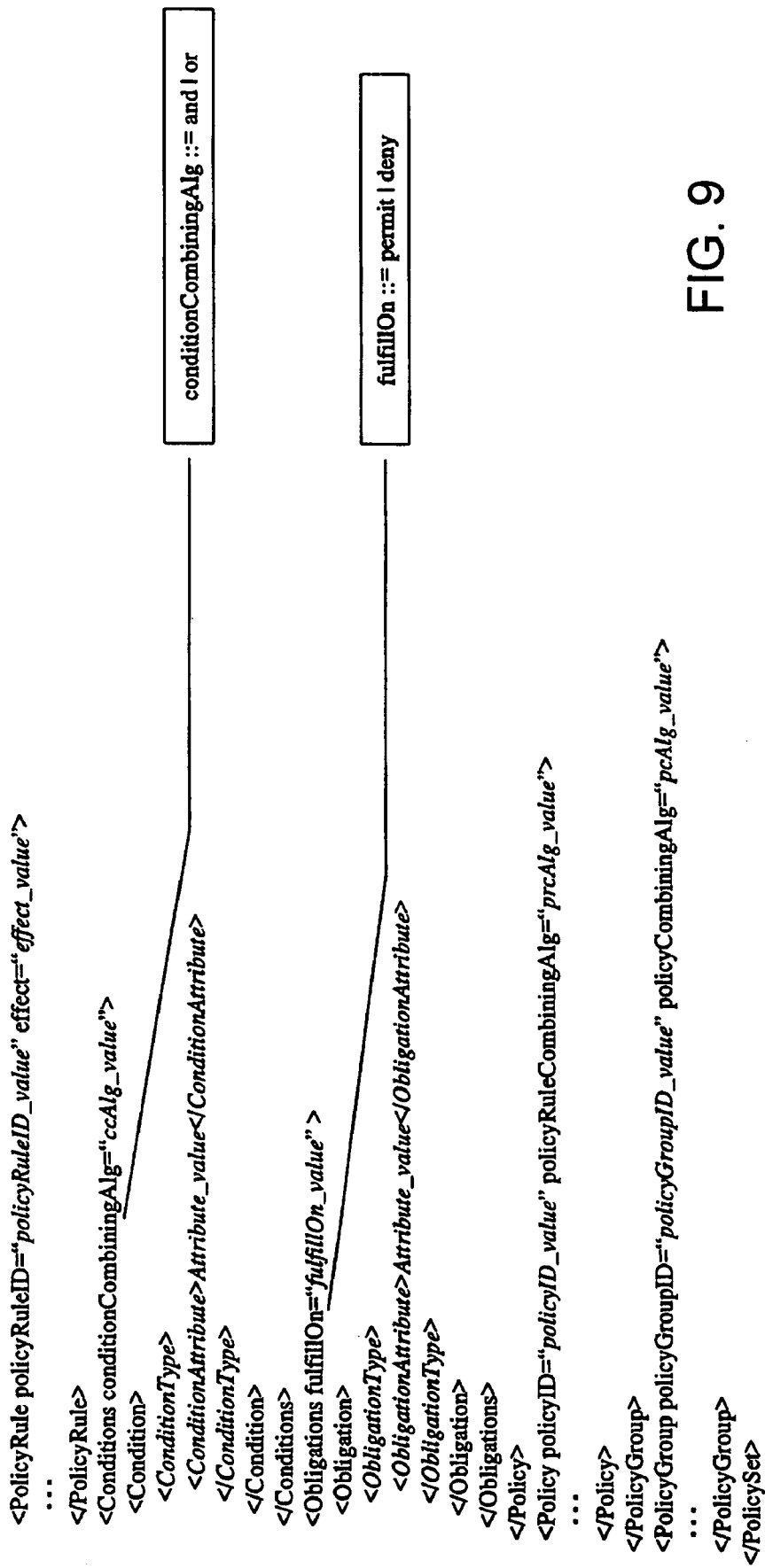
FIG. 9 is a diagram showing the example of the general-purpose security policy expressed by XML.

FIGS. 8 and 9 show an example of a general-purpose security policy expressed as an XML (extensible markup language) document. A description shown in FIG. 9 follows a description shown in FIG. 8. The format shown in FIGS. 8 and 9 is given by way of example only, and the format of a general-purpose security policy is not limited to the format shown in FIGS. 8 and 9.

A portion between a pair of <Policyset> tags represents a set of PolicyGroups corresponding to respective security devices having a common operation model as shown in FIG. 5. An attribute policySetType is a name representing the type of a security policy for the security devices having the common operation model. The general-purpose security policy generator 103 adds the attribute policySetType.

A portion between a pair of <PolicyGroup> tags represents a set of rules of each security device which has acquired setting information. An attribute policyGroupID is an identifier for distinguishing from other PolicyGroups, and is added by the general-purpose security policy generator 103 when it generates PolicyGroup. A value of the attribute policyGroupID may be determined using the name of the security device or name that is uniquely determined by the system administrator for the security device. An attribute target represents the type of the security device, and is added by the general-purpose security policy generator 103 when it generates PolicyGroup.

An attribute policyCombiningAlg represents a Policy combining algorithm for evaluating Policy, and is added by the general-purpose security policy generator 103 when it generates PolicyGroup. If the attribute policyCombiningAlg is "first-applicable", then it indicates that Policies included in PolicyGroup are evaluated successively from the first one. If the attribute policyCombiningAlg is "independent", then it indicates that no consideration is given to the order in which Policies included in PolicyGroup are evaluated.

A portion between a pair of <Policy> tags represents one rule included in the setting information of the security devices. The notation between the paired <Policy> tags represents one rule that "a packet sent from a source A to a destination B is permitted to pass", for example. An attribute policyID is an identifier for distinguishing from other Policies, and is added by the general-purpose security policy generator 103 when it generates Policy. A value which is easily recognizable by the system administrator may be assigned to a value of the attribute policyID which is, in the same manner as the case of the attribute policyGroupID.

An attribute policyRuleCombiningAlg represents a PolicyRule combining algorithm for evaluating PolicyRule that is described as a child element of Rule. The general-purpose security policy generator 103 determines a value of the attribute policyRuleCombiningAlg depending on the setting information. If the attribute policyRuleCombiningAlg is "ordered-deny-overrides", then it means that PolicyRules are evaluated successively, and when either PolicyRule is evaluated as "deny", Policy which is a set of these PolicyRules is evaluated as "deny". When all PolicyRules are evaluated as "permit", Policy is evaluated as "permit". If the attribute policyRuleCombiningAlg is "ordered-permit-overrides", then it means that PolicyRules are evaluated successively, and when either PolicyRule is evaluated as "permit", Policy which is a set of these PolicyRules is evaluated as "permit". When all PolicyRules are evaluated as "deny", Policy is evaluated as "deny".

PolicyRule represents a description with regard to a security function for expressing a rule. An attribute PolicyRuleID is an identifier for distinguishing from other Policies, and is added by the general-purpose security policy generator 103 when it generates PolicyRule. A value which is easily recognizable by the system administrator cab be assigned to a value of the attribute PolicyRuleID using the names of security functions that the security devices have. An attribute effect represents whether PolicyRule is applicable or not when an object to be evaluated and InputObject, described later on, described in PolicyRule agree with each other and this PolicyRule is evaluated as valid. If the attribute effect is "permit", then it indicates that PolicyRule is applicable, and if the attribute effect is "deny", then it indicates that PolicyRule is not applicable. The general-purpose security policy generator 103 determines whether the attribute effect is "permit" or "deny" depending on the setting information.

A portion between a pair of <Target> tags represents a combination of Function, InputObject, Action, and OutputObject which serves as PolicyRule. Function indicates a security function, InputObject an input to a security device, Action operation of a security device, and OutputObject an output from a security device.

InputObject has the type of an object as a child element and also has the attribute of the object as a grandchild element. An example of child element is Packet representing a packet. Examples of grandchild element are SrcIP representing the source IP address of a packet, SrcPort representing the source port of a packet, Protocol representing the protocol of a packet, DestIP representing the destination IP address of a packet, and DestPort representing the destination port of a packet.

A portion between a pair of <Function> tags represents a security function. A portion between a pair of <Action> tags represents an operation corresponding to the security function indicated by Function. If a packet filtering function is indicated by the portion between the paired <Function> tags, then "accept", "deny", "reject", or the like is described in the portion between the paired <Action> tags. "deny" indicates that a packet is merely to be discarded. "reject" indicates that a packet is to be discarded and the source is informed of the discard of the packet. A description that can be placed in the portion between the paired <Action> tags is not limited to "accept", "deny", "reject", or the like, but may be "drop", for example.

As with InputObject, OutputObject has the type and attribute of an object as elements.

A portion between a pair of <Condition> tags represents a condition for applying an individual rule. For example, a condition with regard to a time interval in which a rule is applicable, e.g., "from 8:30 AM to 5:00 PM", is described in the portion between the paired <Condition> tags. A portion between a pair of <Obligation> tags represents an obligation to be performed when a rule is applied. For example, an obligation such as "a log shall be recorded at the same time a rule is applied" is described in the portion between the paired <Obligation> tags. Details of Condition and Obligation are determined by the general-purpose security policy generator 103 depending on the setting information.

Figure 10:
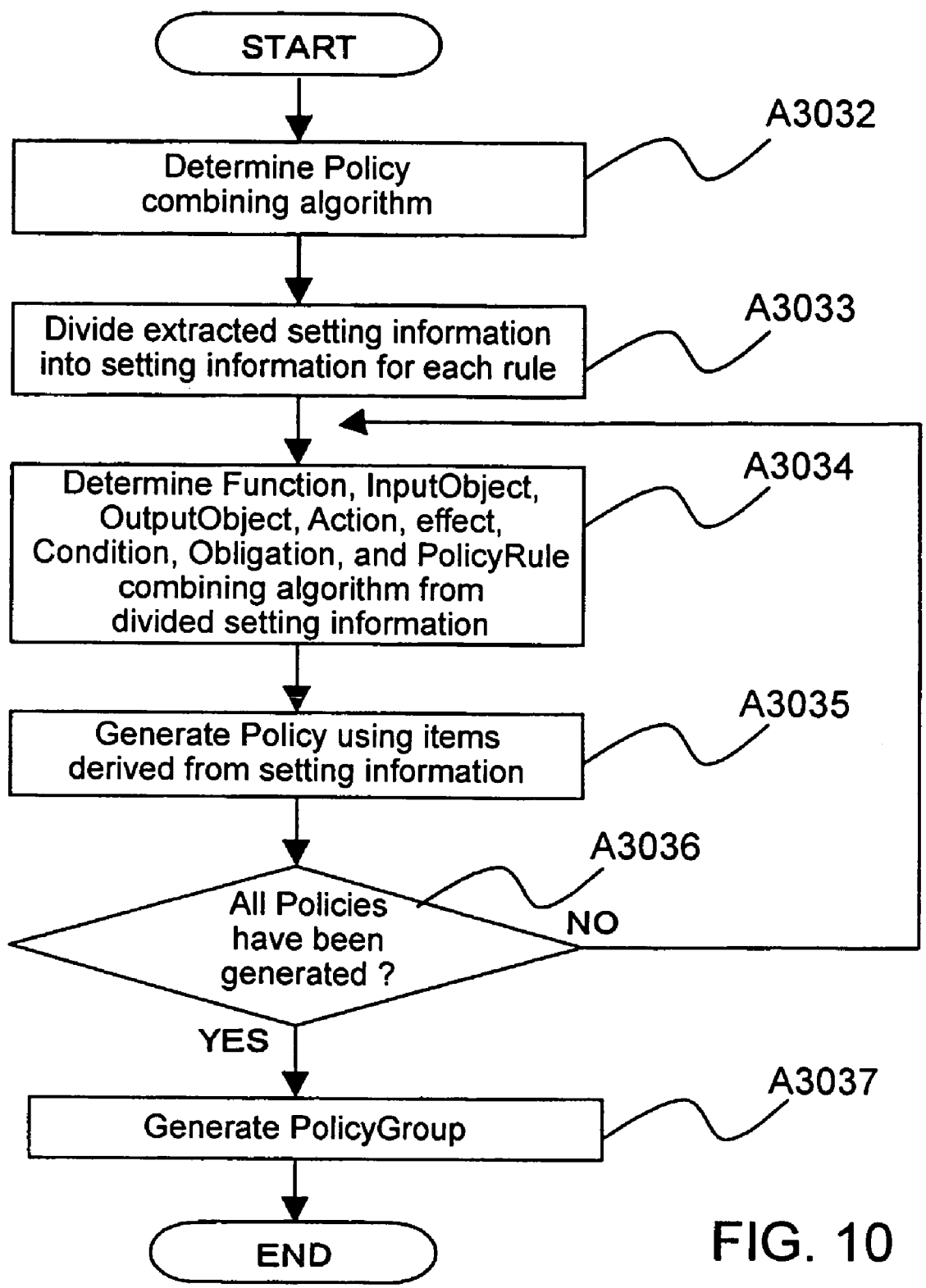
FIG. 10 is a flowchart illustrating an example of a general-purpose security policy generating process corresponding to one security device.

A general-purpose security policy generating process corresponding to one security device 130 in step S303 will be described below. FIG. 10 is a flowchart illustrating an example of the general-purpose security policy generating process in step S303.

As described above, each security policy generating subroutine 104 includes a parameter representing a Policy combining algorithm in case each rule which is set in the corresponding security device 130 is expressed as Policy. In step A3032, the general-purpose security policy generator 103 determines a Policy combining algorithm from the parameter in a security policy generating subroutine 104 that is called based on the security device information acquired in step A301. The security device information represents the name and version information of the security device, for example. Alternatively, the general-purpose security policy generator 103 may determine a Policy combining algorithm depending on the described details of the setting information, rather than the parameter.

Each security policy generating subroutine 104 also includes knowledge with regard to descriptive specifications for setting information of the corresponding security device. In step A3033, based on the knowledge with regard to descriptive specifications for setting information included in a called security policy generating subroutine 104, the general-purpose security policy generator 103 divides setting information extracted from a security device 130 corresponding to the security policy generating subroutine 104, into setting information for each rule (each Policy).

Then, in step A3034, the general-purpose security policy generator 103 determines Function, InputObject, OutputObject, Action, effect, Condition, Obligation, and a PolicyRule combining algorithm from the individual setting information divided in step A3033, using the knowledge with regard to descriptive specifications for setting information. If there are descriptions with regard to a plurality of security functions in the setting information divided for each rule in step A3033, then the general-purpose security policy generator 103 derives a combination of Function, InputObject, OutputObject, Action, and effect for the description with regard to each security function.

Then, in step A3035, the general-purpose security policy generator 103 generates one Policy section of a general-purpose security policy in a descriptive format not depending on the security device, using the items (Function, InputObject, OutputObject, Action, effect, Condition, Obligation, and a PolicyRule combining algorithm) derived from the setting information inherent in the security device in step A3034. At this time, the general-purpose security policy generator 103 describes a combination of Function, InputObject, OutputObject, Action, and effect as PolicyRule in generated Policy. If there are derived a plurality of combinations of Function, InputObject, OutputObject, Action, and effect, then the general-purpose security policy generator 103 describes a plurality of PolicyRules in generated Policy. The general-purpose security policy generator 103 combines PolicyRule, a PolicyRule combining algorithm, and Condition and Obligation, if they are derived, into one Policy.

In step A3036, the general-purpose security policy generator 103 determines whether Policy has been generated from each setting information divided in step A3033. If there is divided setting information from which Policy has not been generated, then the general-purpose security policy generator 103 executes step A3034 and step A3035 on that divided setting information. If it is judged that Policy has been generated from each divided setting information, then the general-purpose security policy generator 103 combines, in step A3032, all generated Policies and the Policy combining algorithm determined in step A3032 into PolicyGroup. This generated PolicyGroup represents setting information of one security device 130 in a format not depending on the security device.

If control goes to step A302 and another security policy generating subroutine 104 is called, then PolicyGroup corresponding to another security device is generated according to the called other security policy generating subroutine 104. Newly generated PolicyGroup is added to the portion between a pair of <PolicySet> tags as shown in FIGS. 8 and 9.

According to a general-purpose security policy, as described above, the operation of security devices having the common operation model shown in FIG. 5 is expressed by PolicyRule comprising a combination of Function, InputObject, OutputObject, and Action for each function. By defining the types of InputObject, OutputObject, and Action that are valid for each Function, it is possible to generally express the operation of security devices having the same Function according to a common format.

By expressing a plurality of PolicyRules put together by a PolicyRule combining algorithm as Policy, rules in setting information expressed as a combination of a plurality of security functions can generally be expressed. If there are plurality of Policies in one PolicyGroup, then information as to whether there is an order between those Policies or not can also be expressed using a PolicyRule combining algorithm.

The general-purpose security policy generator 103 determines details of the items (Function, InputObject, OutputObject, Action, effect, Condition, Obligation, and a PolicyRule combining algorithm etc.) described in a general-purpose security policy based on the descriptive specifications for each security device, according to the security policy generating subroutine 104 for each security device. Then, using those items, the general-purpose security policy generator 103 generates a general-purpose security policy. Therefore, it is possible to generate a general-purpose security policy having general expressions from the setting information expressed in a descriptive format inherent in an individual security device.

Figures 11, 12:
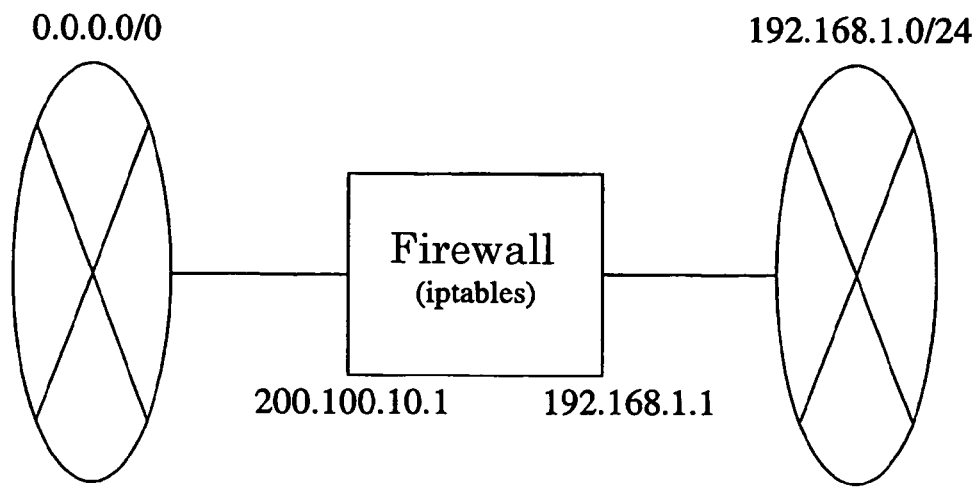
FIG. 11 is a diagram showing an example of installation of a firewall as a security device.
FIG. 12 is a diagram showing an example of setting information representative of the setting of iptables.

A specific example of the generation of PolicyGroup will be described below. FIG. 11 shows an example of a firewall installation as a security device 130. It is assumed that a firewall with software iptables installed therein is set up at the boundary between a communication network providing a LAN system and the Internet. The communication network is identified by an IP address 192.168.1.0/24. In the description which follows, communication networks and devices are accompanied by their IP addresses, if necessary, to distinguish from other communication networks and devices. "iptables" refers to packet-filtering firewall software run on Linux (the name of an OS (operating system)), and has a packet filtering function as a major function. Packet filtering is an effective process for protecting a communication network from unauthorized access, and is performed in a machine which relays data packets, for checking all received data packets and permitting or denying the passage of the data packets based on filtering rules. Each of the rules defines some elements with respect to data packets, and the data packets are processed depending on these elements. The elements include IP addresses and ports of sources and destinations of the data packets. By setting a plurality of rules, it is possible to permit the passage of data packets sent from a certain source and deny the passage of data packets sent from another source. Packet filtering is performed based on the order of these rules. Specifically, when a data packet arrives, the rules are evaluated successively from the first one, and the first rule corresponding to the data packet is applied to process the data packet as indicated by the rule.

FIG. 12 shows setting information representative of the setting of iptables installed in the firewall shown in FIG. 11. If the setting information extracted from a firewall is the setting information shown in FIG. 12, then a specific example of a process for generating PolicyGroup corresponding to the firewall, that is, the process shown in FIG. 10, will be described below.

It is assumed that in step A302 shown in FIG. 4, a security policy generating subroutine corresponding to the firewall shown in FIG. 11 is called based on the version information (not shown in FIG. 12) of iptables included in the setting information. The security policy generating subroutine contains knowledge shown in FIG. 13, for example, as knowledge with regard to the descriptive specifications for the setting information of the firewall shown in FIG. 11. The knowledge shown in FIG. 13 includes notations included in a rule in the setting information, the meanings of the notations, and information as to how the notations included in the rules should be described in a general-purpose security policy. According to "notations" shown in FIG. 13, notations having the same meaning are separated by ",", and arranged side by side. For example, a notation "-P" and a notation "--policy" in a rule have the same meaning.

The knowledge with regard to the descriptive specifications shown in FIG. 13 will be described below. If a notation "-t" is omitted from the description of a meaning corresponding to the notation "-t" shown in FIG. 13, then it is indicated that the meaning represents a default packet filtering rule. In the general-purpose security policy, it is indicated that packet_filtering is described in the item Function in PolicyRule corresponding to the packet filtering function.

Furthermore, the knowledge shown in FIG. 13 indicates that a rule including a notation "-P" is a default rule. A default rule is a rule to be applied where other rules are not applied. It is also indicated that Policy corresponding to this rule is described at the end of Policy on packet filtering. It is indicated that a rule including a notation "-A" is a rule with regard to the packet filtering function, and described as Policy on packet filtering.

It is indicated that if a rule includes a notation "-p", a description following the notation "-p" represents a protocol. It is also indicated that a Protocol attribute of a Packet object is described depending on the description of the protocol following the notation "-p".

It is indicated that if a rule includes a notation "-s", a description following the notation "-s" represents a source IP address, and the source IP address is described as an SrcIP attribute of a Packet object. Similarly, it is indicated that if a rule includes a notation "-d", a description following the notation "-d" represents a destination IP address, and the destination IP address is described as an DestIP attribute of a Packet object.

It is indicated that if a rule includes a description "-j ACCEPT", it means permitting a packet to pass, and Action of PolicyRule is described as "accept". It is also indicated that if a rule includes a description "-j DROP", it means inhibiting a packet from passing, and Action of PolicyRule is described as "Deny".

The knowledge with regard to the descriptive specifications shown in FIG. 13 is given by way of example only, and may include other knowledge. The knowledge with regard to the descriptive specifications varies from security policy generating subroutine to security policy generating subroutine.

When generating PolicyGroup corresponding to a firewall, the general-purpose security policy generator 103 which has called a security policy generating subroutine corresponding to the firewall shown in FIG. 11 first determines a Policy combining algorithm in step A3032. In the present example, since each rule includes a description "iptables", the general-purpose security policy generator 103 judges that each rule contained in the setting information shown in FIG. 12 is a rule of iptables. Furthermore, since each rule does not include a description "-t", the general-purpose security policy generator 103 judges that each rule is a packet filtering rule. If the Policy combining algorithm is "first-applicable", then it is prescribed in the security policy generating subroutine, and the general-purpose security policy generator 103 judges that the Policy combining algorithm is "first-applicable" according to the prescription. "first-applicable" means that when Policies are applied, they have to be applied in the order in which they are described.

Then, the general-purpose security policy generator 103 judges, in step A3033, that the setting information extracted from the firewall comprises three packet filtering rules, using the knowledge with regard to the descriptive specifications, and divides the setting information into three rules. Though not shown in FIG. 13, it is assumed that there exists knowledge with regard to the descriptive specifications, that "a rule expressed by one line starting with 'iptables' represents one packet filtering rule in iptables". In the present example, according to this knowledge, the setting information shown in FIG. 12 is divided into three rules.

Then, the general-purpose security policy generator 103 determines, in step A3034, the items included in PolicyRule, i.e., Condition, Obligation, and a PolicyRule combining algorithm, from the setting information divided into each rule, based on the knowledge with regard to the descriptive specifications shown in FIG. 13.

The rule in the first line can be judged as a default rule as it contains a "-P" option. This rule corresponds to Policy at the end of PolicyGroup as a rule of lowest priority, and is reserved.

Then, in step A3036, the general-purpose security policy generator 103 judges that there is a rule with no Policy generated yet. Control goes to step A3034 to process the rule in the second line.

At this time, the general-purpose security policy generator 103 which operates according to the security policy generating subroutine corresponding to the firewall shown in FIG. 11 generates a general-purpose security policy for packet filtering. Therefore, the general-purpose security policy generator 103 turns InputObject of PolicyRule into the Packet type, and sets Action to either one of "accept", "deny", and "reject" depending on the description of the rule. According to iptables, if packets are permitted to pass, then OutputObject is omitted as the details of OutputObject as an output are exactly the same as the details of InputObject as an input. For packet filtering, since Action on Packet represented by InputObject is executed at all times, effect is set to "permit".

Each of the rules shown in FIG. 12 is represented by only a description with regard to a packet filtering function, and does not contain descriptions with regard to a plurality of security functions. Consequently, only one PolicyRule is contained in Policy for each rule. In the present example, the PolicyRule combining algorithm is set to "ordered-deny-overrides" according to the security policy generating subroutine. If a packet which agrees with a packet represented by InputObject is detected when iptables is in operation, effect is always set to "permit". Policy having PolicyRule including its InputObject is evaluated as "permit", performing Action of PolicyRule.

In step A3034 for the rule in the second line, the general-purpose security policy generator 103 determines, as attributes of packets which are InputObject as an input to iptables, that the protocol is tcp (transmission control protocol) from the "-p" option, that the source IP address is 0.0.0.0/0 from the "-s" option, that the destination IP address is 192.168.1.248/29 from the "-d" option, and that the action is DROP from the "-j" option. This action is expressed as "deny" according to the general-purpose security policy.

In next step A3035, the general-purpose security policy generator 103 describes the above items according to the format shown in FIGS. 8 and 9 to generate the Policy section corresponding to the rule in the second line. As the rule in the second line contains no description of rule applying conditions and obligations, the general-purpose security policy generator 103 does not determine the items Condition and Obligation in step A3034, and does not include Condition and Obligation in Policy in step A3035. This also holds true for the other lines.

In step A3036, the general-purpose security policy generator 103 judges that there is a rule with no Policy generated yet. Control goes to step A3034 to process the rule in the third line. The general-purpose security policy generator 103 executes steps A3034, A3035 for the rule in the third line in the same manner as for the rule in the second line.

In step A3036, the general-purpose security policy generator 103 judges that there is the reserved rule in the first line. Control goes back to step A3034 for processing the rule in the first line. According to the default rule in the first line, since a protocol, a source address, and a destination address as attributes of packets are omitted, the omitted items are made up for by predetermined default values based on the knowledge of the descriptive specifications for the setting information. The knowledge of the descriptive specifications shown in FIG. 13 is silent about what default values are used to make up for items omitted from the rules. However, default values to be applied to omitted items are prescribed in the knowledge of the descriptive specifications. After having judged the items from the rule in the first line, the general-purpose security policy generator 103 generates a Policy section corresponding to the first line in step A3035. Since the rule in the first line including the notation "-P" is reserved and corresponding Policy is finally generated, Policy corresponding to the rule in the first line is described at the end of each Policy.

In step S3036, the general-purpose security policy generator 103 judges that Policy has been generated from each of the divided information. Then, control goes to step A3037. In step A3037, the general-purpose security policy generator 103 combines each Policy generated for each rule and the Policy combining algorithm "first-applicable" judged in step A3032, generating PolicyGroup. At this time, the general-purpose security policy generator 103 generates PolicyGroup according to the format shown in FIGS. 8 and 9.

According to the above process, the setting information shown in FIG. 12 can be expressed as a general-purpose security policy in the format shown in FIGS. 8 and 9. This general-purpose security policy is illustrated in FIG. 14. A portion between a pair of <PolicyGroup> tags shown in FIG. 14 represents the general-purpose security policy generated from the setting information shown in FIG. 12.

According to PolicyGroup shown in FIG. 14, since Policies (packet filtering rules) are evaluated successively from the first one, "first-applicable" is indicated in the attribute policyCombiningAlg of PolicyGroup. The indication of "first-applicable" is done by the general-purpose security policy generator 103 in step A3037.

The PolicyGroup shown in FIG. 14 contains three Policies corresponding to the respective rules shown in FIG. 12. Each Policy includes one PolicyRule describing a packet filtering function. In the child element Function of each PolicyRule, packet_filtering which represents a packet filtering function is indicated. Packet which represents a packet is indicated in InputObject. A source IP address, a protocol, and a destination address which correspond to each rule are described in child elements of Packet. According to the general-purpose security policy, therefore, minimum information required to describe a packet filtering rule is described in a unified fashion and hence generally expressed independently of a descriptive format inherent in each security device for performing packet filtering.

According to the first embodiment described above, because a general-purpose security policy is constructed from actual setting details, i.e., setting information, of security devices that are components of a network system, the general-purpose security policy can be constructed and a security status of the network system can be grasped, accurately within a short period of time. Even if there are items omitted from the setting information, those omitted items are made up for by default values and described according to the general-purpose security policy, the burden on the system administrator is reduced.

For constructing a general-purpose security policy, the system administrator is only required to indicate a security device (see step A201). Consequently, a general-purpose security policy can be constructed essentially without the need for human intervention. After a security device is indicated, a general-purpose security policy can automatically be generated. If the setting information extractor 101 searches for a security device 130 without the need for an indication from the system administrator, then a general-purpose security policy can be constructed without human intervention.

According to the present embodiment, inasmuch as a security policy is constructed based on actual setting information, it is possible to construct a general-purpose security policy without errors and omissions which would be caused due to assumptions and illusions that the operator such as the system administrator or the like may have.

Second Embodiment

Figure 15:
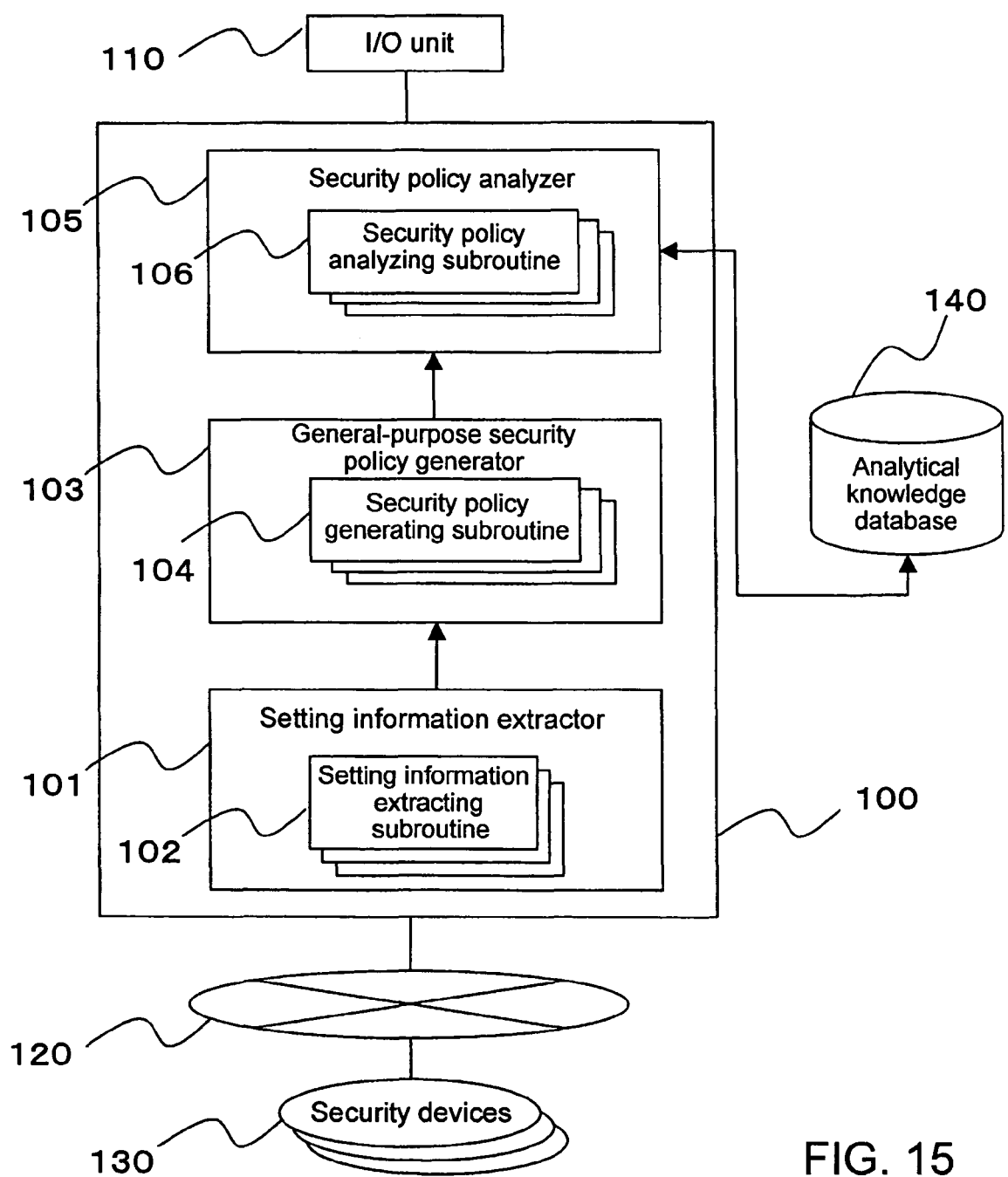
FIG. 15 is a block diagram illustrating a security policy management system according to a second embodiment of the present invention.

A security policy management system according to a second embodiment of the present invention will be described below. FIG. 15 shows the security policy management system according to the second embodiment. Those parts of the security policy management system according to the second embodiment shown in FIG. 15 which are identical to those of the security policy management system according to the first embodiment shown in FIG. 1 are denoted by identical reference characters, and will not be described in detail below. Those parts of the security policy management system according to the second embodiment shown in FIG. 15 which are identical to those of the security policy management system according to the first embodiment shown in FIG. 1 operate in the same manner as those of the security policy management system according to the first embodiment.

The security policy management system shown in FIG. 15 has an analytical knowledge database 140. The data processing apparatus 100 includes a security policy analyzer 105 in addition to the setting information extractor 101 and the general-purpose security policy generator 103 which are described in the first embodiment. The security policy analyzer 105 is realized by a CPU that operates according to a program, for example. The program includes, as a subroutine, at least one security policy analyzing subroutine 106. Each security policy analyzing subroutine 106 corresponds to an individual security function performed by each security device 130. For example, a security policy analyzing subroutine 106 corresponds to a packet filtering function, and another security policy analyzing subroutine 106 corresponds to another security function. Each security policy analyzing subroutine 106 is stored in advance in a storage device (not shown in FIG. 15) of the data processing apparatus 100.

The security policy analyzer 105 refers to the analytical knowledge database 140 and analyzes a general-purpose security policy that is generated by the general-purpose security policy generator 103. The analyzing modes differs each other for respective security functions. One of the analyzing modes is summarization. Summarization means summarizing details derived from a plurality of rules described as Policy in a general-purpose security policy. As described later on, the analyzing mode for a packet filtering function is summarization. For analyzing a security function, the security policy analyzer 105 calls a security policy analyzing subroutine 106 corresponding to the security function. Then, the security policy analyzer 105 analyzes the security function according to the called security policy analyzing subroutine 106.

The analytical knowledge database 140 information used for analysis. The information stored in the analytical knowledge database 140 is referred to when the security policy analyzer 105 analyzes a security function.

Figure 16:
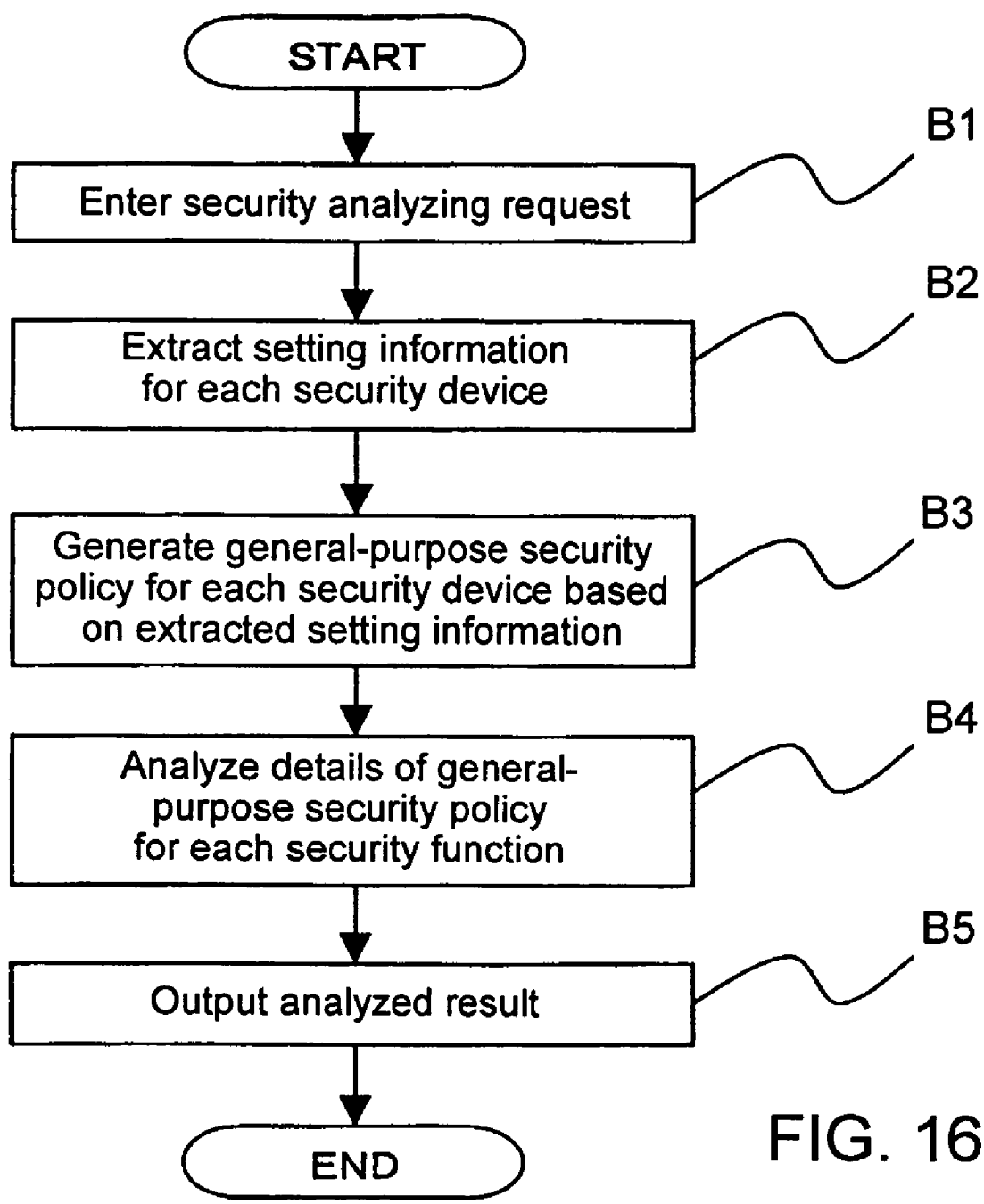
FIG. 16 is a flowchart illustrating an example of an operation sequence of the security policy management system shown in FIG. 15.

Operation of the security policy management system according to the second embodiment will be described below with reference to FIG. 16.

In step B1, the system administrator, for example, enters a security analyzing request through the I/O unit 110 into the data processing apparatus 100. In step B2, the setting information extractor 101 calls a setting information extracting subroutine 102 for at least one security device 130 that is connected to the communication network 120, and extracts and collects setting information from the security device 130 according to the setting information extracting subroutine 102. Then, in step B3, the general-purpose security policy generator 103 calls a security policy generating subroutine 104 corresponding to the security device 130 from the setting information that is extracted and collected in step B2, and generates a general-purpose security policy for the security device 130 according to the security policy generating subroutine 104. The processing in steps B1 to B3 described above is the same as the processing in steps A1 to A3 in the first embodiment.

In step B4, the security policy analyzer 105 refers to the analytical knowledge database 140 and analyzes a general-purpose security policy that is generated by the general-purpose security policy generator 103, for each security function. Thereafter, in step B5, the security policy analyzer 105 outputs an analyzed result from the I/O unit 110, which presents the analyzed result to the system administrator. For example, the analyzed result is displayed on the display device.

FIGS. 17 to 19 show examples of information stored in the analytical knowledge database 140. The analytical knowledge database 140 stores information indicative of what objects can be processed and what actions can be taken by each security function. FIG. 17 shows an example of such information. Specifically, FIG. 17 shows information representing, for each security function (Function), types (e.g., Packet type, etc.) of objects that the Function deals with, attributes (e.g., SrcIP, DestIP, Protocol, etc.), and kinds of actions (e.g., accept, drop, reject, etc.) that are held in association with each other.

The analytical knowledge database 140 also stores information indicative of what values can be taken by attributes ancillary to objects. FIG. 18 shows an example of such information. For example, the information shown in FIG. 18 indicates that values which can be taken by PortNumber, i.e., an attribute of an object, are integers ranging from 0 to 65535. The information shown in FIG. 18 also indicates ranges of values that can be taken by other attributes.

The analytical knowledge database 140 also stores information indicative of the relationship between objects and between attributes. FIG. 19 shows an example of information indicative of the relationship between attributes. In the example shown in FIG. 19, the relationship between IPAddress and PortNumber is indicated by such information that "one IP address has port numbers ranging from 0 to 65535". Furthermore, the relationship between networkAddress and IPAddress is indicated by such information that "NetworkAddress represents a set of IP addresses ranging from an IP address where as many bits from the most significant bit (MSB) as the number of bits of a netmask are fixed and all the remaining bits are 0, to another IP address where as many bits from the most significant bit as the number of bits of the netmask are fixed and all the remaining bits are 1".

The information shown in FIGS. 17 to 19 is an example of the information stored in the analytical knowledge database 140, and the information stored in the analytical knowledge database 140 is not limited to the information shown in FIGS. 17 to 19. When the security policy analyzer 105 performs an analysis, the information stored in the analytical knowledge database 140 may not necessarily be referred to in its entirety, but may be referred to in part. The information that is referred to depends on the analyzing mode that is performed, i.e., the type of a security function to be analyzed. For analyzing a new security function, information to be referred to in an analysis of the new security function may be added and stored in the analytical knowledge database 140.

The analyzing process performed in step B4 will be described in detail below with reference to FIG. 20. When a general-purpose security policy is generated from the setting information in step B3, the security policy analyzer 105 acquires information identifying the security function, i.e., security function information, such as the name of the security function, from the general-purpose security policy in step B401. In the general-purpose security policy, the security function information is described in the portion between a pair of <Function> tags. Therefore, the security policy analyzer 105 may acquire the information described in the portion between the paired <Function> tags. For example, if the general-purpose security policy shown in FIG. 14 is involved, the security policy analyzer 105 acquires packet_filtering described in the portion between the paired <Function> tags. Based on the acquired information, it is possible to identify a security function referred to as a packet filtering function.

Then, in step B402, the security policy analyzer 105 retrieves information from the analytical knowledge database 140 based on the security function information acquired in step B401. The information to be retrieved from the analytical knowledge database 140 differs depending on the information acquired in step B401. If the information packet_filtering is acquired in step B401, then the security policy analyzer 105 retrieves information indicative of the relationship between networkAddress and IPAddress shown in FIG. 19.

Then, in step B403, the security policy analyzer 105 acquires the information retrieved in step B402 from the analytical knowledge database 140. If the information packet_filtering is acquired in step B401, then the security policy analyzer 105 acquires such information that "NetworkAddress represents a set of IP addresses ranging from an IP address where as many bits from the most significant bit as the number of bits of a netmask are fixed and all the remaining bits are 0, to another IP address where as many bits from the most significant bit as the number of bits of the netmask are fixed and all the remaining bits are 1." from the analytical knowledge database 140 in step B403. Since the information to be retrieved from the analytical knowledge database 140 differs depending on the security function information acquired in step B401, the information acquired in step B403 differs depending on the security function information. Depending on the type of the security function information, the security policy analyzer 105 may acquire information indicative of the operation model of the security function and what objects can be handled by the operation model.

Then, in step B404, the security policy analyzer 105 calls a security policy analyzing subroutine 106 corresponding to the security function identified from the security function information, and analyzes the already generated general-purpose security policy, using the information acquired in step B403, according to the security policy analyzing subroutine 106.

Then, in step B405, the security policy analyzer 105 determines whether each security function information acquired in step B401 has been processed in steps B402 to B404 or not. If there is a security function not yet processed in steps B402 to B404 which is identified from each security function information, then the processing from step B402 is repeated. If all security functions have been processed in steps B402 to B404, then analyzing process performed in step B4 is put to an end.

The analyzing process performed in step B404 differs from security function to security function. An analysis (summarization) on a packet filtering function, for example, as a policy analysis will be described below. The general-purpose security policy shown in FIG. 14, for example, contains three Policies with regard to packet filtering. By referring to these three Policies, it is possible to grasp what packets are permitted to pass and what packets are inhibited from passing. Details of a general-purpose security policy are determined by comprehensively judging the order of Policies, the inclusion relationship of source regions or destination regions, actions (to permit packets to pass and inhibit packets from passing), and the like. If the three Policies are put together to intuitively grasp what packets are permitted to pass and what packets are inhibited from passing, then details of a general-purpose security policy can more easily be grasped. According to the second embodiment, a general-purpose security policy is analyzed to allow the details thereof to be more easily grasped.

Figure 21:
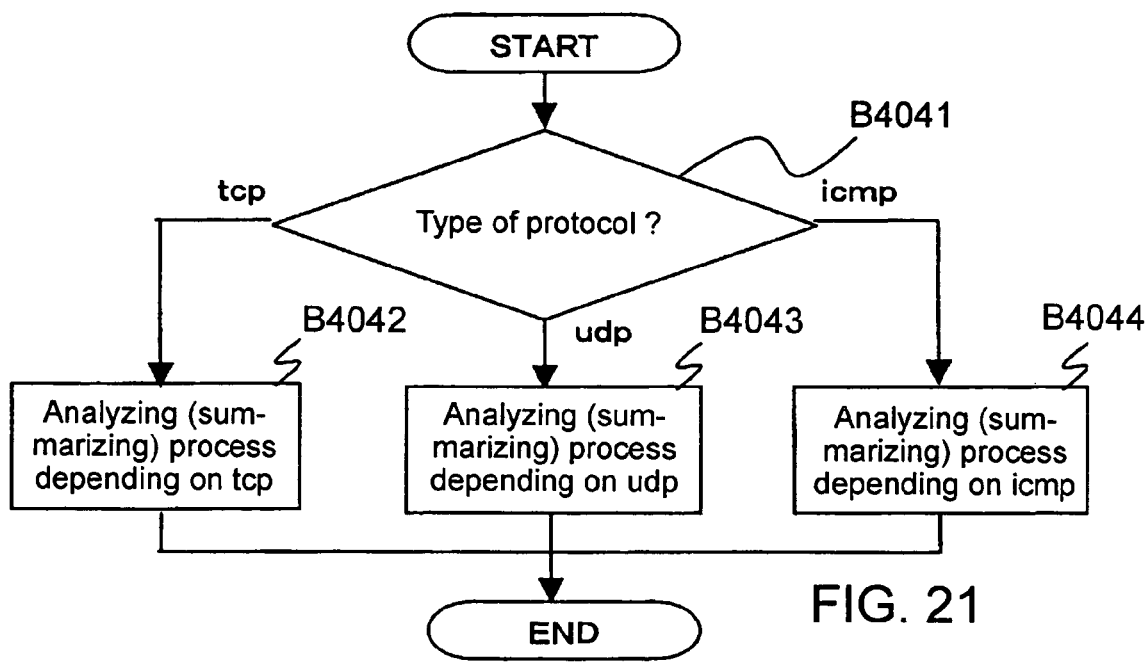
FIG. 21 is a flowchart illustrating an example of an analyzing process depending on a packet filtering function.

FIG. 21 shows an example of analyzing processes for a packet filtering function. In step B4041, the security policy analyzer 105 refers to the general-purpose security policy and determines a protocol to be processed by a packet filtering function. The security policy analyzer 105 may determine a protocol based on the attribute Protocol described in InputObject in PolicyRule. If the attribute Protocol is "tcp", then the security policy analyzer 105 performs an analyzing process depending on tcp (transmission control protocol) in step B4042. If the attribute Protocol is "udp", then the security policy analyzer 105 performs an analyzing process depending on udp (user datagram protocol) in step B4043. If the attribute Protocol is "icmp", then the security policy analyzer 105 performs an analyzing process depending on icmp (Internet control message protocol) in step B4044.

Figures 22, 23:
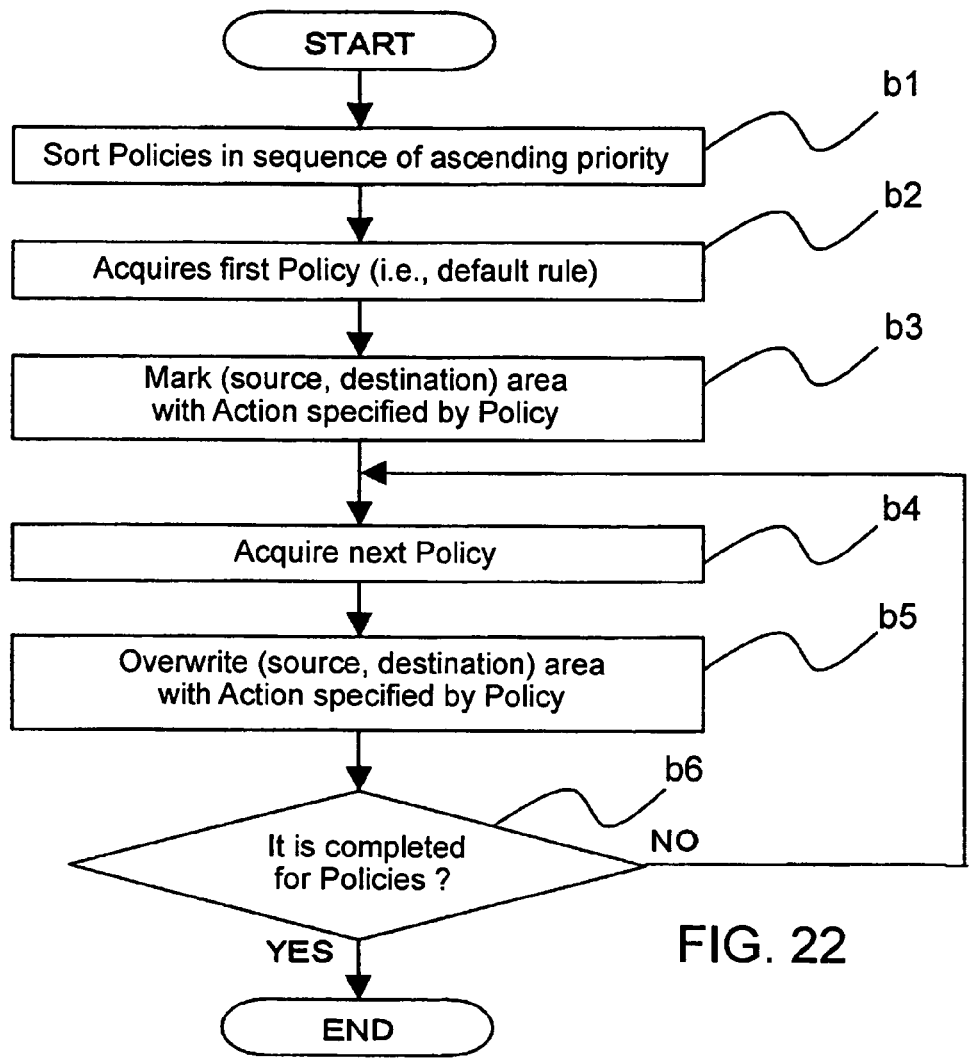
FIG. 22 is a flowchart illustrating an example of an analyzing process corresponding to tcp (transmission control protocol)
FIG. 23 is a diagram showing an example of setting information of a security device having a packet filtering function.

FIG. 22 shows the analyzing process depending on tcp. In step b1, the security policy analyzer 105 sorts Policies corresponding to a packet filtering rule successively in a sequence of ascending priority, in one PolicyGroup contained in the general-purpose security policy.

Usually, packet filtering policies are arranged such that the policy at the beginning is of highest priority and the policy at the end is of lowest priority. For example, if a policy for permitting a packet to pass is followed by a policy for inhibiting an identical packet from passing, then the preceding policy is evaluated first and the packet is permitted to pass. Packet filtering policies usually include a default policy for indicating an action for packets which have not matched any of the policies. The default policy is a policy of lowest priority. When a plurality of Policies corresponding to the rules of a packet filtering function are generated in step B3, the Policy corresponding to the default rule is described at the end of the packet filtering Policy, as described above with respect to the first embodiment. The order of other Policies in the PolicyGroup is determined according to the order of rules described in the setting information. According to the present embodiment, the security policy analyzer 105 sorts Policies such that the Policy corresponding to the default rule described at the end in the PolicyGroup comes first and the Policy described at first (i.e., the Policy of highest priority) comes last.

Figure 24:
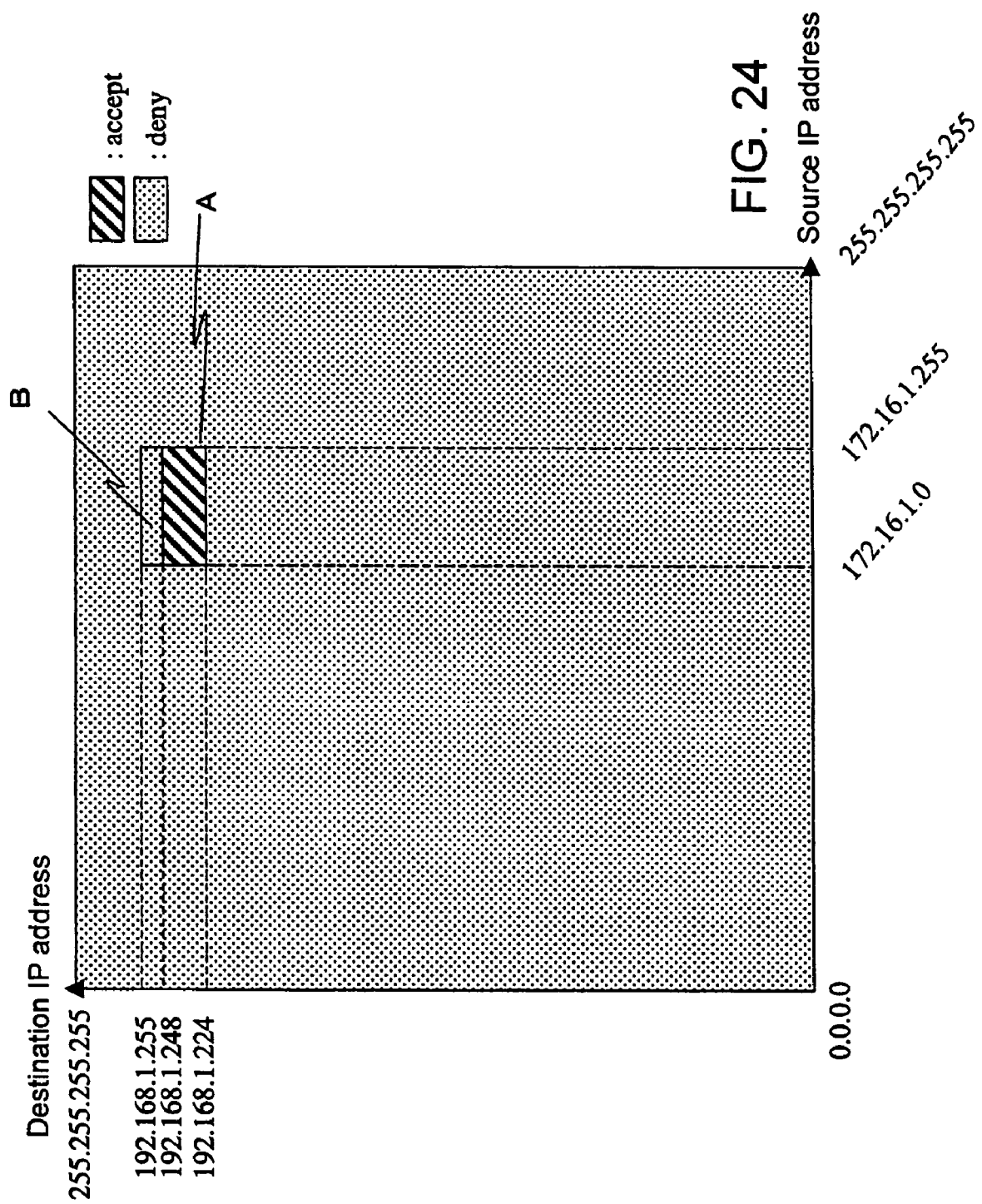
FIG. 24 is a diagram showing an example of two-dimensional plane data displayed as an analyzed result.
Figures 25, 26:
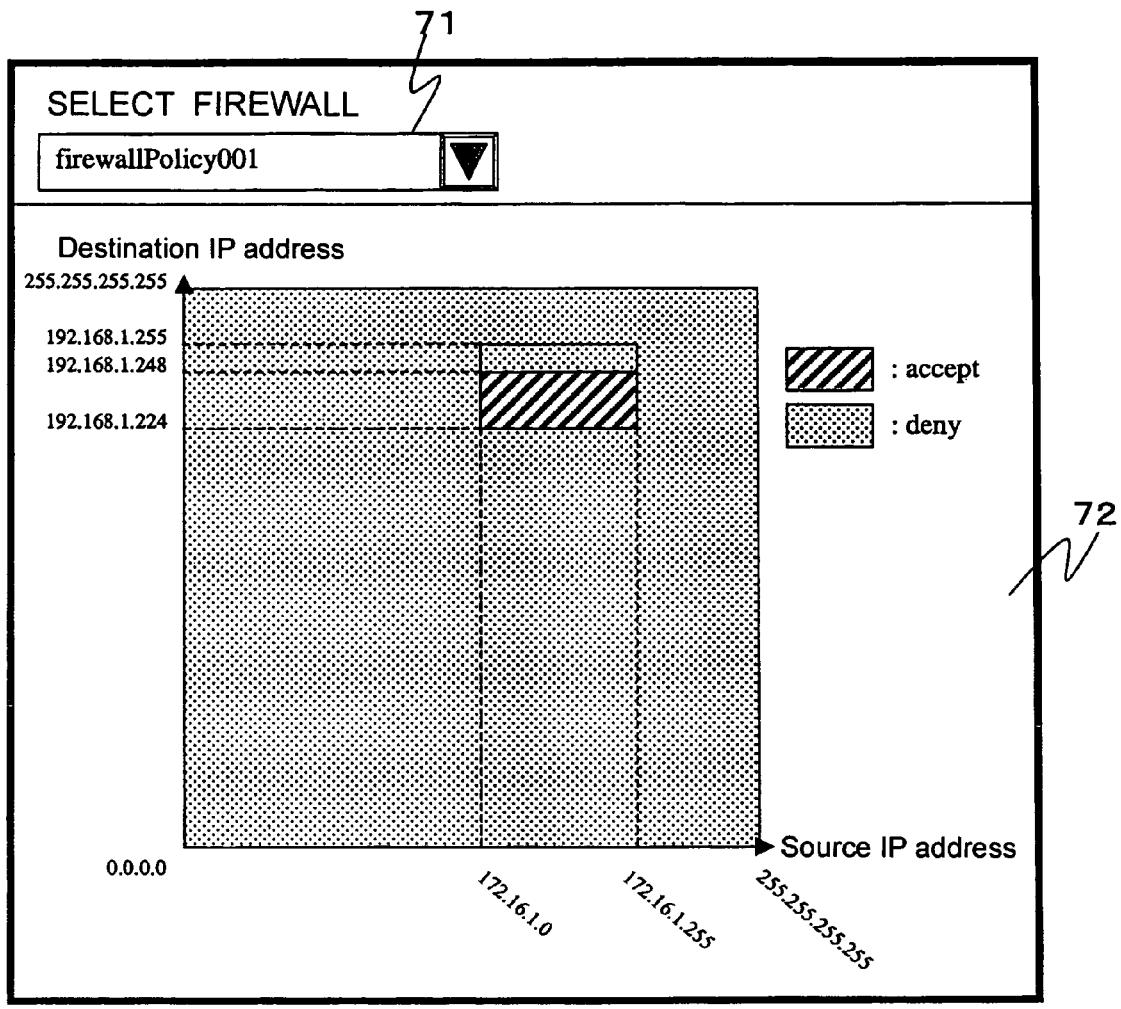
FIG. 25 is a view showing an example of a user interface for displaying an analyzed result.
FIG. 26 is a diagram showing an example of setting information of a security device having a packet filtering function based on icmp (internet control message protocol)

After sorting, the security policy analyzer 105 acquires the first Policy, i.e., the Policy corresponding to the default rule, in step b2. Then, the security policy analyzer 105 generates data representing a two-dimensional plane having a horizontal axis representative of source IP addresses and a vertical axis representative of destination IP addresses. The data representing such a two-dimensional plane will hereinafter be referred to as two-dimensional plane data. Since the scope of IP addresses is limited, an area represented by two-dimensional plane data is rectangular in shape. Examples of images of two-dimensional plane data displayed by the display device are shown in FIGS. 24 and 25. In step b3, the security policy analyzer 105 assigns details of Action of the first Policy acquired in step b2 to an area that is specified by source and destination IP addresses of the acquired first Policy. Specifically, it is assumed that first Policy indicates the entire scope of source IP addresses, the entire scope of destination IP addresses, and "deny" as Action. In this case, the security policy analyzer 105 assigns "deny" to the area represented by the two-dimensional plane data.

Then, in step b4, the security policy analyzer 105 acquires next Policy according to the sorted sequence. In step b5, the security policy analyzer 105 assigns details of Action of the Policy acquired in step b4 to an area that is specified by source and destination IP addresses of the Policy acquired in step b4. While the details of Action of the preceding Policy have been assigned to that area, the details of Action of the Policy acquired in step b4 are assigned to the area in step b5, i.e., overwrite the previously assigned details.

In step b6, the security policy analyzer 105 determines whether the final Policy after being sorted has been processed by steps b4, b5 or not. If the final Policy has been processed by steps b4, b5, then the analyzing process shown in FIG. 22 is put to an end. If there is Policy has not been processed by steps b4, b5, then processing from step b4 is repeated.

In the present example, when the security policy analyzer 105 determines the area specified by the source and destination IP addresses of Policy in step b4, the security policy analyzer 105 refers to the information acquired from the analytical knowledge database 140. As described above, for analyzing a packet filtering function, the security policy analyzer 105 acquires, from the analytical knowledge database 140, such information that "NetworkAddress represents a set of IP addresses ranging from an IP address where as many bits from the most significant bit as the number of bits of a netmask are fixed and all the remaining bits are 0, to an IP address where as many bits from the most significant bit as the number of bits of the netmask are fixed and all the remaining bits are 1". As shown in FIG. 14, the source IP address and the destination IP address are described using a netmask, like "192.168.1.248/29". The numerical value after "/" indicates the number of bits of the netmask. Therefore, it can be derived that the scope of IP addresses described as "192.168.1.248/29", for example, represents a range from "192.168.1.248" to "192.168.1.255" based on the information acquired from the analytical knowledge database 140. By deriving ranges of both source and destination IP addresses, part of the area represented by two-dimensional plane data can be identified.

FIG. 23 shows an example of setting information of a security device having a packet filtering function. It is assumed that a general-purpose security policy is generated from such setting information. An example of an analysis for summarizing a plurality of Policies contained in the generated general-purpose security policy will be described below. FIG. 24 shows an example of two-dimensional plane data displayed as an analyzed result (summarized result).

Since the rule in the first line in FIG. 23 is a default rule, the priority of the rule in the first line is lowest. The rule in the second line is of highest priority, and the rule in the third line is of second highest priority. When Policies are generated from the respective rules, the Policy corresponding to the second rule, the Policy corresponding to the third rule, and the Policy corresponding to the first rule are described in the order named in the general-purpose security policy. In step b1, since the Policies are sorted in the order of ascending priority, the order of the Policies is reversed after they are sorted.

The first Policy after the Policies are sorted is a policy according to a default rule. According to a default rule, it is determined that a packet is discarded (dropped) regardless of the source IP address and the destination IP address. In step b3, therefore, the security policy analyzer 105 assigns "deny" to all the area shown in FIG. 24.

Then, in step b4, the security policy analyzer 105 acquires Policy corresponding to the third line shown in FIG. 23. Then, the security policy analyzer 105 executes step b5. According to the Policy, the source IP address is described as "172.16.1.0/24", and is judged as having a range from "172.16.1.0" to "172.16.1.255". Similarly, the destination IP address is judged as having a range from "192.168.1.224" to "192.168.1.255". The Action of this Policy is "accept". As a result, the security policy analyzer 105 assigns "accept" to the areas A, B shown in FIG. 24.

Then, in step b4, the security policy analyzer 105 acquires Policy corresponding to the second line shown in FIG. 23. Then, the security policy analyzer 105 executes step b5. According to the Policy, the source IP address is described as "172.16.1.0/24", and is judged as having a range from "172.16.1.0" to "172.16.1.255". Similarly, the destination IP address is judged as having a range from "192.168.1.248" to "192.168.1.255". The Action of this Policy is "deny". As a result, the security policy analyzer 105 assigns "deny" to the area B shown in FIG. 24. Therefore, after "deny" is assigned to the area B, it is overwritten by "accept" and then overwritten by "deny".

In the analyzed result outputting process in step B5, the security policy analyzer 105 displays the image shown in FIG. 24 as an analyzed result. Summarizing three packet filtering Policies from the displayed results indicates that packets directed from the source IP address in the range from "172.16.1.0" to "172.16.1.255" to the destination IP address in the range from "192.168.1.224" to "192.168.1.247" are permitted to pass. The analyzed result shows which packets are permitted to pass and which packets are inhibited from passing, by distinguishing areas determined by the source IP address the destination IP address depending on "accept" and "deny" and displaying the distinguished areas. Since the plural Policies are put together in one two-dimensional area, it is possible to present what packets will be passed more easily recognizably than to describe a general-purpose security policy.

If there are a plurality of PolicyGroups including Policies with regard to a packet filtering function, then an indication of PolicyGroup may be accepted and summarized results of the indicated PolicyGroup may be displayed. An example of a user interface for such an instance is shown in FIG. 25. The security policy analyzer 105 displays an image including a PolicyGroup indication column 71 and an analyzed result display area 72. The PolicyGroup indication column 71 displays a value of the attribute policyGroupID on a pull-down menu to prompt the system administrator to select PolicyGroup. When the security policy analyzer 105 accepts an indication of policyGroupID, the security policy analyzer 105 analyzes the PolicyGroup identified by the policyGroupID, and displays an analyzed result in the analyzed result display area 72, as shown in FIG. 25.

In the above description, the protocol is judged as tcp in step B4041. If the protocol is judged as udp in step B4041, then step B4043 is executed. The processing in step B4043 is the same as the processing in step B4042. Therefore, if the protocol is judged as udp, the same process as the process shown in FIG. 22 may be carried out.

If the protocol is judged as icmp in step B4041, then step B4044 is executed. The processing in step B4044 is the same as the processing in step B4042. Therefore, if the protocol is judged as icmp, the same process as the process shown in FIG. 22 may be carried out. If the protocol is judged as icmp, however, the security policy analyzer 105 assigns not only "deny" or "accept", but also type indicated by a packet filtering rule depending on icmp to the area identified by source IP address and the destination IP address, in step b5.

Figure 27:
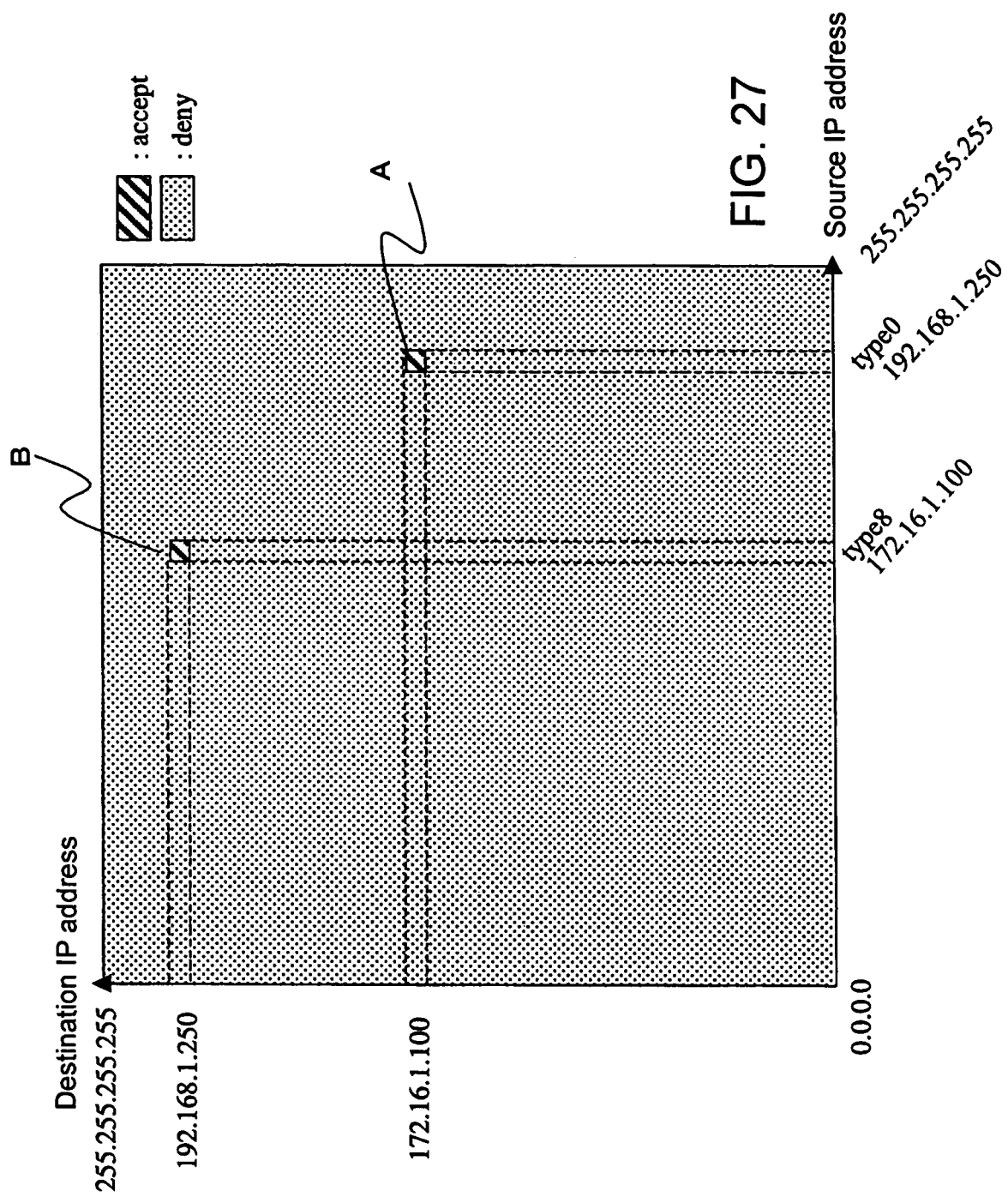
FIG. 27 is a diagram showing an example of two-dimensional plane data displayed as an analyzed result.

A process to be performed if the protocol is judged as icmp will be described below. FIG. 26 shows an example of setting information of a security device having a packet filtering function based on icmp. FIG. 27 shows an example of two-dimensional plane data displayed as an analyzed result, that is, summarized result. Since the rule in the first line shown in FIG. 26 is a default rule, the priority of the rule in the first line is lowest. The rule in the second line is a rule of highest priority, and the rule in the third line is of second highest priority. When Policies are generated from the respective rules, the Policy corresponding to the second rule, the Policy corresponding to the third rule, and the Policy corresponding to the first rule are described in the order named in the general-purpose security policy. In step b1, since the Policies are sorted in the order of ascending priority, the order of the Policies is reversed after they are sorted.

The first Policy after the Policies are sorted is a policy according to a default rule. According to a default rule, it is determined that a packet is discarded (dropped) regardless of the source IP address and the destination IP address. In step b3, therefore, the security policy analyzer 105 assigns "deny" to all the area shown in FIG. 27.

Then, in step b4, the security policy analyzer 105 acquires Policy corresponding to the third line shown in FIG. 26. Then, the security policy analyzer 105 executes step b5. According to the Policy corresponding to the third line, the source IP address is "192.168.1.250", and the destination IP address is "172.16.1.100". The Action of this Policy is "accept". As a result, the security policy analyzer 105 assigns "accept" to the area A shown in FIG. 27. In this Policy, "0" is described as type. The security policy analyzer 105 assigns information representing type0 to the area A shown in FIG. 27.

Then, in step b4, the security policy analyzer 105 acquires Policy corresponding to the second line shown in FIG. 26. Then, the security policy analyzer 105 executes step b5. According to the Policy, the source IP address is "172.16.1.100", and the destination IP address is "192.168.1.250". The Action of this Policy is "accept". As a result, the security policy analyzer 105 assigns "accept" to the area B shown in FIG. 27. In this Policy, "8" is described as type. The security policy analyzer 105 assigns information representing type8 to the area B shown in FIG. 27.

As a result, in the analyzed result outputting process in step B5, the security policy analyzer 105 displays the image shown in FIG. 27 as an analyzed result.

Figure 28:
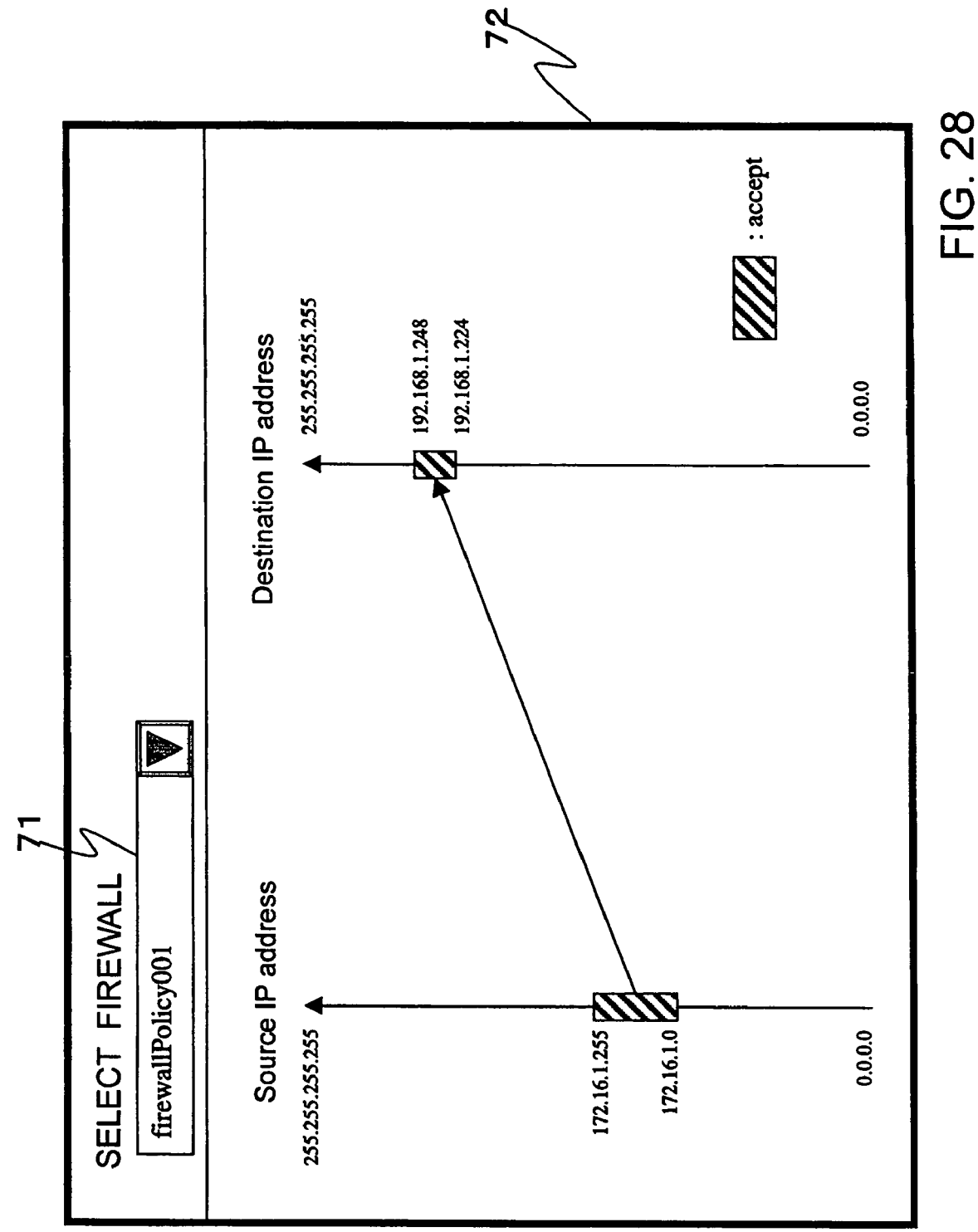
FIG. 28 is a view showing another output mode for an analyzed result.

In FIGS. 24, 25, and 27, the passage of a packet and the non-passage of a packet are indicated by a two-dimensional plane. However, the passage of a packet may be indicated in another display mode. FIG. 28 shows another output mode according to the analyzed result outputting process (step B5). According to this output mode, an axis (first axis) representing source IP addresses and an axis (second axis) representing destination IP addresses are separately displayed. In FIG. 28, the two axes vertically displayed parallel to each other.

When the process shown in FIG. 22 is completed, a range of source IP addresses of packets which are permitted to pass is determined. Similarly, a range of destination IP addresses of packets which are permitted to pass is also determined. The security policy analyzer 105 may display the range of source IP addresses of packets which are permitted to pass on the axis representing source IP addresses, and also may display the range of destination IP addresses of packets which are permitted to pass on the axis representing destination IP addresses. As shown in FIG. 28, the security policy analyzer 105 may display an arrow extending from the range of source IP addresses of packets which are permitted to pass to range of destination IP addresses of packets which are permitted to pass. The example shown in FIG. 28 is an example in which only areas where packets are permitted to pass are displayed. A PolicyGroup indication column 71 shown in FIG. 28 is the same as the PolicyGroup indication column 71 shown in FIG. 25.

According to the second embodiment, which has been described above, the analytical knowledge database 140 stores information about operation models of respective security functions and objects and attributes that are handled by the operation models, and the security policy analyzer 105 refers to the information stored in the analytical knowledge database 140 to analyze security functions. Therefore, details of a generated general-purpose security policy can easily understandably be presented to the system administrator or the like. In particular, details of a generated general-purpose security policy can more easily understandably be presented by displaying analyzed results as diagrams as shown in FIGS. 24 and 28, for example.

Third Embodiment

Figure 29:
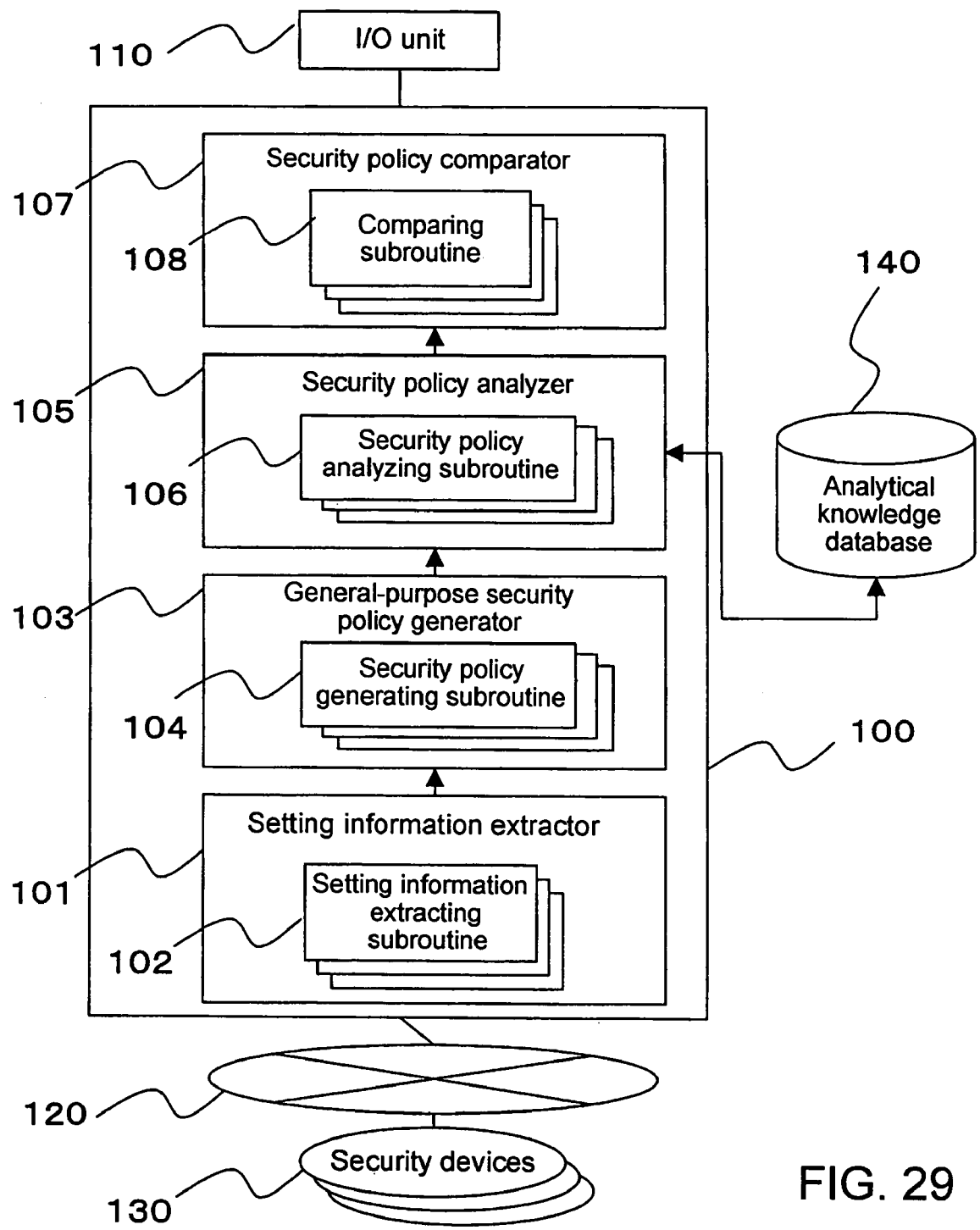
FIG. 29 is a block diagram illustrating a security policy management system according to a third embodiment of the present invention.

A security policy management system according to a third embodiment of the present invention will be described below. The security policy management system according to the third embodiment is arranged to be able to verify the identity between analyzed results of general-purpose security policies. The security policy management system according to the third embodiment is shown in FIG. 29. Those parts of the security policy management system according to the third embodiment shown in FIG. 29 which are identical to those of the security policy management system according to the second embodiment shown in FIG. 15 are denoted by identical reference characters, and will not be described in detail below. Those parts of the security policy management system according to the third embodiment shown in FIG. 29 which are identical to those of the security policy management system according to the second embodiment shown in FIG. 15 operate in the same manner as those of the security policy management system according to the second embodiment.

In the security policy management system shown in FIG. 29, the data processing apparatus 100 has a security policy comparator 107 in addition to the setting information extractor 101, the general-purpose security policy generator 103, and the security policy analyzer 105 which are described in the second embodiment. The security policy comparator 107 is realized by a CPU that operates according to a program, for example. The program includes, as a subroutine, at least one comparing subroutine 108. Each comparing subroutine 108 corresponds to an individual security function performed by each security device 130, as with the security policy analyzing subroutine. For example, a comparing subroutine 108 corresponds to a packet filtering function, and another comparing subroutine 108 corresponds to another security function. Individual comparing subroutines 108 correspond to individual security policy analyzing subroutines 106. Each comparing subroutine 108 is stored in advance in a storage device (not shown in FIG. 29) of the data processing apparatus 100.

When the security policy comparator 107 is to perform a comparing process, it calls a comparing subroutine 108 corresponding to a security function to be analyzed, and then compares analyzed results according to the called comparing subroutine 108.

Operation of the security policy management system according to the third embodiment will be described below with reference to FIG. 30.

In step C1, the system administrator, for example, enters a request to compare analyzed results of security functions through the I/O unit 110 into the data processing apparatus 100. In step C2, the system administrator also enters a security analyzing request through the I/O unit 110 into the data processing apparatus 100. The processing in step C2 is the same as the processing in step B1 (see FIG. 16). When the requests are entered in steps C1, C2, the setting information extractor 101 calls a setting information extracting subroutine 102 for at least one security device 130 that is connected to the communication network 120, and extracts and collects setting information from the security device 130 according to the setting information extracting subroutine 102 in step C3. Then, in step C4, the general-purpose security policy generator 103 calls a security policy generating subroutine 104 corresponding to the security device 130 from the setting information that is extracted and collected in step C3, and generates a general-purpose security policy for the security device 130 according to the security policy generating subroutine 104. In step C5, the security policy analyzer 105 analyzes the generated general-purpose security policy. Thereafter, in step C6, the security policy analyzer 105 outputs an analyzed result from the I/O unit 110, which presents the analyzed result to the system administrator. The processing in steps C3 to C6 is the same as the processing in steps B2 to B5 in the second embodiment.

In step C7, the security policy comparator 107 outputs a compared result produced by comparing analyzed results of security functions analyzed in step C5, from the I/O unit 110. According to one comparing mode, a plurality of output images representing analyzed results may be displayed in a superimposed manner. For example, if packet filtering functions are analyzed, then the security policy comparator 107 may superimpose an image representing an analyzed result of the packet filtering function of a certain security device T1 and an image representing an analyzed result of the packet filtering function of another security device T2. Specifically, if a plurality of information representing output images as shown in FIG. 24 are generated as analyzed results, then the security policy comparator 107 may output a plurality of analyzed result images in a superimposed manner. The security policy comparator 107 may also output a plurality of analyzed result images as shown in FIGS. 25, 27, and 28 in a superimposed manner.

In the above example, the security device T1 and the security device T2 may be of different types or may be of the same type.

When the security policy comparator 107 displays analyzed result images in a superimposed manner, it may display an area where the analyzed results do not agree with each other in a particular display mode. For example, the security policy comparator 107 may display the area where the analyzed results do not agree with each other in a particular color or may display that area in a blinking mode. For example, it is assumed that "deny" is assigned to the area B shown in FIG. 24 according to the analyzed result of the packet filtering function of the certain security device T1 and "accept" is assigned to the area B shown in FIG. 24 according to the analyzed result of the packet filtering function of the other security device T2. In this case, when the two analyzed result output images are displayed, the area B may be displayed in a certain color or in a blinking mode. The analyzed result images thus superimposed present a difference between the analyzed results easily understandably to the system administrator.

Furthermore, the system policy comparator 107 may display not only superimposed images as shown in FIG. 24, but also a section of the general-purpose security policy which corresponds to the area where the analyzed results do not agree with each other (e.g., Policy or PolicyRule included in PolicyGroup). In the above example, the system policy comparator 107 may display a descriptive section (Policy or PolicyRule) relative to the area B of the general-purpose security policy of the security device T1 and a descriptive section (Policy or PolicyRule) relative to the area B of the general-purpose security policy of the security device T2. By displaying Policy or PolicyRule corresponding to the area where the analyzed results do not agree with each other, it is possible to present to the system administrator which sections of general-purpose security policies do not agree each other.

The system policy comparator 107 may be arranged to display analyzed results parallel to each other to prompt the system administrator to compare the analyzed results. For example, the system policy comparator 107 may display output images as shown in FIG. 24 parallel to each other, as representing the analyzed result of the packet filtering function of the security device T1 and the analyzed result of the packet filtering function of the security device T2, respectively, prompting the system administrator to determine agreements and differences between the analyzed results.

The comparison of analyzed results is not limited to the comparison of analyzed results of security functions of two security devices. Rather, analyzed results of security functions of three or more security devices may be compared with each other.

A specific example of analyzed results of packet filtering functions will be described below. It is assumed that the network includes security devices T1, T2, with packet filtering software P1 installed in the security device T1 and packet filtering software P2 installed in the security device T2, and that identical rules should bee set in the packet filtering software P1, P2. FIG. 31 shows an example of a general-purpose security polity generated based on setting information that is extracted from the security device T1 with the packet filtering software P1 installed therein. FIG. 32 shows an example of a general-purpose security polity generated based on setting information that is extracted from the security device T2 with the packet filtering software P2 installed therein.

According to the general-purpose security polity shown in FIG. 31, three Policies are described in one PolicyGroup. The Policy described at the end indicates that a packet having a source IP address in the range from "172.16.1.0" to "172.16.1.255" and a destination IP address of "192.168.1.10" is set to "deny". The first Policy indicates that a packet having a source IP address in the range from "172.16.1.0" to "172.16.1.255", a destination IP address of "192.168.1.10", and a destination port number in the range from 1 to 1023 is set to "accept". The second Policy indicates that a packet having a source IP address in the range from "172.16.1.0" to "172.16.1.255", a destination IP address of "192.168.1.10", and a destination port number of 1024 is set to "accept". An output image of this analyzed result is shown in FIG. 33, for example.

According to the general-purpose security polity shown in FIG. 32, two Policies are described in one PolicyGroup. The Policy described at the end indicates that a packet having a source IP address in the range from "172.16.1.0" to "172.16.1.255" and a destination IP address of "192.168.1.10" is set to "deny". The first Policy indicates that a packet having a source IP address in the range from "172.16.1.0" to "172.16.1.255", a destination IP address of "192.168.1.10", and a destination port number in the range from 1 to 1024 is set to "accept". An output image of this analyzed result is the same as the output image shown in FIG. 33. However, destination port numbers from 1 to 1024 are held together in one Policy, any separation at a destination port number of 1023 is not displayed.

The security policy comparator 107 displays output images the above two analyzed results in an overlaid manner. The output images are the same as the image shown in FIG. 33. According to the analyzed results of the security policies shown in FIGS. 31 and 32, an area to which "deny" is assigned and an area to which "accept" is assigned agree with each other. Therefore, there is no area displayed in a particular display mode, e.g., in a particular color or a blinking mode. As a consequence, it is possible to easily understand that the details of the general-purpose security policy shown in FIG. 31 and the details of the general-purpose security policy shown in FIG. 32 are identical to each other.

According to the third embodiment, which has been described above, after general-purpose security policies not depending on the types of security devices are generated from setting information having expressions inherent in the security devices, the general-purpose security policies are compared and verified. Therefore, settings of different security devices having identical security functions can be compared and verified without concern over the formats of setting descriptions inherent in the security devices. Even if general-purpose security policies have identical details, their descriptions may be different from each other as shown in FIGS. 31 and 32. According to the present invention, since the results of policy analyses are compared and verified, the identity of details of general-purpose security policies described in various descriptive methods can be verified without concern over the different descriptions.

Figure 30:
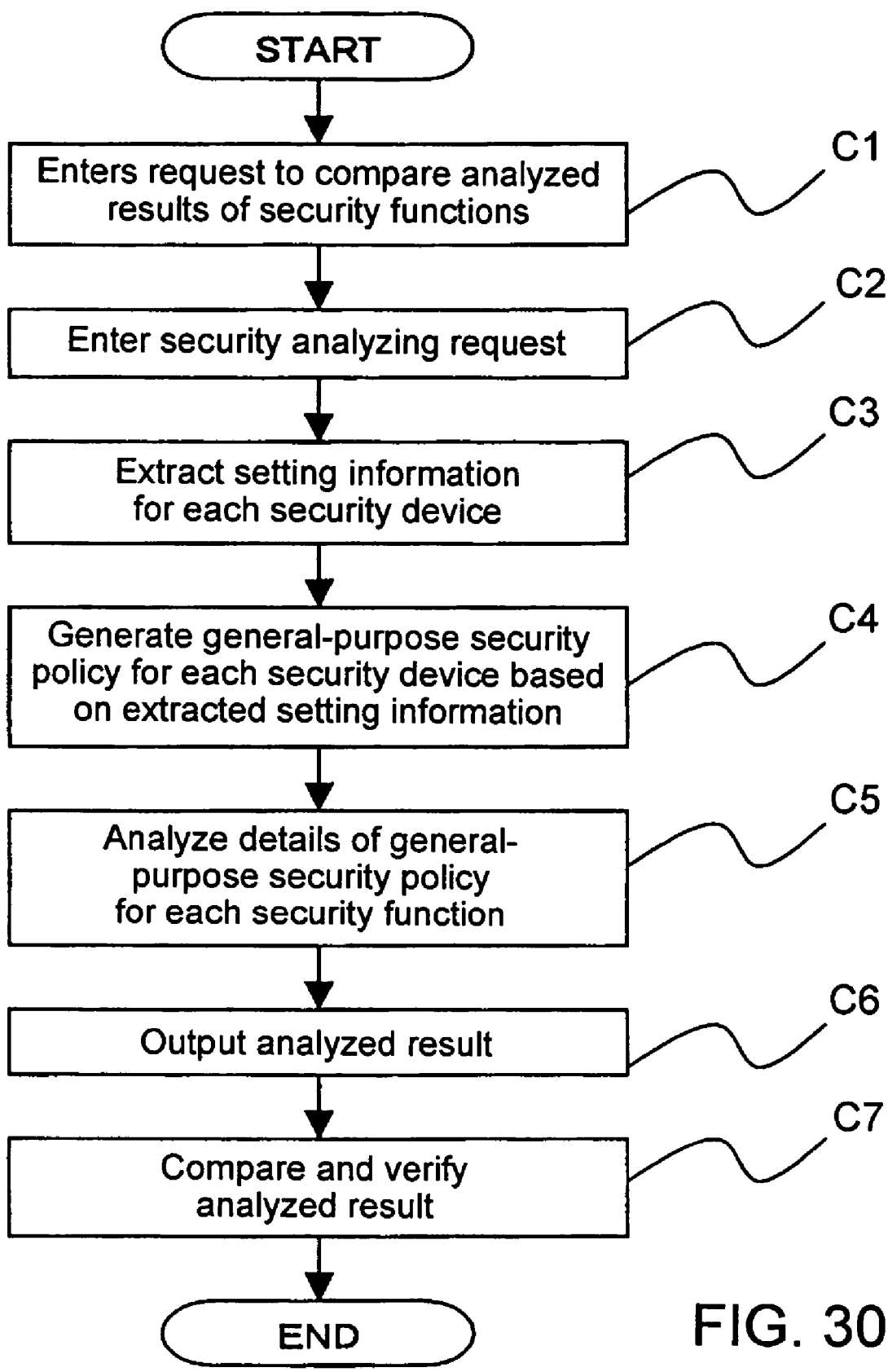
FIG. 30 is a flowchart illustrating an example of an operation sequence of the security policy management system shown in FIG. 29.

For comparing and verifying analyzed results of general-purpose security policies derived from the setting information of a plurality of security devices, the setting information extractor 101 may collect the setting information of the security devices in step C3 (see FIG. 30). For example, for comparing and verifying analyzed results of general-purpose security policies derived from the setting information of firewalls of branch offices or laboratories of a certain company, the setting information may be collected from the firewalls. An analyzed result of a general-purpose security policy derived from the setting information of at least one security device and an analyzed result of a general-purpose security policy which has been generated in advance as a reference may be compared and verified. In this case, the setting information extractor 101 may collect the setting information from the at least one security device. The analyzed result of the general-purpose security policy which has been generated in advance as the reference may be stored in advance in a storage device (not shown in FIG. 29). A general-purpose security policy may be generated from the setting information from the at least one security device, an analyzed result of the general-purpose security policy may be generated, an analyzed result generated in advance may be read, and the processing in step C7 may be performed. As a consequence, the analyzed result of the general-purpose security policy of one security device and the analyzed result of the general-purpose security policy generated in advance as the reference can be compared and verified. The storage device for storing the analyzed result in advance corresponds to an analyzed result memory means.

Fourth Embodiment

Figure 34:
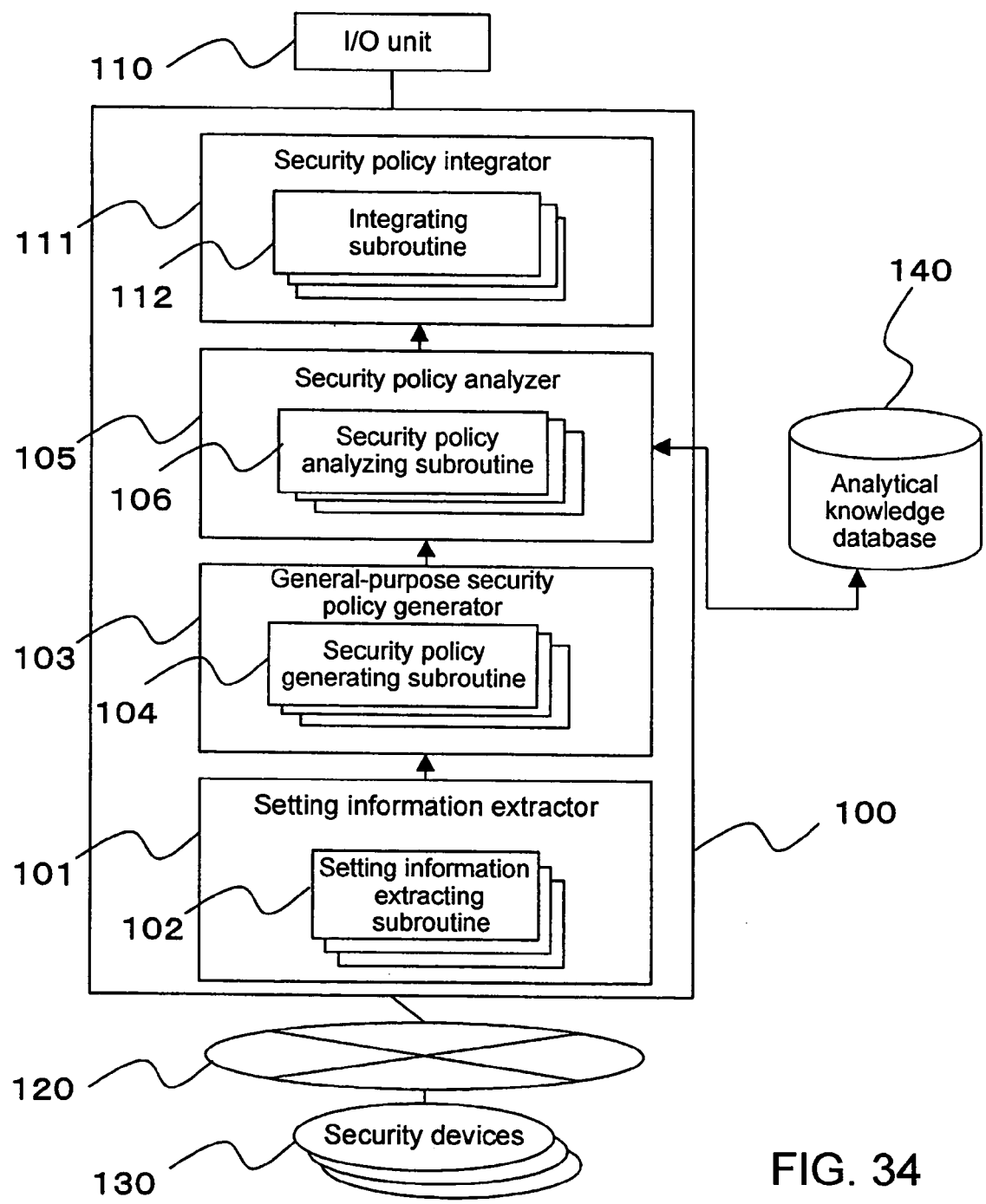
FIG. 34 is a block diagram illustrating a security policy management system according to a fourth embodiment of the present invention.

A security policy management system according to a fourth embodiment of the present invention will be described below. The security policy management system according to the fourth embodiment serves to integrally analyze a plurality of general-purpose security policies that are determined for the setting of security functions of the same kind. The security policy management system according to the fourth embodiment analyzes individual general-purpose security policies as with the security policy management system according to the second embodiment. Then, the security policy management system integrates the analyzed results into an integrated analyzed result. The security policy management system according to the fourth embodiment is shown in FIG. 34. Those parts of the security policy management system according to the fourth embodiment shown in FIG. 34 which are identical to those of the security policy management system according to the second embodiment shown in FIG. 15 are denoted by identical reference characters, and will not be described in detail below. Those parts of the security policy management system according to the fourth embodiment shown in FIG. 34 which are identical to those of the security policy management system according to the second embodiment shown in FIG. 15 operate in the same manner as those of the security policy management system according to the second embodiment.

In the security policy management system shown in FIG. 34, the data processing apparatus 100 has a security policy integrator 111 in addition to the setting information extractor 101, the general-purpose security policy generator 103, and the security policy analyzer 105 which are described in the second embodiment. The security policy integrator 111 is realized by a CPU that operates according to a program, for example. The program includes, as a subroutine, at least one integrating subroutine 112. Each integrating subroutine 112 corresponds to an individual security function performed by each security device 130, as with the security policy analyzing subroutine. For example, an integrating subroutine 112 corresponds to a packet filtering function, and another integrating subroutine 112 corresponds to another security function. Individual integrating subroutines 112 correspond to individual security policy analyzing subroutines 106. Each integrating subroutine 112 is stored in advance in a storage device (not shown in FIG. 34) of the data processing apparatus 100.

According to the present invention, "integrating security policies" represents integrally analyzing analyzed results of a plurality of general-purpose security policies that are determined for the setting of security functions of the same kind and deriving an analyzed result as a whole of the general-purpose security policies. Therefore, the term "integrating" according to the present invention means integrally analyzing analyzed results of general-purpose security policies. For example, integrally analyzing analyzed results of general-purpose security policies derived respectively from a plurality of security devices having identical security functions and deriving an analyzed result as a whole of the general-purpose security policies derived respectively from the security devices corresponds to "integrating security policies".

An analysis of general-purpose security policies will be described below with respect to, for example, summarizing general-purpose security policies determined for a packet filtering function. It is assumed that there are a plurality of security devices for packet filtering and general-purpose security policies are derived from the setting information of the security devices. Since each of the general-purpose security policies is derived from the setting information of one security device, an analyzed result (i.e., summarized result) of each of the general-purpose security policies represents packets that are permitted to pass and packets that are inhibited from passing by one security device. One example of "integrating security policies" is to integrate the analyzed results (i.e., summarized results) of the respective general-purpose security policies and analyzing them to grasp packets that are permitted to pass through all the security devices and packets that are inhibited from passing through a particular security device.

As described above, "integrating security policies" refers to integrally analyzing analyzed results of general-purpose security policies, rather than integrating descriptions themselves of a plurality of general-purpose security policies.

The security policy integrator 111 receives analyzed results of general-purpose security policies of a plurality of security devices from the security policy analyzer 105, and performs an integrating process using the received analyzed results. For performing the integrating process, the security policy integrator 111 calls an integrating subroutine 112 corresponding to a security function that has been analyzed, and then integrates the analyzed results according to the called integrating subroutine 112.

Figure 35:
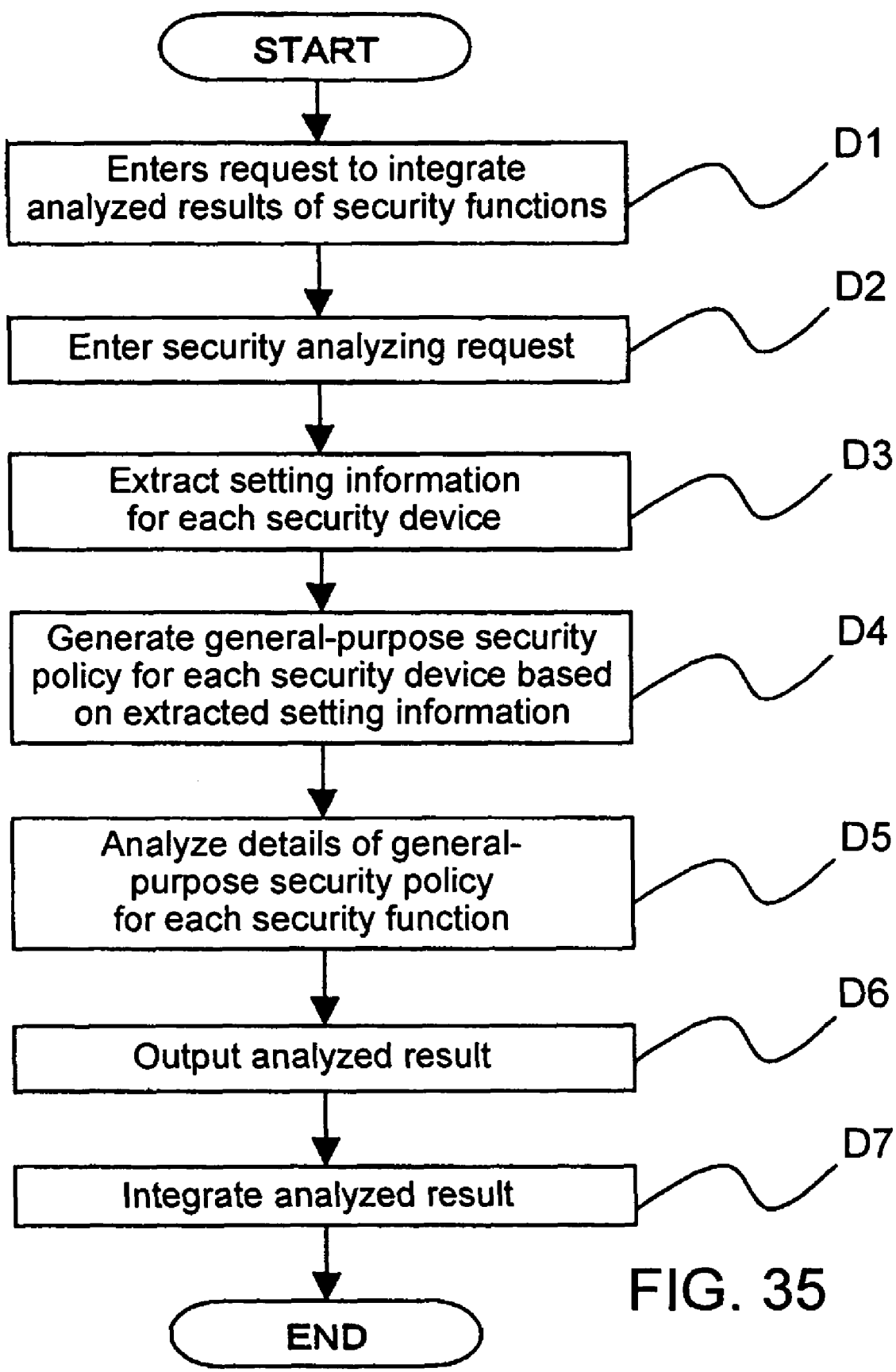
FIG. 35 is a flowchart illustrating an example of an operation sequence of the security policy management system shown in FIG. 34.

Operation of the security policy management system according to the fourth embodiment will be described below with reference to FIG. 35.

In step D1, the system administrator, for example, enters a request to integrate analyzed results of security functions through the I/O unit 110 into the data processing apparatus 100. In step D2, the system administrator also enters a security analyzing request through the I/O unit 110 into the data processing apparatus 100. The processing in step D2 is the same as the processing in step B1 (see FIG. 16). When the requests are entered in steps D1, D2, the setting information extractor 101 calls a setting information extracting subroutine 102 for at least two security devices 130 that are connected to the communication network 120, and extracts and collects, in step D3, setting information from the security devices 130 according to the setting information extracting subroutine 102. Then, in step D4, the general-purpose security policy generator 103 calls a security policy generating subroutine 104 corresponding to the security devices 130 according to the setting information that is extracted and collected in step D3, and generates general-purpose security policies for the security devices 130. In step D5, the security policy analyzer 105 analyzes the generated general-purpose security policies. Thereafter, in step D6, the security policy analyzer 105 outputs analyzed results from the I/O unit 110, which presents the analyzed results to the system administrator. The processing in steps D3 to D6 is the same as the processing in steps B2 to B5 in the second embodiment.

Then, in step D7, the security policy integrator 111 performs an integrating process using the analyzed results of the security functions analyzed in step D5, and outputs an integrated result from the I/O unit 110. Specific operation of the security policy integrator 111 in the integrating process will be described later. The security policy integrator 111 may display the integrated result on the display device of the I/O unit 110.

Displaying the integrated result will be described below. It is assumed that general-purpose security policies determined for a packet filtering function are summarized and an integrated result of the summaries is displayed. The security policy integrator 111 may display only the integrated result representing the integration of plural analyzed results on the display device. For example, if the security policy analyzer 105 summarizes (analyzes) packet filtering functions, then the security policy integrator 111 may display an integrated result of an analyzed result (i.e., summarized result) of a packet filtering function of a certain security device T1 and an analyzed result (i.e., summarized result) of a packet filtering function of another security device T2. The integrated result in this example is displayed on the display device as two-dimensional plane data shown in FIG. 24, for example.

The security policy integrator 111 may display individual analyzed results and an integrated result representing the integration of those analyzed results, parallel to each other. For example, the security policy integrator 111 may display an analyzed result of a packet filtering function of a certain security device T1, an analyzed result of a packet filtering function of another security device T2, and an integrated result representing the integration of those analyzed results, parallel to each other on the display device.

The analyzed results of security functions of security devices as analyzed by the security policy analyzer 104 may be displayed parallel to each other to prompt the system administrator to make a decision about an integrated result of the analyzed results. For example, an analyzed result of a packet filtering function of a certain security device T1 and an analyzed result of a packet filtering function of another security device T2 may be displayed on the display device to prompt the system administrator to derive an integrated result of the two analyzed results. Since the data processing apparatus 100 itself does not integrate the analyzed results, the data processing apparatus 100 may not have the security policy integrator 111. The process of displaying analyzed results parallel to each other to prompt the system administrator to make a decision about an integrated result of the analyzed results may be performed according to the second embodiment (the arrangement shown in FIG. 15).

The security policy integrator 111 may display the integrating process stepwise. For example, it is assumed that in order to be able to grasp packets which are allowed to pass through all of a plurality of security devices T1 to T3 and packets which are inhibited from passing through either one of the security devices T1 to T3, an integrated result of an analyzed result of a packet filtering function of a certain security device T1 and analyzed results of packet filtering functions of other security devices T2, T3 is displayed. The security policy integrator 111 may first display the analyzed result of the security device T1, then display an integrated result of the analyzed results of the security devices T1, T2, and thereafter display an integrated result of the analyzed results of the security devices T1, T2, T3.

In the above stepwise display of the integrating process, when an area occurs which differs from the already displayed analyzed result (or the integrated result of analyzed results), the security policy integrator 111 may display that area in a particular display mode. For example, the security policy integrator 111 may display that area in a particular color or in a blinking mode. Specifically, it is assumed that the analyzed result of the security device T1 is first displayed as two-dimensional plane data as shown in FIG. 24, "accept" is assigned to a certain area C in the two-dimensional plane data representing the analyzed result of the security device T1, and "deny" is assigned to the area C in two-dimensional plane data representing the analyzed result of the security device T2. According to an integrated result of the analyzed results of the security devices T1, T2, "deny" is assigned to the area C. The security policy integrator 111 may display the area C in a particular color or in a blinking mode in either one or both of the analyzed result of the security device T1 and the integrated result of the analyzed results of the security devices T1, T2. It is assumed that "accept" is assigned to an area D in two-dimensional plane data displayed as the integrated result of the analyzed results of the security devices T1, T2, and "deny" is assigned to the area D in two-dimensional plane data representing the analyzed result of the security device T3. According to an integrated result of the analyzed results of the security devices T1, T2, T3, "deny" is assigned to the area D. The security policy integrator 111 may display the area D in a particular color or in a blinking mode in either one or both of the integrated result of the analyzed results of the security devices T1, T2 and the integrated result of the analyzed results of the security devices T1, T2, T3. With the results being thus displayed, an area which differs from the already displayed analyzed result (or the integrated result of analyzed results) can easily understandably be presented to the system administrator in the integrating process.

Furthermore, the security policy integrator 111 may display not only two-dimensional plane data as shown in FIG. 24 parallel to each other, but also a section of the general-purpose security policy which corresponds to the area where the analyzed results do not agree with each other in the integrating process (e.g., Policy or PolicyRule included in PolicyGroup). In the above example, the security policy integrator 111 may display a descriptive section (Policy or PolicyRule) relative to the area C and the area D of the general-purpose security policy of the security device T1, a descriptive section (Policy or PolicyRule) relative to the area C and the area D of the general-purpose security policy of the security device T2, and a descriptive section (Policy or PolicyRule) relative to the area C and the area D of the general-purpose security policy of the security device T3. By displaying Policy or PolicyRule corresponding to the area where the analyzed results do not agree with each other, it is possible to present to the system administrator Policy and PolicyRule corresponding to the difference between the individual analyzed results and the integrated result of the analyzed results.

The security devices T1, T2, T3 may be of different kinds or may be of one kind. The integrating process is not limited to the integration of analyzed results of security functions of two or three security devices. Rather, analyzed results of security functions of four or more security devices may be integrated with each other.

A specific example of the integrating process will be described below. It is assumed that general-purpose security policies determined for a packet filtering function are summarized and analyzed results (i.e., summarized results) are integrated.

Figure 36:
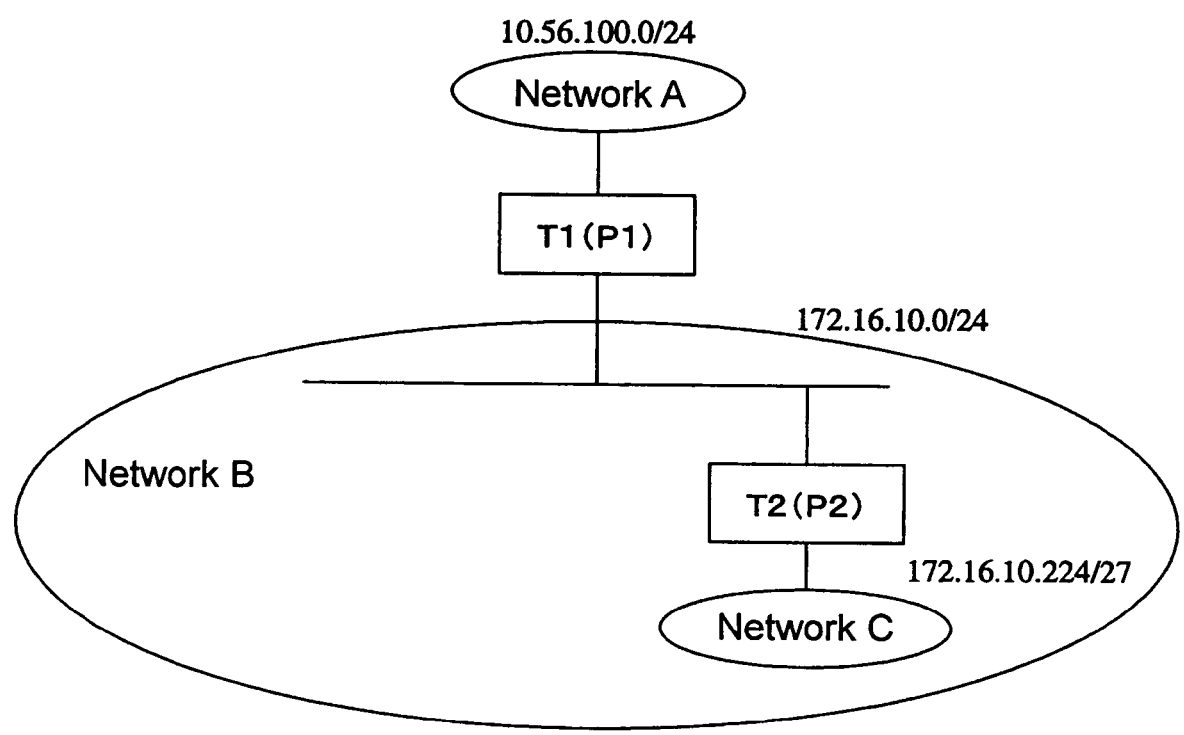
FIG. 36 is a diagram showing an example of a network system including packet filtering security devices.

FIG. 36 shows by way of example a network system including security devices T1, T2 for packet filtering. IP addresses ranging from "10.56.100.0" to "10.56.100.255" are assigned to a network A. IP addresses ranging from "172.16.10.0" to "172.16.10.255" are assigned to a network B. IP addresses ranging from "172.16.10.224" to "172.16.10.255" are assigned to a network C that is included in the network B. A security device T1 is provided at the boundary between the network A and the network B. Similarly, a security device T2 is provided at the boundary between the portion of the network B other than the network C and the network C. Packet filtering software P1 is installed in the security device T1, and packet filtering software P2 is installed in the security device T2.

FIG. 37 shows an example of a generated general-purpose security policy generated based on setting information that is extracted from the security device T1. FIG. 38 shows an example of a generated general-purpose security policy generated based on setting information that is extracted from the security device T2.

According to the general-purpose security polity shown in FIG. 37, two Policies are described in one PolicyGroup. The Policy described first indicates that a packet having a source IP address in the range from "172.16.10.192" to "172.16.10.255" and a destination IP address in the range from "10.56.100.0" to "10.56.100.255" is set to "deny". The Policy at the end indicates that a packet having a source IP address in the range from "172.16.10.0" to "172.16.10.255" and a destination IP address ranging from "10.56.100.0" to "10.56.100.255" is set to "accept". The Policy combining algorithm is "first-applicable". Therefore, packets are inhibited from passing between the network B including the network C and the network A. FIG. 39 shows an output image of an analyzed result of the general-purpose security policy shown in FIG. 37.

According to the general-purpose security polity shown in FIG. 38, one Policy is described in one PolicyGroup. The Policy described here indicates that a packet having a source IP address in the range from "172.16.10.224" to "172.16.10.255" and a destination IP address in the range from "10.56.100.0" to "10.56.100.255" is set to "accept". Thus, packets are permitted to pass between the networks A, C. FIG. 40 shows an output image of an analyzed result of the general-purpose security policy shown in FIG. 38.

After the requests are entered in steps D1, D2, the setting information extractor 101 extracts setting information from the security devices T1, T2 in step D3, and then the general-purpose security policy generator 103 generates general-purpose security policies shown in FIGS. 37 and 38 in step D4. The security policy analyzer 105 analyzes (summarizes) packet filtering functions for the respective security devices, i.e., for the respective general-purpose security policies shown in FIGS. 37 and 38, and displays respective analyzed results (see FIGS. 39 and 40). At this time, the security policy analyzer 105 outputs the analyzed results to the security policy integrator 111. The analyzed results are described according to the descriptive format of the general-purpose security policies, for example. However, the analyzed results are not limited to any particular descriptive format, and may be described according to other descriptive formats. Based on the analyzed results described according to the descriptive format of the general-purpose security policies, two-dimensional plane data shown in FIGS. 39 and 40 are displayed on a display device.

Figure 41:
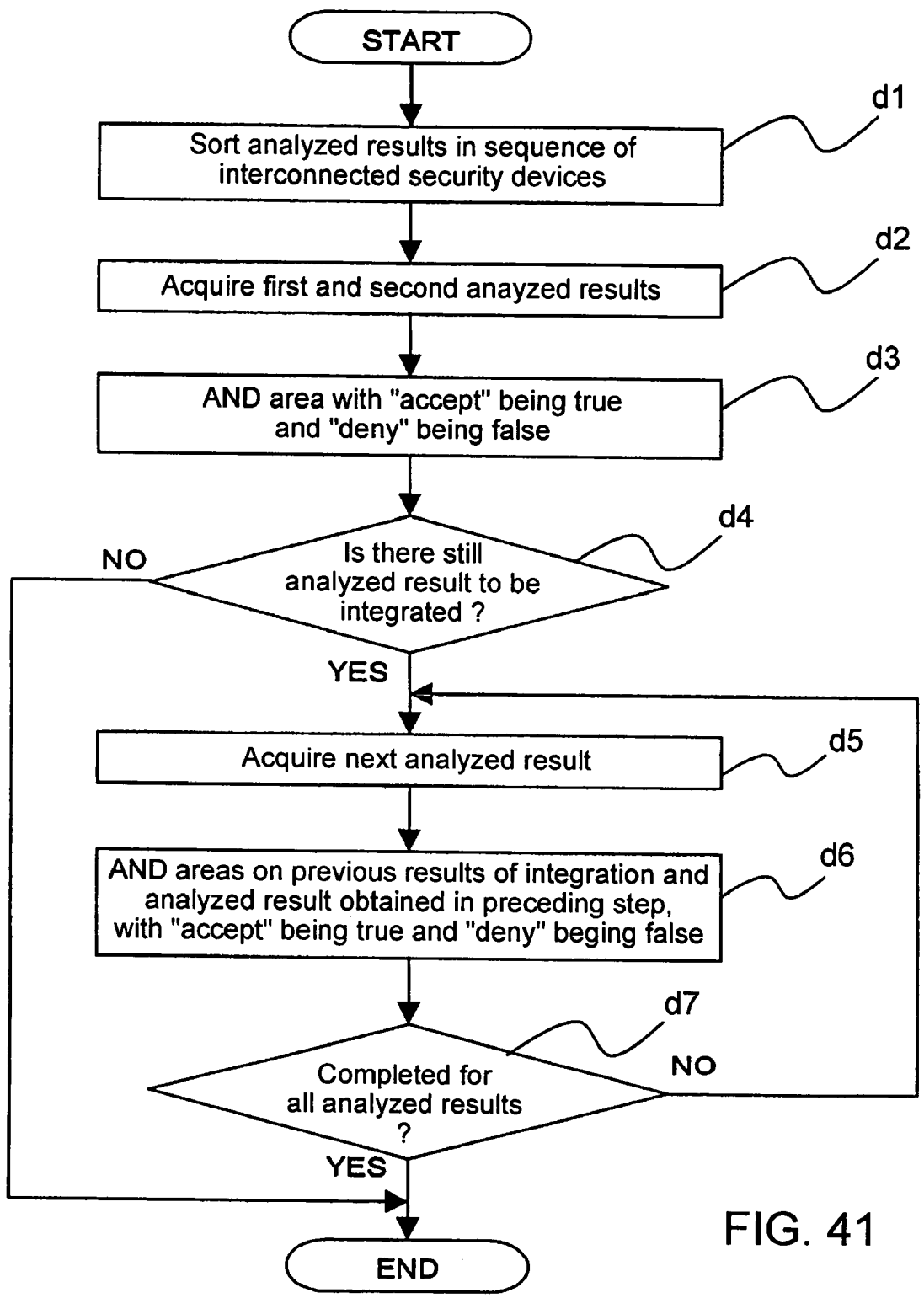
FIG. 41 is a flowchart illustrating an example of an integrating process.

FIG. 41 shows an example of the integrating process (performed in step D7 shown in FIG. 35) for integrating analyzed results of general-purpose security policies determined for a packet filtering function. The integrating process shown in FIG. 41 is a process for determining what packets are permitted to pass and what packets are inhibited from passing between two networks outside of security devices that are positioned at respective opposite ends of a link made up of a plurality of interconnected security devices having a packet filtering function, by integrating the analyzed results of the interconnected security devices having a packet filtering function. For example, the integrating process determines what packets are permitted to pass and what packets are inhibited from passing between the two networks A, C outside of the security devices T1, T2 having a packet filtering function in the network system shown in FIG. 36. If a plurality of security devices having a packet filtering function are interconnected, it is not possible to determine what packets are permitted to pass and what packets are inhibited from passing between two networks at the opposite ends unless the analyzed results of the individual security devices are integrated. An example of integrating process for integrating a plurality of analyzed results will be described below with reference to FIG. 41, using the example of the analyzed results shown in FIGS. 39 and 40.

In step d1, the security policy integrator 111 sorts a plurality of analyzed results, i.e., the analyzed results of a plurality of general-purpose security policies determined for the setting of a packet filtering function, in the sequence of the interconnected security devices. The analyzed results may be sorted irrespective of the direction in which the security devices are interconnected. For example, the two security devices T1, T2 are interconnected in the example shown in FIG. 36. The analyzed results of general-purpose security policies obtained respectively from the security devices T1, T2 may be sorted in the order of T1, T2 or T2, T1. If a security device T3 is connected to the security device T1 and the security device T2 is connected to the security device T3 in the example shown in FIG. 36, then the analyzed results of general-purpose security policies obtained respectively from the security devices T1, T2, T3 may be sorted in the order of T1, T3, T2 or T2, T3, T1. However, the analyzed results are not sorted in the order of T3, T1, T2 or the like because the security devices T1, T2, T3 are not interconnected in that order.

If two security devices are interconnected as shown in FIG. 36, then since the analyzed results may be sorted in any order, the security policy integrator 111 may determine a sorting order in which the analyzed results are to be sorted. If three or more security devices are interconnected, then the security policy integrator 111 may display a screen image for prompting the security manager to indicate a sorting order on the display device of the I/O unit 110, and the security manager may indicate a sorting order through the I/O unit 110. The security policy integrator 111 sorts the analyzed results in the indicated sorting order.

After step d1, the security policy integrator 111 acquires, in step d2, a first analyzed result and a second analyzed result from the analyzed results sorted in step d1. In the present example, since two analyzed results are to be integrated, i.e., data for displaying the two-dimensional plane data shown in FIG. 39 and data for displaying the two-dimensional plane data shown in FIG. 40, these two analyzed results are acquired.

Then, in step d3, the security policy integrator 111 ANDs (obtains the logical product of) the areas of the two-dimensional plane data represented by the two analyzed results, with "accept" being true and "deny" being false. According to an ANDing process, only when two values to be processed are true, the processed result is true, and when at least one of the two values is false, the processed result is false. Therefore, when both the areas of the two analyzed results to be integrated are "accept", the area of the integrated result is "accept", and either one of the areas of the two analyzed results to be integrated are "deny", the area of the integrated result is "deny". The result of the integrating process performed on the analyzed results shown in FIGS. 39 and 40 is illustrated in FIG. 42.

Figure 42:
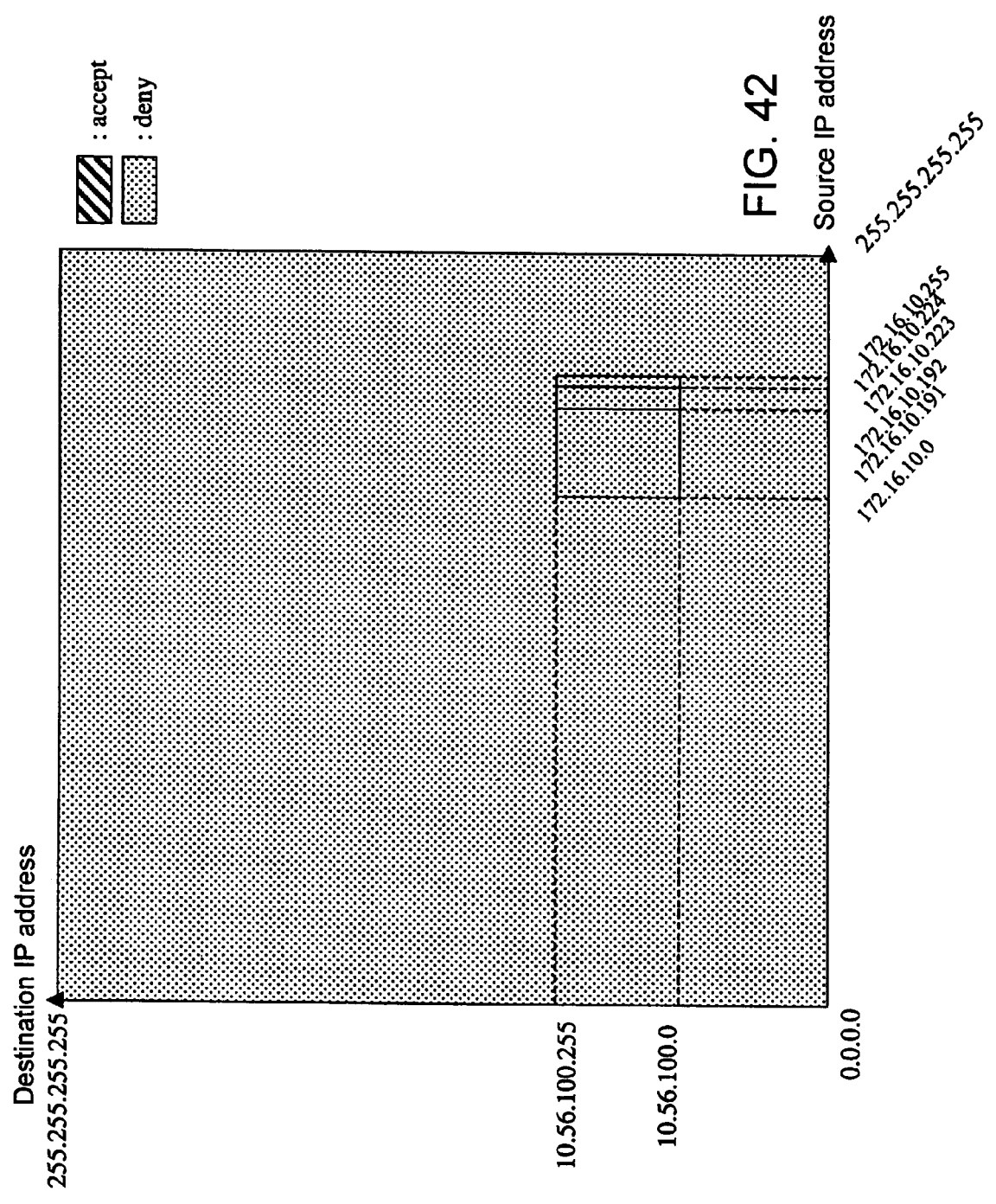

FIG. 42 indicates that all packets are inhibited from passing. This means that any packets are inhibited from passing between the network A and the network C outside of the security device T1 and the security device T2 which are interconnected.

As a result, even though the packet filtering software P2 installed in the security device T2 connected to the network C is set to permit the network A and the network C to communicate with each other, since the packet filtering software P1 installed in the security device T1 is set to inhibit the network A and the network B (including the network C) from communicating with each other, it can be grasped that no communications are possible between the network A and the network C. Therefore, the security manager can easily grasp that communications are made possible between the network A and the network C by changing the setting of the packet filtering software P1 to permit packets to pass between the network A and the network C.

Then, in step d4, the security policy integrator 111 determines whether there is still an analyzed result to be integrated or not. If there is still an analyzed result to be integrated, then control goes to step d5. If there is no analyzed result to be integrated, then the integrating process is put to an end. As a consequence, an integrated result of the analyzed results is obtained. Since there are two analyzed results in this example, the integrating process is put to an end.

If there are three or more analyzed results to be integrated, then the security policy integrator 111 acquires a next analyzed result in step d5. The security policy integrator 111 then performs, in step d6, the same area processing as with step d3, on the integrated result which has already been derived and the newly acquired analyzed result. After step d6, the security policy integrator 111 determines whether all the analyzed results have been integrated (i.e., ANDed) or not in step d7. If all the analyzed results have been integrated, then the integrating process is put to an end. If not all the analyzed results have been integrated, but there is still an analyzed result to be integrated, then control goes back step d5, repeating the processing from step d5.

Figure 43:
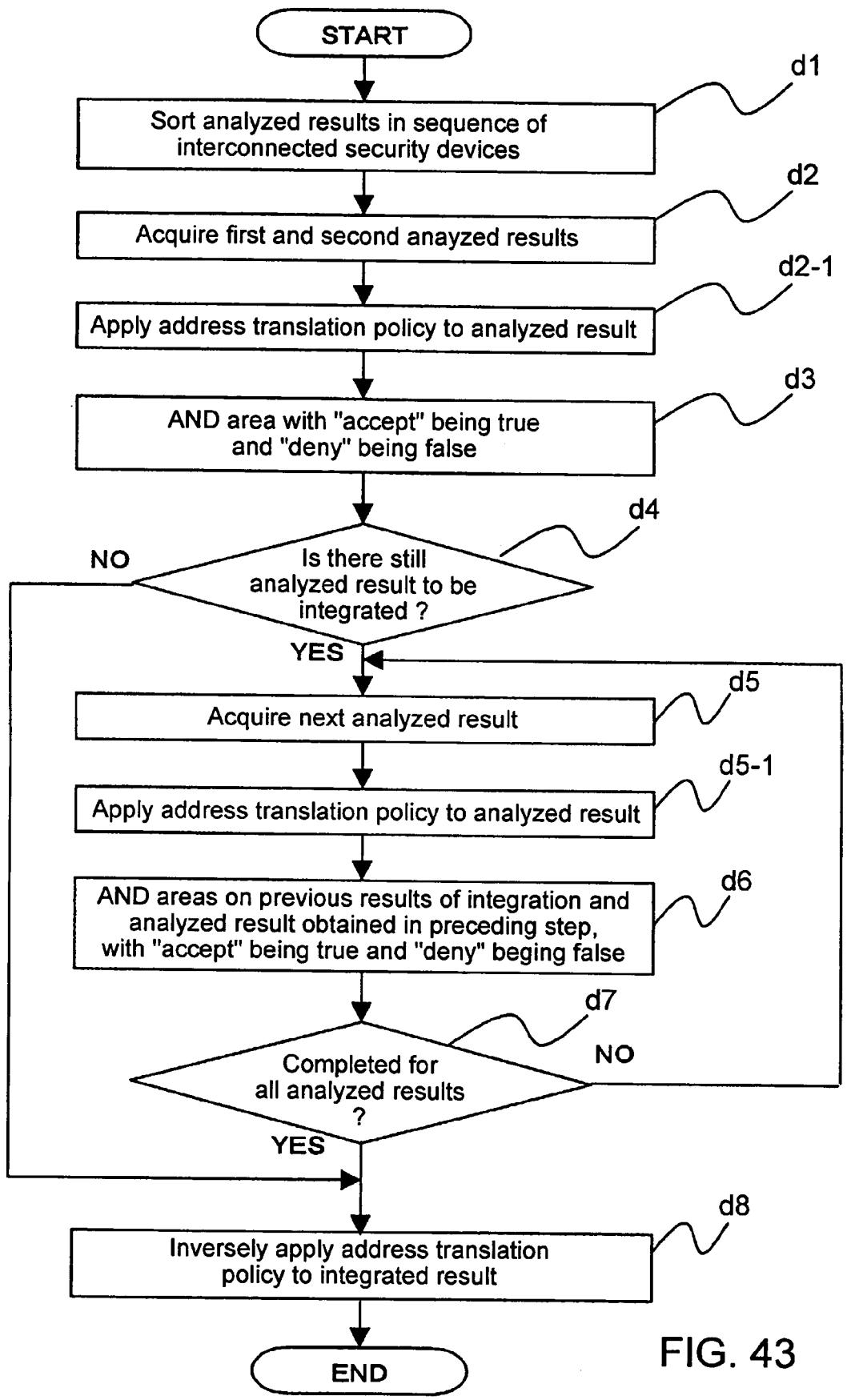
FIG. 43 is a flowchart illustrating a modification of the integrating process.

A modification of the fourth embodiment will be described below. If a plurality of security devices having a packet filtering function are interconnected, one or some of the security devices may perform address translation according to an address translating function at the same time that it performs packet filtering according to the packet filtering function. In this case, after the analyzed results are acquired in step d2 and step d5, i.e., before the analyzed results are integrated in step d3 and step d6, a policy (rule) determined for the address translating function may be applied to the analyzed results with regard to the packet filtering function. This policy (rule) will be referred to as an address translating policy. By applying the address translating policy, the area of the two-dimensional data is translated. After all the analyzed results are integrated, i.e., NO is judged in step d4 or YES is judged in step d7, the address translating policy is applied inversely to restore the translated area. This process is illustrated in FIG. 43. As shown in FIG. 43, step d2-1 for applying the address translating policy to the analyzed results with regard to the packet filtering function is added between steps d2, d3 shown in FIG. 41. Similarly, step d5-1 for applying the address translating policy to the analyzed results with regard to the packet filtering function is added between steps d5, d6 shown in FIG. 41. In addition, step d8 for inversely applying the address translating policy to the integrated result is added after NO is judged in step d4 or YES is judged in step d7.

An example of an integrating process for integrating analyzed results with regard to a packet filtering function in a network system for simultaneously performing packet filtering and address translation will be described below with reference to FIG. 43.

An example of a network system for simultaneously performing packet filtering and address translation will first be described below. FIG. 44 shows such a network system by way of example. IP addresses ranging from "10.56.100.0" to "10.56.100.255" are assigned to a network A. IP addresses ranging from "172.16.10.0" to "172.16.10.255" are assigned to a network B. IP addresses ranging from "192.168.1.0" to "192.168.1.255" are assigned to a network D. A security device T1 is provided at the boundary between the network A and the network B. Similarly, a security device T2 is provided at the boundary between the network B and the network D. Packet filtering software P1 is installed in the security device T1, and packet filtering software P2 including an address translating function is installed in the security device T2. In this example, the security device T2 performs the following address translation according to the software P2: The source IP address of a packet whose source IP address ranges from "192.168.1.0" to "192.168.1.255" and whose destination IP address ranges from "10.56.100.0" to "10.56.100.255" is translated into "172.16.10.10".

FIG. 45 shows an example of a generated general-purpose security policy generated based on setting information that is extracted from the security device T1. FIG. 46 shows an example of a generated general-purpose security policy generated based on setting information that is extracted from the security device T2.

According to the general-purpose security polity shown in FIG. 45, one Policy is described in one PolicyGroup. The Policy described here indicates that a packet having a source IP address in the range from "172.16.10.0" to "172.16.10.255" and a destination IP address in the range from "10.56.100.0" to "10.56.100.255" is set to "accept". FIG. 47 shows an output image of an analyzed result of the general-purpose security policy shown in FIG. 45.

According to the general-purpose security polity shown in FIG. 46, two Policies are described in one PolicyGroup. The Policy described first indicates that a packet having a source IP address in the range from "192.168.1.0" to "192.168.1.255" and a destination IP address in the range from "10.56.100.0" to "10.56.100.255" is set to "accept". The Policy at the end is Policy with regard to address translation, and indicates that the source IP address of a packet whose source IP address ranges from "192.168.1.0" to "192.168.1.255" and whose destination IP address ranges from "10.56.100.0" to "10.56.100.255" is translated into "172.16.10.10".

When only Policy with regard to the packet filtering function in the general-purpose security policy shown in FIG. 46 is analyzed without respect to Policy with regard to the address translating function, the analyzed result can be indicated as two-dimensional plane data as shown in FIG. 48. A process of integrating the analyzed result shown in FIG. 48 and the analyzed result shown in FIG. 47 will be described below. An area S set to "accept" in the two-dimensional plane data shown in FIG. 48 is set to "deny" in the two-dimensional plane data shown in FIG. 47. Specifically, the area S contains source IP addresses ranging from "192.168.1.0" to "192.168.1.255" and destination IP addresses ranging from "10.56.100.0" to "10.56.100.255". When the analyzed results are integrated, the area S shown in FIG. 48 is set to "deny". Actually, however, the address translation is performed to translate the source IP address of a packet whose source IP address ranges from "192.168.1.0" to "192.168.1.255" and whose destination IP address ranges from "10.56.100.0" to "10.56.100.2552, into "172.16.10.10". Thus, the source IP addresses in the area S shown in FIG. 48 are translated into "172.16.10.10". According to the integrated result with the above address translation performed, the area S after the address translation remains set to "accept".

Figure 49:
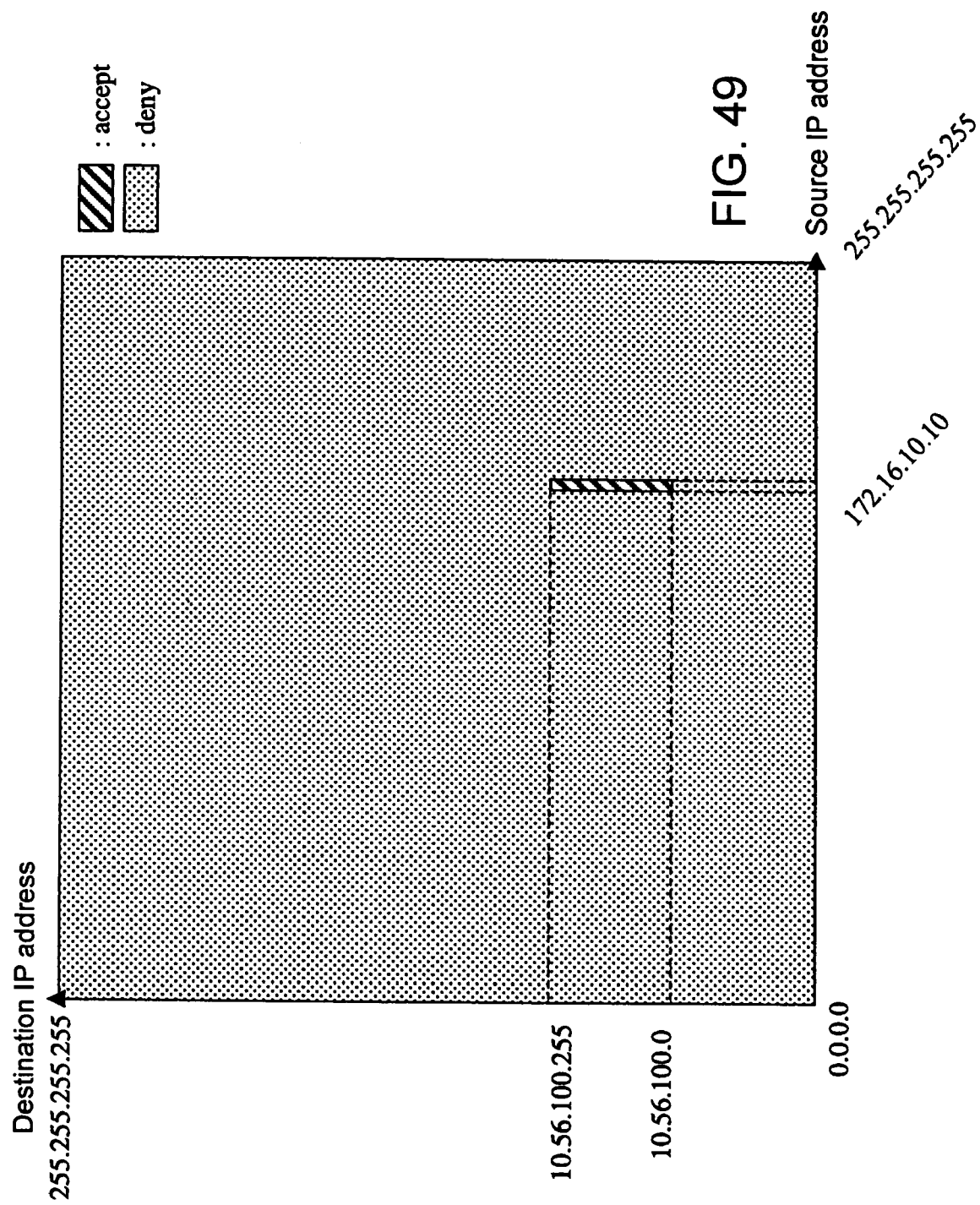
FIG. 49 is a diagram showing an example of an output image of a result produced by analyzing a generated general-purpose security policy when an address converting policy is applied.

Operation of the security policy integrator 111 at the time the above address translation is performed will be described below with reference to FIG. 43. In steps d1, d2, the security policy integrator 111 sorts the analyzed results in the order of the interlinked security devices, and acquires the first and second analyzed results. The processing in steps d1, d2 is the same as the processing in steps d1, d2 shown in FIG. 41. Then, in step d2-1, if Policy with regard to the address translating function is described in the general-purpose security policy, the security policy integrator 111 applies the Policy with regard to the address translating function to the analyzed result of the general-purpose security policy to translate the area of the two-dimensional plane data. In the above example, the security policy integrator 111 applies the address translating policy shown in FIG. 46 (Policy described at the end) to the area S of the two-dimensional plane data shown in FIG. 48 to translate the addresses (the source IP addresses in this example) of the area S. According to Policy described at the end shown in FIG. 46, the source IP address of a packet whose source IP address ranges from "192.168.1.0" to "192.168.1.255" and whose destination IP address ranges from "10.56.100.0" to "10.56.100.255" is translated into "172.16.10.10". The area S shown in FIG. 48 contains source IP addresses ranging from "192.168.1.0" to "192.168.1.255" and destination IP addresses ranging from "10.56.100.0" to "10.56.100.255". Therefore, the area S has its source IP addresses translated into "172.16.10.10" and its destination IP addresses translated into a range from "10.56.100.0" to "10.56.100.255". FIG. 49 shows two-dimensional plane data after the addresses are translated.

If "snat" and "dnat" are described in an <Action> tag in Policy, then the Policy can be judged as Policy with regard to the address translating function.

After the security policy integrator 111 performs the processing in step d2-1 on the analyzed results of the general-purpose security policies, the security policy integrator 111 performs the integrating process (i.e., ANDing) in step d3 on the analyzed results processed in step d2-1. In the present example, the security policy integrator 111 ANDs the analyzed results shown in FIGS. 48 and 49. The integrated result obtained by ANDing the analyzed results is displayed as the same two-dimensional plane data as shown in FIG. 49.

After step d3, the security policy integrator 111 determines whether there is still an analyzed result to be integrated or not in step d4. If there is still an analyzed result to be integrated, then control goes to step d5. If there is no analyzed result to be integrated, then control goes to step d8. Since there are two analyzed results in this example, control goes to step d8.

In step d8, the address translating policy applied in step d2-1 (or step d5-1 described later) is inversely applied to the integrated result to restore the translated area. As a consequence, a final integrated result is produced. In this example, the area, which contains source IP addresses of "172.16.10.10" and destination IP addresses ranging from "10.56.100.0" to "10.56.100.255", of the two-dimensional plane data obtained as the integrated result in step d3 is in agreement with the area subjected to the address translated indicated by the address translating policy. The two-dimensional plane data are the same as the two-dimensional plane data shown in FIG. 49. Therefore, the address translating policy applied in step d2-1 is inversely applied to the area containing source IP addresses of "172.16.10.10" and destination IP addresses ranging from "10.56.100.0" to "10.56.100.255". As a result, the two-dimensional plane data shown in FIG. 48 are obtained. The integrated result representing the two-dimensional plane data is a final integrated result.

In step d5, as with step d5 shown in FIG. 41, the security policy integrator 111 acquires a next analyzed result. If Policy with regard to the address translating function is described in the general-purpose security policy corresponding to the analyzed result acquired in step d5, the security policy integrator 111 applies the Policy with regard to the address translating function to the analyzed result acquired in step d5 to translate the area of the two-dimensional plane data. This processing is the same as the processing in step d2-1. The security policy integrator 111 then performs, in step d6, the same area processing as with step d3, on the integrated result which has already been derived and the newly acquired analyzed result. Since the processing in step d5-1 is performed, the newly acquired analyzed result is the analyzed result produced after the processing in step d5-1 is performed. After step d6, the security policy integrator 111 determines, in step d7, whether all the analyzed results have been integrated (i.e., ANDed) or not. If all the analyzed results have been integrated, then control goes to step d8. If not all the analyzed results have been integrated, but there is still an analyzed result to be integrated, then control goes back step d5, repeating the processing from step d5.

The security policy management system according to the fourth embodiment, which has been described above, generates general-purpose security policies not depending the types of security devices from setting information having expressions inherent in the security devices, analyzes the general-purpose security policies, and integrates the analyzed results. Therefore, settings of different security devices having identical security functions can be presented to the system administrator without concern over the formats of setting descriptions inherent in the security devices. For example, if there are a plurality of packet filtering security devices, the analyzed results (i.e., summarized results) of the security devices can be integrated to present to the system administrator packets that are permitted to pass through all the security devices and packets that are inhibited from passing through some of the security devices. Furthermore, a setting failure that cannot be detected by individually analyzing general-purpose security policies rather than integrating analyzed results, e.g., a setting failure indicating that there are no packets capable of passing all the security devices, can easily be detected.

In step D3 (see FIG. 35), setting information is extracted and collected from a plurality of security devices 130. If there are analyzed results of general-purpose security policies that have been generated in advance, then setting information may be extracted and collected from at least one security device 130 in step D3. At least one general-purpose security policy may be generated in step D4, and at least one analyzed result may be generated in step D5. The analyzed results that have been generated in advance may be stored in advance in a storage device (not shown in FIG. 34). In step D7, the analyzed results that have been generated in advance may be read from the storage device, and may be integrated with the analyzed result obtained in step D5. The storage device for storing the analyzed result in advance corresponds to an analyzed result memory means.

Fifth Embodiment

Figure 50:
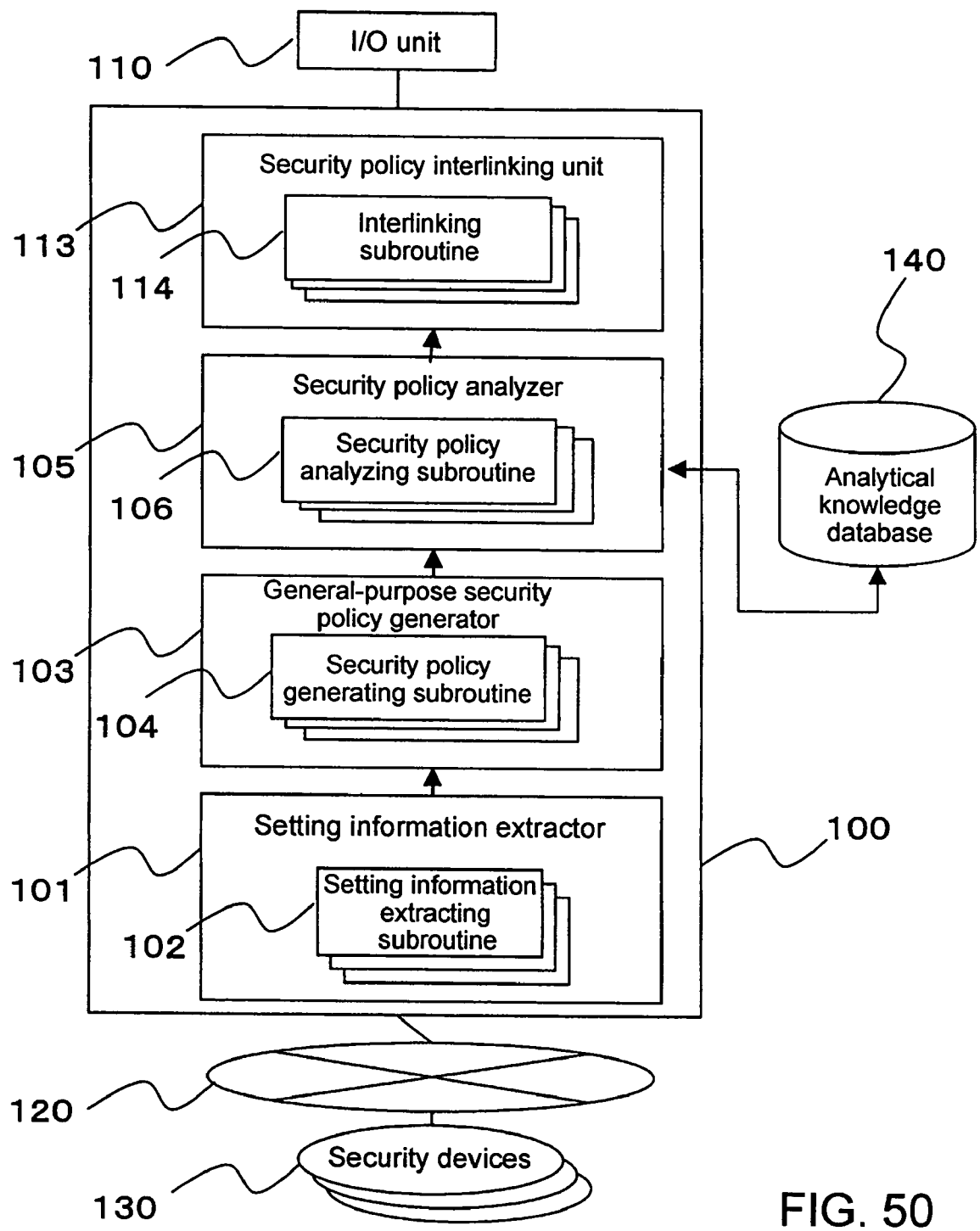
FIG. 50 is a block diagram illustrating an example of a security policy management system according to a fifth embodiment of the present invention.

A security policy management system according to a fifth embodiment of the present invention will be described below. FIG. 50 shows the security policy management system according to the fifth embodiment. Those parts of the security policy management system according to the fifth embodiment shown in FIG. 50 which are identical to those of the security policy management system according to the second embodiment shown in FIG. 15 are denoted by identical reference characters, and will not be described in detail below. Those parts of the security policy management system according to the fifth embodiment shown in FIG. 50 which are identical to those of the security policy management system according to the second embodiment shown in FIG. 15 operate in the same manner as those of the security policy management system according to the second embodiment.

In the security policy management system shown in FIG. 50, the data processing apparatus 100 has a security policy interlinking unit 113 in addition to the setting information extractor 101, the general-purpose security policy generator 103, and the security policy analyzer 105 which are described in the second embodiment. The security policy interlinking unit 113 is realized by a CPU that operates according to a program, for example. The program includes, as a subroutine, at least one interlinking subroutine 114. Each interlinking subroutine 114 corresponds to a combination of individual security functions performed by respective security devices 130. For example, an interlinking subroutine 114 corresponds to a combination of a packet filtering function and an intrusion detecting function (packet monitoring function) of a NIDS (Network Intrusion Detection System). Another interlinking subroutine 114 corresponds to a combination of other security functions. Since an interlinking subroutine 114 corresponds to a combination of plural security functions, an individual interlinking subroutine corresponds to a plurality of security policy analyzing subroutines 106. Each interlinking subroutine 114 is stored in advance in a storage device (not shown in FIG. 50) of the data processing apparatus 100.

The security policy interlinking unit 113 receives general-purpose security policies and analyzed results thereof from the security policy analyzer 105, and performs an interlinking process using the received general-purpose security policies and analyzed results thereof. The security policy interlinking unit 113 performs an interlinking process using a general-purpose security policy (or its analyzed result) derived from setting information of a certain security device and a general-purpose security policy (or its analyzed result) derived from setting information of another security device having another security function. The interlinking process is performed in different modes, i.e., a mode using a plurality of analyzed results and a mode using a certain general-purpose security policy and the analyzed result of another general-purpose security policy. Furthermore, the interlinking process may be performed using a plurality of general-purpose security policies.

When the security policy interlinking unit 113 receives general-purpose security policies and analyzed results thereof from the security policy analyzer 105, it receives general-purpose security policies (or analyzed results thereof) with regard to different security functions. For example, the security policy interlinking unit 113 receives a general-purpose security policy determined for a packet filtering function and an analyzed result of a general-purpose security policy determined for a packet monitoring function. When the security policy analyzer 105 outputs an analyzed result to the security policy interlinking unit 113, it also outputs a general-purpose security policy that has been analyzed to the security policy interlinking unit 113. Therefore, when the security policy interlinking unit 113 receives an analyzed result, it also receives a general-purpose security policy that has been analyzed. In the above example, when the security policy interlinking unit 113 receives an analyzed result of a general-purpose security policy determined for a packet monitoring function, it also receives the general-purpose security policy determined for a packet monitoring function, together with the analyzed result thereof.

As described above, when the security policy interlinking unit 113 receives general-purpose security policies and analyzed results thereof from the security policy analyzer 105, it receives general-purpose security policies (or analyzed results thereof) with regard to different security functions. The security policy interlinking unit 113 calls an interlinking subroutine 114 corresponding to a combination of those security functions, and performs an interlinking process according to the called interlinking subroutine 114. For example, if the security policy interlinking unit 113 receives a general-purpose security policy determined for a packet filtering function and an analyzed result of a general-purpose security policy determined for a packet monitoring function, then the security policy interlinking unit 113 calls an interlinking subroutine 114 corresponding to the combination of the packet filtering function and the packet monitoring function, and performs an interlinking process according to the called interlinking subroutine 114.

It is assumed in the description which follows that analyzed results are described in the descriptive format of the general-purpose security policies.

According to the present invention, the term "interlinking" means referring to general-purpose security policies derived respectively from a plurality of security devices having different security functions or analyzed results of those general-purpose security policies, and finding out a relationship between those security devices thereby to interrelate the general-purpose security policies derived of the security devices having the different security functions. For example, by referring to general-purpose security policies derived respectively from a plurality of security devices having different security functions or analyzed results of those general-purpose security policies, it is possible to detect an unmatch between the security devices having different security functions, which could not be detected simply by individually analyzing the general-purpose security policies.

A specific example will be described below. If a packet passage permission is described in a general-purpose security policy containing a description about a packet filtering function, then it is preferable to sufficiently monitor packets according to NIDS. Conversely, if a packet passage inhibition is described in a general-purpose security policy, then it is not necessary to monitor packets according to NIDS. The above "interlinking" process makes it possible to detect an unmatch representing that NIDS monitoring is not sufficient or NIDS monitoring is excessive (more than necessary).

Interlinking is performed according to a predetermining interlinking principle. For example, an interlinking subroutine 114 is generated in advance according to a certain interlinking principle, and the security policy interlinking unit 113 performs an interlinking process according to the interlinking subroutine 114. One example of interlinking principle is that "it is confirmed whether there is a detail contradictory to a rule established between a security device A and a security device B". According to the interlinking subroutine 114 generated based on such an interlinking principle, the security policy interlinking unit 113 detects an unmatch representing, for example, that "NIDS monitoring is not sufficient though packets are permitted to pass by the packet filtering function" or "unnecessary NIDS monitoring is performed though packets are inhibited from passing by the packet filtering function".

Figure 51:
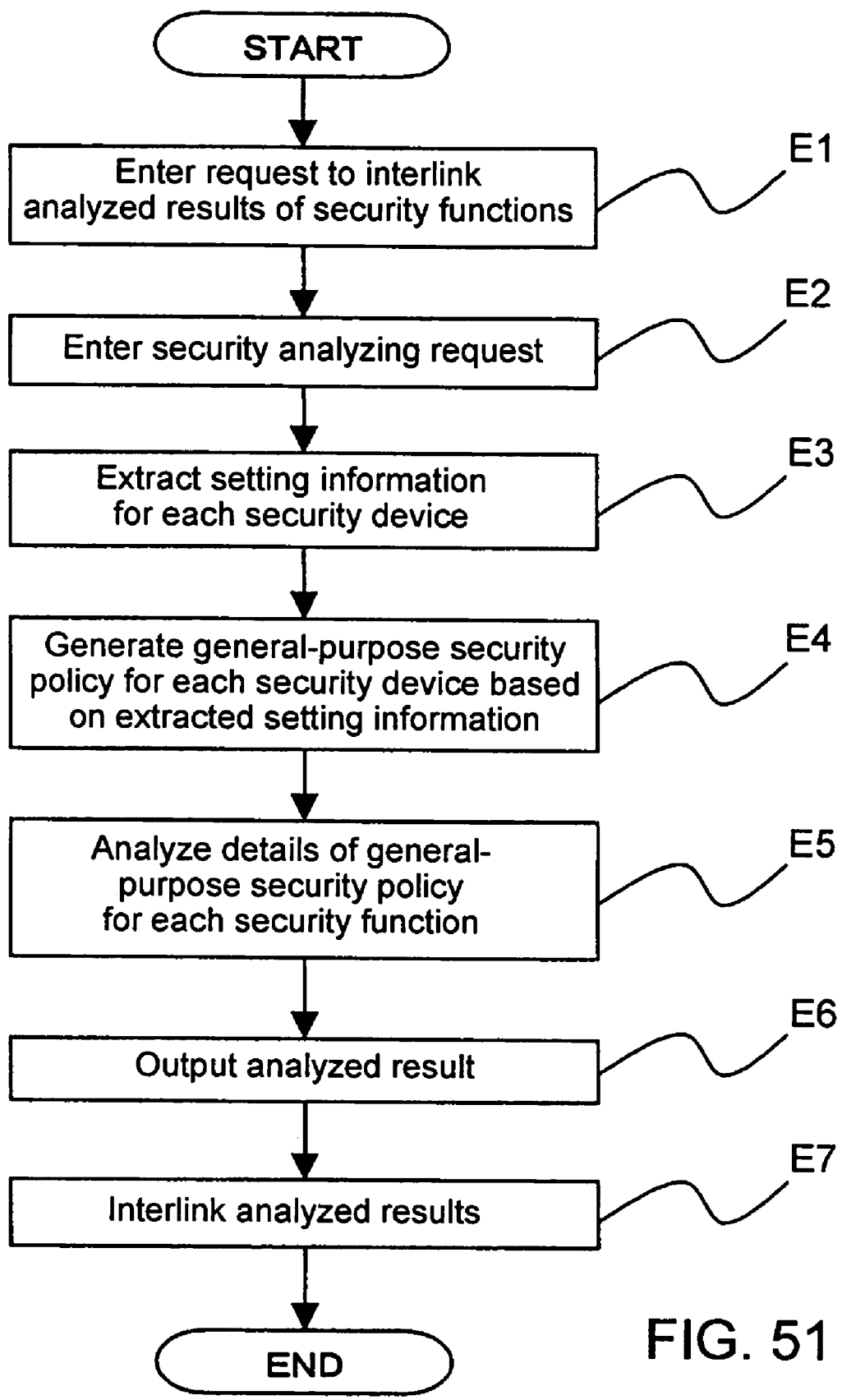
FIG. 51 is a flowchart illustrating an example of an operation sequence of the security policy management system shown in FIG. 50.

Operation of the security policy management system according to the fifth embodiment will be described below with reference to FIG. 51.

In step E1, the system administrator, for example, enters a request to interlink general-purpose security policies and analyzed results of general-purpose security policies through the I/O unit 110 into the data processing apparatus 100. In step E2, the system administrator also enters a security analyzing request through the I/O unit 110 into the data processing apparatus 100. The processing in step E2 is the same as the processing in step B1 (see FIG. 16). When the requests are entered in steps E1, E2, the setting information extractor 101 calls a setting information extracting subroutine 102 for at least two security devices 130 that are connected to the communication network 120, and extracts and collects, in step E3, setting information from the security devices 130 according to the setting information extracting subroutine 102. Then, in step E4, the general-purpose security policy generator 103 calls a security policy generating subroutine 104 corresponding to the security devices 130 from the setting information that is extracted and collected in step E3, and generates general-purpose security policies for the security devices 130 according to the security policy generating subroutine 104. In step E5, the security policy analyzer 105 analyzes the generated general-purpose security policies. Thereafter, in step E6, the security policy analyzer 105 outputs analyzed results from the I/O unit 110, which presents the analyzed results to the system administrator. The processing in steps E3 to E6 is the same as the processing in steps B2 to B5 in the second embodiment.

Then, in step E7, the security policy interlinking unit 113 performs an interlinking process using the general-purpose security policies generated in step E4 or the analyzed results of the security functions analyzed in step E5, and outputs a result of the interlinking process from the I/O unit 110. A specific operation of the security policy management system in the interlinking process will be described later on.

The interlinking process is not limited to interlinking general-purpose security policies derived from two security device having different security functions or analyzed results of such general-purpose security policies. The interlinking process may be performed to interlink general-purpose security policies derived from three or more security device having different security functions or analyzed results of such general-purpose security policies.

Figure 52:
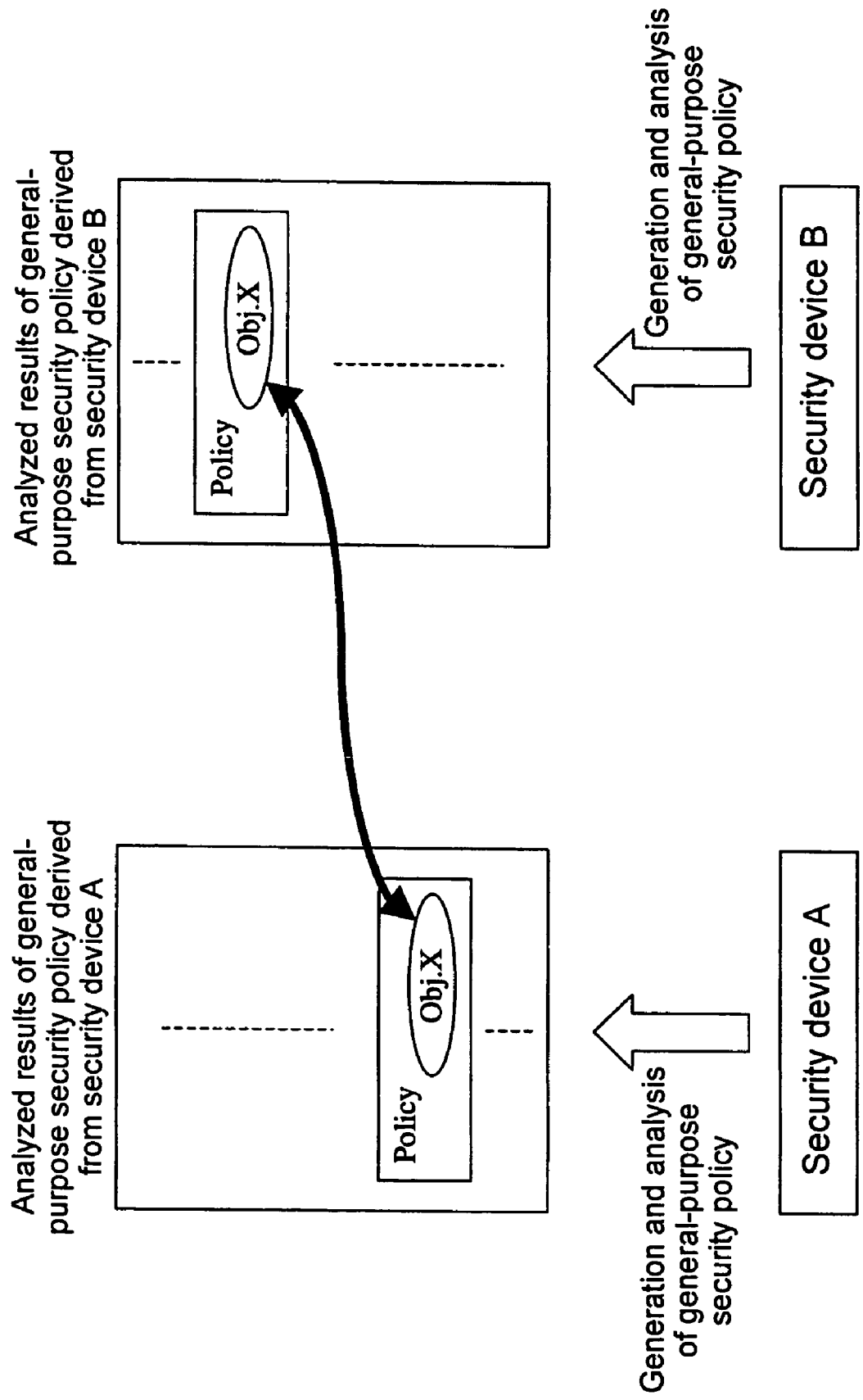
FIG. 52 is a diagram showing a concept of security policy interlinking.

The interlinking process is performed by interrelating objects and attributes described in general-purpose security policies or analyzed results of such general-purpose security policies. It is assumed that an analyzed result is described in the descriptive format of the general-purpose security policies. FIG. 52 shows a concept of security policy interlinking. It is assumed that a security device A and a security device B shown in FIG. 52 are security devices having different security functions. It is also assumed that respective general-purpose security policies are generated from the security device A and the security device B, the general-purpose security policies are analyzed, if necessary, and the analyzed results of the general-purpose security policies are outputted in the descriptive format of the general-purpose security policies. It is also assumed that the analyzed results of the general-purpose security policies contain a description of the same object Obj.X. In this case, the analyzed results of the general-purpose security policies that are generated from the security device A and the security device B which have different security functions are interrelated through Obj.X.

In the example shown in FIG. 52, the analyzed results are interrelated through Obj.X. A general-purpose security policy and an analyzed result of another general-purpose security policy may be interrelated. For example, it is assumed that the general-purpose security policy derived from the security device A and the analyzed result of the general-purpose security policy derived from the security device B contain a description of Obj.X. In this case, the general-purpose security policy derived from the security device A and the analyzed result of the general-purpose security policy derived from the security device B may be interrelated. Similarly, the general-purpose security policies may be interrelated.

A specific example of security policy interlinking will be described below. In this specific example of security policy interlinking, the detection of an unmatch between a policy (rule) with regard to packet filtering and a policy (rule) with regard to NIDS will be described below. A policy (rule) with regard to packet filtering will be referred to as packet filtering policy and a policy (rule) with regard to NIDS as a NIDS policy.

Prior to describing the specific example of security policy interlinking, NIDS, an operation model representing NIDS, a general-purpose security policy expressing the function of NIDS, and a policy (rule) with regard to NIDS will first be described below.

NIDS serves to monitor packets flowing through network segments to detect unauthorized access and faulty states. Detecting processes in NIDS are generally classified into two categories referred to as "signature process" and "analytical process". The signature process employs a database of attach patterns recognized in the past. Generally, one packet pattern is managed as one signature. Packets are captured and compared with signatures to detect attack packets. The analytical process is a process in which NIDS operates for a certain period of time to generate a system profile in normal operation, and if there is an activity different from the system profile in subsequent NIDS operation, the activity is detected as a faulty state. The signature process is mainly used as the detecting process in NIDS. In the description that follows, the signature process is used as the detecting process in NIDS.

When NIDS detects unauthorized access, it can send an alert to a console terminal that manages the NIDS or send electronic mail indicative of unauthorized access to the system administrator. Some NIDS products have signatures grouped depending on their types and classified into units called categories.

Figure 53:
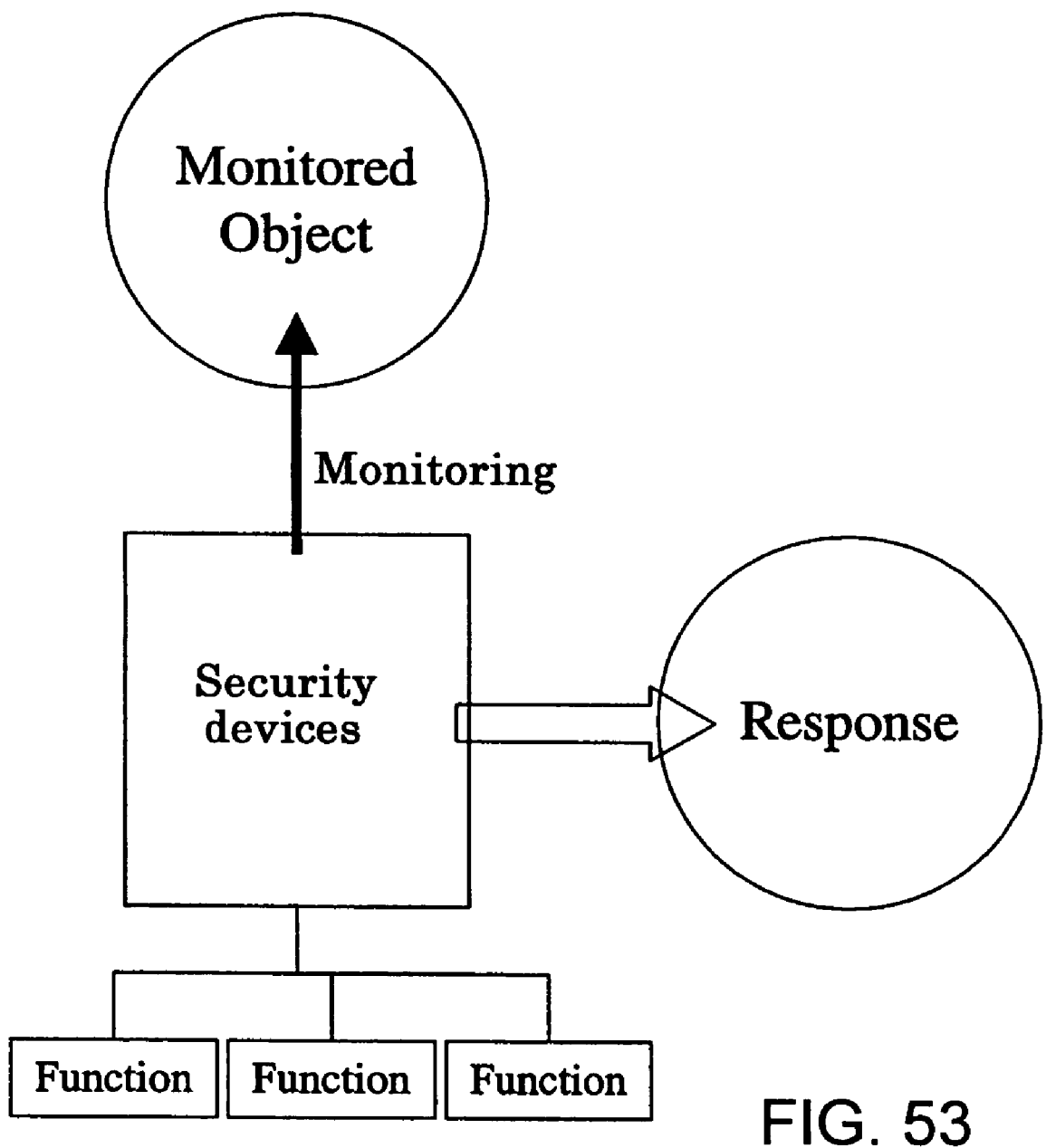
FIG. 53 is a diagram showing another example of the operation model of a security function.

FIG. 53 shows another example of a model of the operation of a security function different from FIG. 5. Specifically, FIG. 53 shows an operation model of a security device such as NIDS which performs monitoring. The security device represented by the model operates to "monitor an object represented by MonitorObject and output Response depending on the monitored situation".

Security devices whose operation can be expressed by the operation mode shown in FIG. 53 include NIDS, a device with file falsification monitoring software installed therein, a device with log monitoring software installed therein, etc. Security functions that these security devices have include a packet monitoring function, a file falsification monitoring function, a log monitoring function, etc.

Items described in the general-purpose security policy of the security device having the operation model shown in FIG. 53 will be described below. Operation based on a security function is expressed by Function indicative of a security function for monitoring, MonitoredObject indicative of an object to be monitored, and Responses indicative of a set of actions to be made when a packet pattern that agrees with a certain signature is detected.

FIG. 54 shows an example of a general-purpose security policy of NIDS.

A portion between a pair of <Policy> tags represents a rule contained in setting information of a security device for monitoring. For example, a notation between the paired <Policy> tags represents a rule indicating, for example, that "a packet for causing a particular event is monitored, and an alert is sent when such a packet is detected".

A portion between a pair of <Target> tags represents a combination of Function, MonitoredObject, and Responses which indicate operation of a security device.

A portion between a pair of <Function> tags has a child element indicative of a security function, and indicates an attribute of the security function with a grandchild element. One example of child element indicative of a security function is PacketMonitoring representing a packet monitoring function. One example of grandchild element is Enabled indicative of whether monitoring an object indicated by MonitoredObject, to be described later, is valid or invalid. If Enabled is false, then it means that object monitoring is invalid, and if Enabled is true, then it means that object monitoring is valid. In the example shown in FIG. 54, Priority is also described as another grandchild element in the notation between the paired <Function> tags. Priority represents a level of importance of an alert when the outputting of the alert is recorded. In FIG. 54, since Priority is described as "Low", an alert is outputted according to Policy (rule) shown in FIG. 54, and when the outputting of the alert is recorded in the log, "Low" is recorded as a level of importance of the alert, i.e., a low level of importance is recorded. By thus recording details of Priority, the recorded information in the log can be classified according to the level of importance of alerts.

A portion between a pair of <MonitoredObject> tags has a child element indicative of an object to be monitored. One example of child element in NIDS is SecurityEvent indicative of monitoring based on signatures. If SecurityEvent is described as a child element in the area between the paired <MonitoredObject> tags, then it means that monitoring based on signatures is performed. SecurityEvent has, as a child element thereof, EventName describing an event name to be monitored according to signatures. In the example shown in FIG. 54, FTP_get is described as EventName.

A portion between a pair of <Responses> tags represents an action to be made when a particular event is detected. Since a plurality of actions can often be simultaneously made, a <Responses> tag has a plurality of <Response> tags each as a child element. Each of the <Response> tags has a child element indicative of one action, whose attribute is indicated by a grandchild element. Examples of actions include "EMAIL" indicating the detection of an event to the system administrator by electronic mail, "SNMP" sending an alert to the SNMP (Simple Network Management Protocol) manager by an SNMP trap, etc. The IP address of a mail server and the destination address of a mail are indicated as an attribute of "EMAIL". The IP address of the SNMP manager, etc. is indicated as an attribute of "SNMP". In the example shown in FIG. 54, the first <Response> tag in the portion between the paired <Responses> tags is followed by a child element "EMAIL", a grandchild element "Gateway" indicative of the IP address "10.10.10.5" of a mail server, and a grandchild element "Account" indicative of the destination IP address "admin@abcde.com" of an e-mail. The second tag <Response> in the portion between the paired <Responses> tags is followed by a child element "SNMP" and a grandchild element "Manager" indicative of the IP address of an SNMP manger which is the recipient of an alert.

Other elements and attributes are identical to those in the examples (see FIGS. 8 and 9) of the format of the XML documents representing the general-purpose security policy of a security device which can be expressed by the operation model shown in FIG. 5, and will not be described below.

An example of interlinking a packet filtering policy and an NIDS policy according to the present embodiment will be described below. As with the first to fourth embodiments, setting information is extracted from a security device of NIDS in step E3 (see FIG. 51), and a general-purpose security policy of the above format is generated in step E4 (see FIG. 51).

Then, as with the second to fourth embodiments, an NIDS security policy is analyzed in step E5 (see FIG. 5). For interlinking a packet filtering policy and an NIDS policy, a general-purpose security policy derived from a security device which performs packet filtering need not be analyzed.

It is assumed that a service is identified by a protocol and a port number that are related to the service. An example in which, based on the above assumption, a signature is classified by a service and a general-purpose security policy of NIDS, i.e., a general-purpose security policy derived from setting information of NIDS, is analyzed will be described below.

Usually, one event is held in one-to-one correspondence to a signature which monitors the event. In NIDS, one signature is validated to monitor one event corresponding to the signature. One NIDS product has more than several hundred signatures though the number of signature varies from product to product. Therefore, as described above, some NIDS products have signatures classified into units called categories. However, a guideline for classifying signatures into categories is so vague that any classifications which are achieved are not significant. According to the present embodiment, signatures are classified by a guideline referred to as services. This classification process makes it possible to easily grasp which services are well monitored and which services are not well monitored by NIDS.

FIG. 55 shows an example of information required to analyze a general-purpose security policy of NIDS. This information is stored in advance in the analytical knowledge database 140, and read by the security policy analyzer 105 when it analyzes a general-purpose security policy of NIDS.

In the information shown in FIG. 55, EventName, CategoryName, and VulnerabilityProtocol are associated with each other. VulnerabilityProtocol includes Protocol, SrcPort, and DestPort. EventName represents the name of an event monitored by a signature. CategoryName represents the name of a category to which the signature belongs. VulnerabilityProtocol represents a protocol, a source port number, and a destination port number which are monitored by the signature. Specifically, Protocol included in VulnerabilityProtocol represents a protocol monitored by the signature, and SrcPort and DestPort included in VulnerabilityProtocol represent a source port number and a destination port number, respectively, which are monitored by the signature.

The security policy analyzer 105 analyzes the general-purpose security policy of NIDS to associate EventName described in the general-purpose security policy of NIDS and CategoryName and VulnerabilityProtocol stored in the analytical knowledge database 140, and obtains an analyzed result. The analyzed result is described in the descriptive format of the general-purpose security policies.

Figure 56:
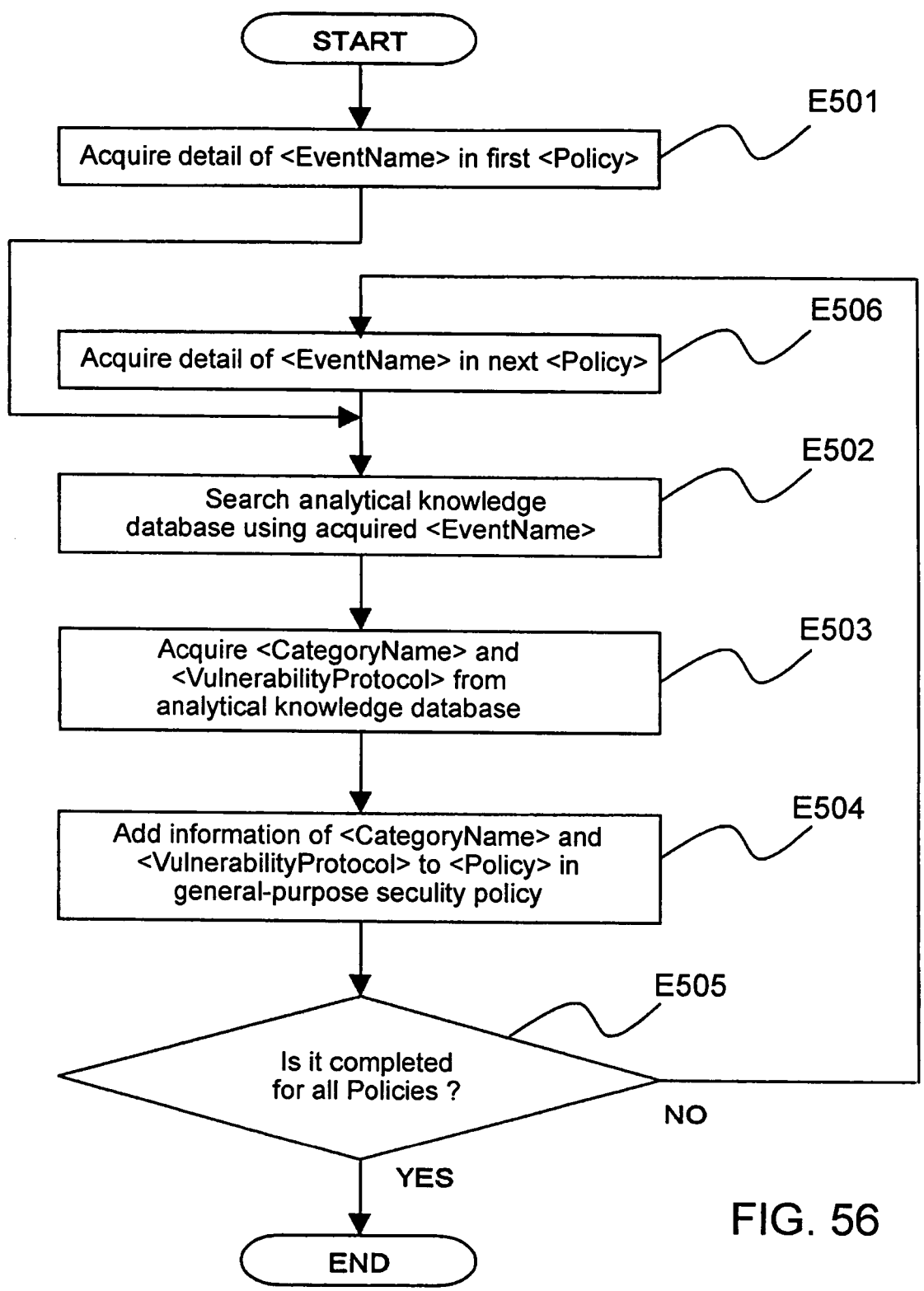
FIG. 56 is a flowchart illustrating an example of a process for analyzing a general-purpose security policy of NIDS.

FIG. 56 shows by way of example an analyzing process for analyzing a general-purpose security policy of NIDS. In step E501, the security policy analyzer 105 selects the first Policy from a general-purpose security policy of NIDS that is generated in step E4 (see FIG. 51), and acquires the detail of EventName in the selected Policy. Then, in step E502, the security policy analyzer 105 searches the information shown in FIG. 55 which is stored in the analytical knowledge database 140 for the information of CategoryName and VulnerabilityProtocol corresponding to EventName acquired in step E501. Then, in step E503, the security policy analyzer 105 acquires the information of CategoryName and VulnerabilityProtocol searched for in step E502, i.e., the information of CategoryName and VulnerabilityProtocol corresponding to EventName, from the analytical knowledge database 140. Then, in step E504, the security policy analyzer 105 adds the information acquired in step E503 to the general-purpose security policy. Specifically, the security policy analyzer 105 adds CategoryName and VulnerabilityProtocol as child elements of SecurityEvent in the selected Policy. FIG. 57 shows an example of a general-purpose security policy with the information of CategoryName and VulnerabilityProtocol added thereto. As shown in FIG. 57, the security policy analyzer 105 describes the information of CategoryName between a pair of <CategoryName> tags. Similarly, the security policy analyzer 105 describes the information of VulnerabilityProtocol, i.e., Protocol, SrcPort, and DestPort, between a pair of <VulnerabilityProtocol> tags. The security policy analyzer 105 describes the information of Protocol, SrcPort, and DestPort respectively between a pair of <Protocol> tags, a pair of <SrcPort> tags, and a pair of <DestPort> tags.

In step E505, the security policy analyzer 105 determines whether the association of EventName and CategoryName has been completed up to the last Policy in the general-purpose security policy or not. If the association has been completed, then the analyzing process is put to an end. If the association has not been completed, then the security policy analyzer 105 selects next Policy in the general-purpose security policy and acquires the detail of EventName in the selected Policy in step E506 Then, control goes from step E506 to step E502, repeating the processing from step E502. As a result, the security policy analyzer 105 obtains an analyzed result in the descriptive format shown in FIG. 57.

Before interlinking the general-purpose security policy determined for packet filtering and the analyzed result of the NIDS security policy, the analyzed result of the NIDS security policy may be displayed.

Figure 58:
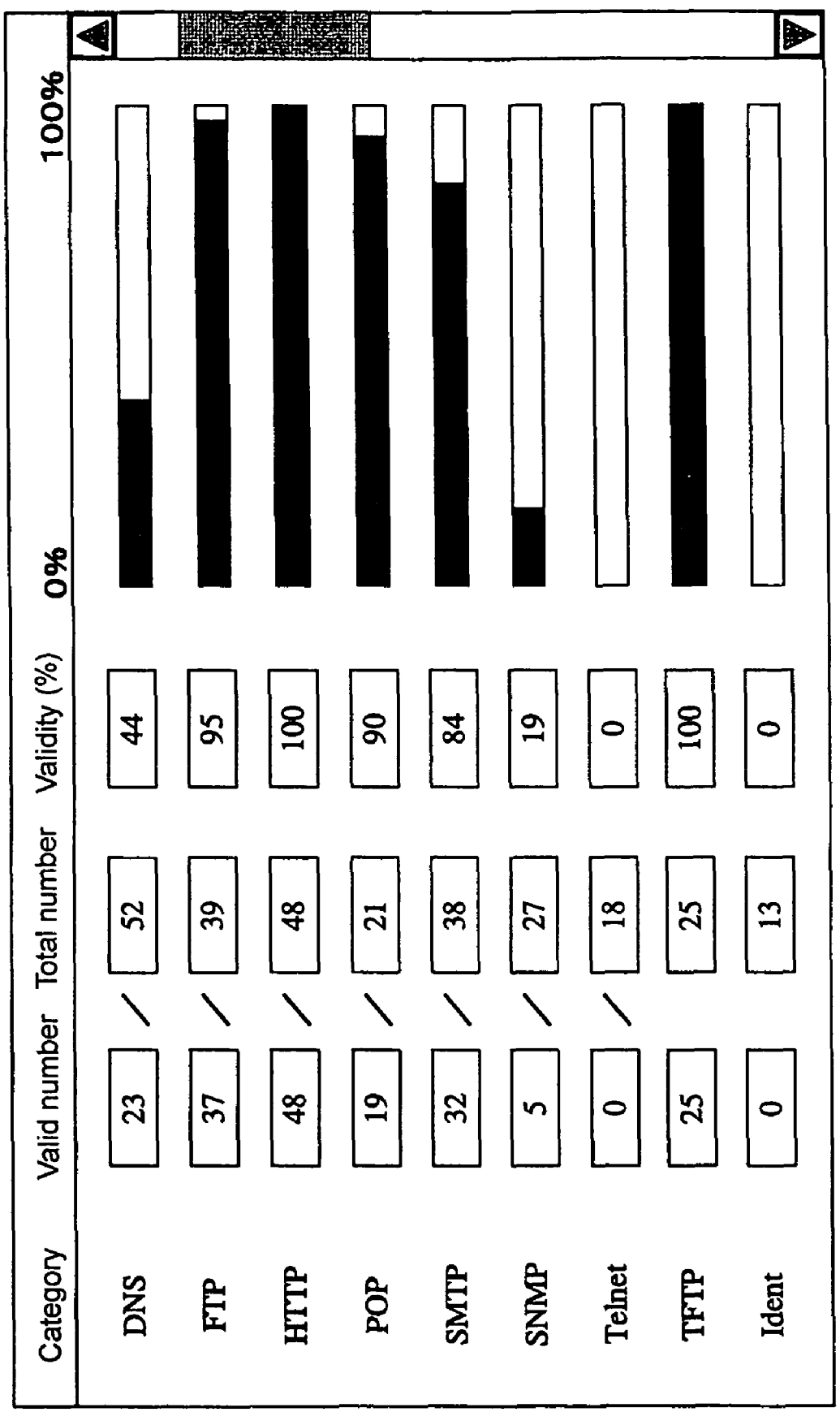
FIG. 58 is a view showing a displayed example of a result produced by analyzing a general-purpose security policy of NIDS.

FIG. 58 shows a displayed example of the analyzed result produced by analyzing a NIDS security policy. The displayed example shown in FIG. 58 contains the names, e.g., DNS (domain name server), of categories into which signatures are classified based on protocol and port number, the total numbers of signatures (events) belonging to the categories, the numbers of valid ones (valid numbers) of the signatures belonging to the categories, and validity percentages of signatures.

A value displayed as the total number of signatures (events) belonging to each of the categories represents the total number of SecurityEvents having the same CategoryName as a child element in the analyzed result in the descriptive format shown in FIG. 57. In NIDS, signatures are added day by day. Therefore, the total number of signatures (events) in the analyzed result of a general-purpose security policy generated from setting information of NIDS may not necessarily be constant. For displaying the image shown in FIG. 58, the security policy analyzer 105, after it has extracted setting information and derived an analyzed result in the descriptive format shown in FIG. 57, may count the total number of SecurityEvents each having the same CategoryName as a child element and display the counted value as "total number".

The valid number for each category represents the number of SecurityEvents each having a true (valid) description of Enabled in a portion between associated paired <Function> tags, among SecurityEvents each having the same CategoryName as a child element. The security policy analyzer 105 may count and display this number as a valid number.

The validity percentage for each category is calculated as {(valid number)/(total number of signatures)}×100 [%]. The security policy analyzer 105 may display a validity percentage obtained by the above calculation. The security policy analyzer 105 may display validity percentages not only as numerical values as shown in FIG. 58, but also as graphs. When validity percentages are displayed, it is easy to grasp whether packets are sufficiently monitored or not for each of various services including "DNS", "FTP", "HTTP", etc. shown in FIG. 58.

If categories are classified by protocol and port number, then general service names may not be given to some services. In such a case, a combination of protocol and port number may be displayed as a category name instead of a general service name such as "DNS" shown in FIG. 58.

A specific example of security policy interlinking will be described below.

If an unmatch between a policy (rule) with regard to packet filtering and a policy (rule) with regard to NIDS is to be detected by a security policy interlinking process, then a general-purpose security policy determined for a packet filtering function and an analyzed result of a general-purpose security policy of NIDS are employed. The security policy analyzer 105 is not required to analyze a general-purpose security policy determined for a packet filtering function, but may output the general-purpose security policy directly to the security policy interlinking unit 113. The security policy analyzer 105 performs the analyzing process shown in FIG. 56 on a general-purpose security policy derived from NIDS, and outputs the general-purpose security policy and an analyzed result thereof to the security policy interlinking unit 113. Therefore, the security policy interlinking unit 113 receives the general-purpose security policy derived from NIDS and its analyzed result, and also the general-purpose security policy determined for the packet filtering function. The security policy interlinking unit 113 then detects an unmatch between the general-purpose security policy determined for the packet filtering function and the analyzed result of the general-purpose security policy of NIDS, and outputs the detected unmatch.

It is assumed that the security policy analyzer 105 outputs a general-purpose security policy shown in FIG. 59 as a general-purpose security policy determined for a packet filtering function to the security policy interlinking unit 113. In the general-purpose security policy shown in FIG. 59, "200.100.100.10" is described as DestIP, "21" as DestPort, and "accept" as Action. Therefore, the general-purpose security policy shown in FIG. 59 indicates that it permits access to an FTP service (port number 21) on a server having an IP address "200.100.100.10".

It is assumed that the security policy analyzer 105 outputs the analyzed result shown in FIG. 57 as an analyzed result of a general-purpose security policy derived from NIDS to the security policy interlinking unit 113. In the analyzed result shown in FIG. 57, FTP_Get is described as EventName, "21" as DestPort, and false as Enabled. Therefore, the analyzed result shown in FIG. 57 indicates that a signature for monitoring an event with regard to an FTP service (port number 21) whose signature name (event name) is represented by FTP_Get is invalidated.

Figure 60:
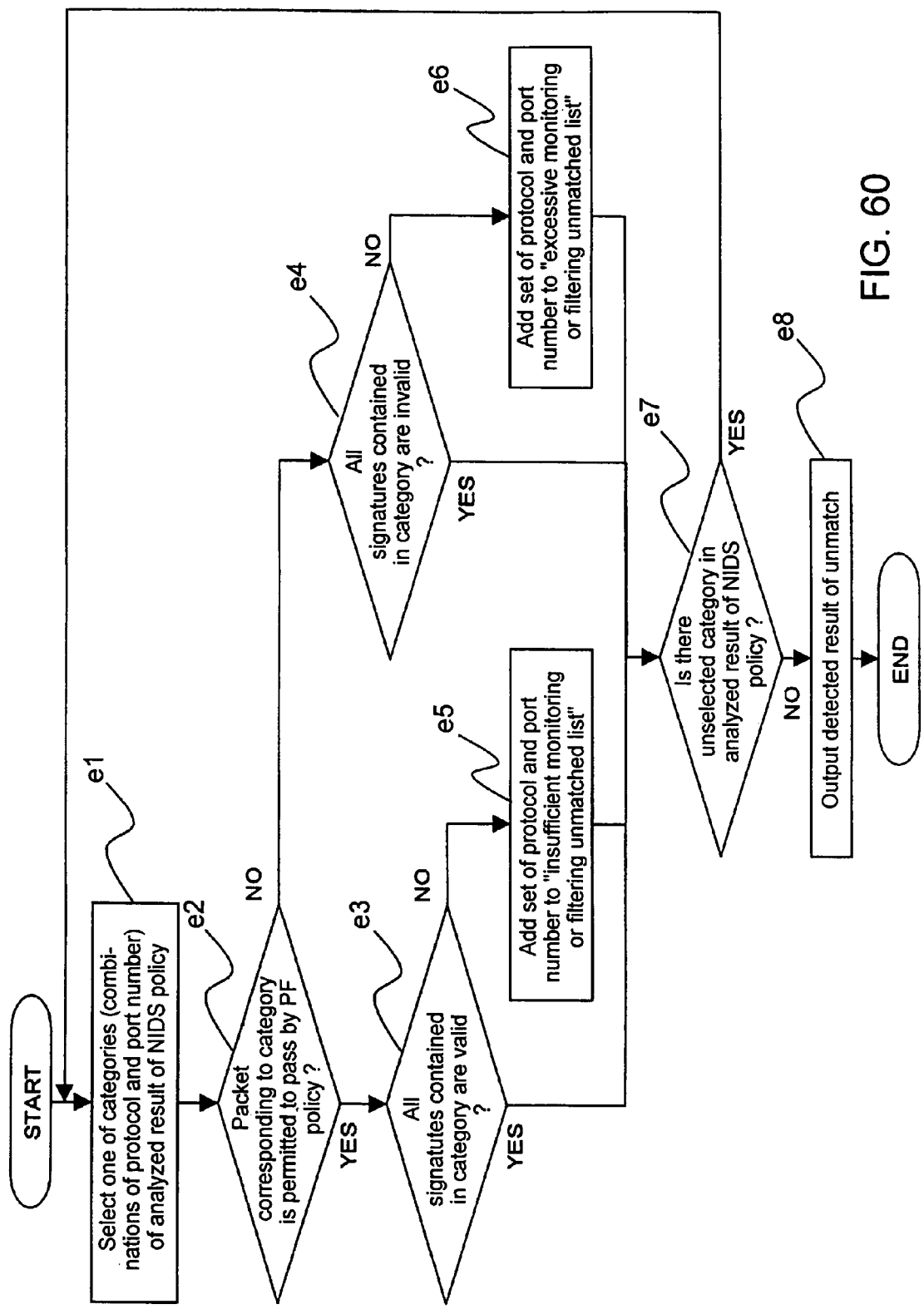
FIG. 60 is a flowchart illustrating an example of a process for interlinking a packet filtering policy and an NIDS policy.

FIG. 60 shows by way of example an interlinking process for interlinking a packet filtering policy and an NIDS policy. The interlinking process is a process corresponding to step E7 shown in FIG. 51. The interlinking process shown in FIG. 60 detects an unmatch between a packet filtering policy and an NIDS policy.

In step e1, the security policy interlinking unit 113 selects one of categories of an analyzed result of an NIDS policy. That is, the security policy interlinking unit 113 selects one of categories from an analyzed result (the analyzed result shown in FIG. 57 in this example) of a general-purpose security policy derived from NIDS. Signatures are classified into categories by combinations of protocol and port number. In step e1, therefore, one combination of protocol and port number may be selected as a category. A combination of protocol and port number is described as VulnerabilityProtocol in the analyzed result. Specifically, it is described as Protocol (protocol), SrcPort (source port number), and DestPort (destination port number) which child elements of VulnerabilityProtocol. Thus, the security policy interlinking unit 113 may acquire the details of Protocol, SrcPort, and DestPort from the analyzed result. With the analyzed result shown in FIG. 57, since details of Protocol, SrcPort, and DestPort are "tcp", "any", and "21", respectively, the security policy interlinking unit 113 acquires a combination "tcp, any, 21". In step e1, the security policy interlinking unit 113 may acquire a combination of protocol and port number and also CategoryName corresponding to that combination. In the present example, it is assumed that a combination of protocol and port number and CategoryName thereof are acquired. Therefore, the security policy interlinking unit 113 acquires the combination and CategoryName(FTP) corresponding to the combination.

In step e2, the security policy interlinking unit 113 determines whether packets corresponding to Protocol, SrcPort, and DestPort acquired from the analyzed result of the NIDS policy are permitted to pass or not in a general-purpose security policy determined for a packet filtering function (the general-purpose security policy shown in FIG. 59 in this example). If the packets are permitted to pass, then control goes to step e3, and if the packets are inhibited from passing, then control goes to step e4.

It is assumed in step e1 that the security policy interlinking unit 113 has acquired a combination "tcp, any, 21" as details of Protocol, SrcPort, and DestPort. When a description having the same details as those of the acquired combination is searched for in the general-purpose security policy determined for the packet filtering function, it is understood that the details of Protocol, SrcPort, and DestPort are described respectively as "tcp", "any", "21". A detail of Action corresponding to the above description is described as "accept" (see FIG. 59). Consequently, the security policy interlinking unit 113 judges that packets corresponding to Protocol, SrcPort, and DestPort that are acquired are permitted to pass, and control goes to step e3.

In step e3, the security policy interlinking unit 113 determines whether all signatures belonging to the category selected in step e1 are validated or not in the analyze result of the NIDS policy. Specifically, the security policy interlinking unit 113 may search for a category whose details are the same as the details of the category comprising the combination of Protocol, SrcPort, and DestPort, which has been selected in step e1, and may determine whether the descriptions of Enabled corresponding to that category are all true (valid) or not. If the descriptions of Enabled corresponding to the selected category are all true, i.e., if all signatures belonging to the category selected in step e1 are validated, then control goes to step e7. If either one of the descriptions of Enabled corresponding to the selected category is false, i.e., if either one of the signatures belonging to the category selected in step e1 is invalidated, then control goes to step e5.

In the present example, as shown in FIG. 57, one of the descriptions of Enabled corresponding to the selected category, i.e., the combination of "tcp, any, 21" is false. Therefore, since one of the signatures belonging to the category selected in step e1 is invalidated, control goes to step e5.

In step e5, the security policy interlinking unit 113 stores the information of CategoryName, Protocol, SrcPort, and DestPort of the category selected in step e1 and the attribute policyID of Policy which is causing an unmatch in the packet filtering policy and the NIDS policy in an "insufficient monitoring or filtering unmatched list". FIG. 61 shows an example of such an "insufficient monitoring or filtering unmatched list". As shown in FIG. 61, CategoryName, Protocol, SrcPort, DestPort, "NIDS policy attribute policyID list", and "packet filtering policy attribute policyID list" are stored in the "insufficient monitoring or filtering unmatched list" shown in FIG. 61. The security policy interlinking unit 113 stores the information of CategoryName, Protocol, SrcPort, and DestPort of the category selected in step e1 in the "insufficient monitoring or filtering unmatched list" shown in FIG. 61.

The security policy interlinking unit 113 also stores the attribute policyID of Policy which is causing an unmatch in the packet filtering policy in a "packet filtering policy attribute policyID list" (see FIG. 61) of the "insufficient monitoring or filtering unmatched list". At this time, the security policy interlinking unit 113 may identify Policy which is causing an unmatch in the packet filtering policy as follows: Of Policies in which values agreeing with Protocol, SrcPort, and DestPort acquired in step e1 are described in the <Protocol> tag, <SrcPort> tag, <DestPort> tag, Policy having a highest level of priority and having "accept" described in the <Action> tag may be identified. The security policy interlinking unit 113 stores the attribute policyID of Policy which satisfies the above condition in the "packet filtering policy attribute policyID list".

The security policy interlinking unit 113 also stores the attribute policyID of Policy which is causing an unmatch in the NIDS policy in the "NIDS policy attribute policyID list" (see FIG. 61) of the "insufficient monitoring or filtering unmatched list". At this time, the security policy interlinking unit 113 may identify Policy which is causing an unmatch in the NIDS policy as follows: Policy having a category whose details are the same as the details of the category comprising the combination of Protocol, SrcPort, and DestPort selected in step e1, wherein the description of Enabled corresponding to the category is false, may be identified. The security policy interlinking unit 113 stores the attribute policyID of Policy which satisfies the above condition in the "NIDS policy attribute policyID list".

In the example shown in FIG. 61, the information of an FTP category in which the combination of Protocol, SrcPort, and DestPort is the combination "tcp, any, 21" is stored in the "insufficient monitoring or filtering unmatched list".

After the security policy interlinking unit 113 has executed step e5, control goes to step e7.

If packets corresponding to Protocol, SrcPort, and DestPort acquired from the analyzed result of the NIDS policy are inhibited from passing in a general-purpose security policy determined for a packet filtering function, i.e., if NO is selected in step e2, then control goes to step e4. In step e4, the security policy interlinking unit 113 determines whether all signatures belonging to the category selected in step e1 are invalidated or not in the analyze result of the NIDS policy. Specifically, in step e4, the security policy interlinking unit 113 may search for a category whose details are the same as the details of the category comprising the combination of Protocol, SrcPort, and DestPort selected in step e1, and may determine whether the descriptions of Enabled corresponding to that category are all false (invalid) or not. If the descriptions of Enabled corresponding to the selected category are all false, i.e., if all signatures belonging to the category selected in step e1 are invalidated, then control goes to step e7. If either one of the descriptions of Enabled corresponding to the selected category is true, i.e., if either one of the signatures belonging to the category selected in step e1 is validated, then control goes to step e6.

In step e6, the security policy interlinking unit 113 stores the information of CategoryName, Protocol, SrcPort, and DestPort of the category selected in step e1 and the attribute policyID of Policy which is causing an unmatch in the packet filtering policy and the NIDS policy in an "excessive monitoring or filtering unmatched list". The "excessive monitoring or filtering unmatched list" has a data structure which may be the same as the data structure of the "insufficient monitoring or filtering unmatched list". Therefore, as with the "insufficient monitoring or filtering unmatched list" shown in FIG. 61, CategoryName, Protocol, SrcPort, DestPort, "NIDS policy attribute policyID list", and "packet filtering policy attribute policyID list" are stored in the "excessive monitoring or filtering unmatched list". The security policy interlinking unit 113 stores the information of CategoryName, Protocol, SrcPort, and DestPort of the category selected in step e1 in the "excessive monitoring or filtering unmatched list".

The security policy interlinking unit 113 also stores the attribute policyID of Policy which is causing an unmatch in the packet filtering policy in a "packet filtering policy attribute policyID list" of the "excessive monitoring or filtering unmatched list". At this time, the security policy interlinking unit 113 may identify Policy which is causing an unmatch in the packet filtering policy as follows: Of Policies in which values agreeing with Protocol, SrcPort, and DestPort acquired in step e1 are described in the <Protocol> tag, <SrcPort> tag, <DestPort> tag, Policy having a highest level of priority and having "deny" described in the <Action> tag may be identified. The security policy interlinking unit 113 stores the attribute policyID of Policy which satisfies the above condition in the "packet filtering policy attribute policyID list".

The security policy interlinking unit 113 also stores the attribute policyID of Policy which is causing an unmatch in the NIDS policy in the "NIDS policy attribute policyID list" of "excessive monitoring or filtering unmatched list". At this time, the security policy interlinking unit 113 may identify Policy which is causing an unmatch in the NIDS policy as follows: Policy having a category whose details are the same as the details of the category (i.e., the combination of Protocol, SrcPort, and DestPort) selected in step e1 wherein the description of Enabled corresponding to the category is true, may be identified. The security policy interlinking unit 113 stores the attribute policyID of Policy which satisfies the above condition in the "NIDS policy attribute policyID list".

After the security policy interlinking unit 113 has executed step e6, control goes to step e7.

In step e7, the security policy interlinking unit 113 determines whether there is a category which has not yet been selected in the analyzed result of the NIDS policy or not. If there is a category which has not yet been selected in the analyzed result of the NIDS policy, i.e., if YES is selected in step e7, then control goes to step e1, repeating the processing from step e1. If there is not a category which has not yet been selected in the analyzed result of the NIDS policy, then control goes to step e8.

In step e8, the security policy interlinking unit 113 outputs the "insufficient monitoring or filtering unmatched list" and the "excessive monitoring or filtering unmatched list" as the detected results of an unmatch in the packet filtering policy and the NIDS policy.

Figure 62:
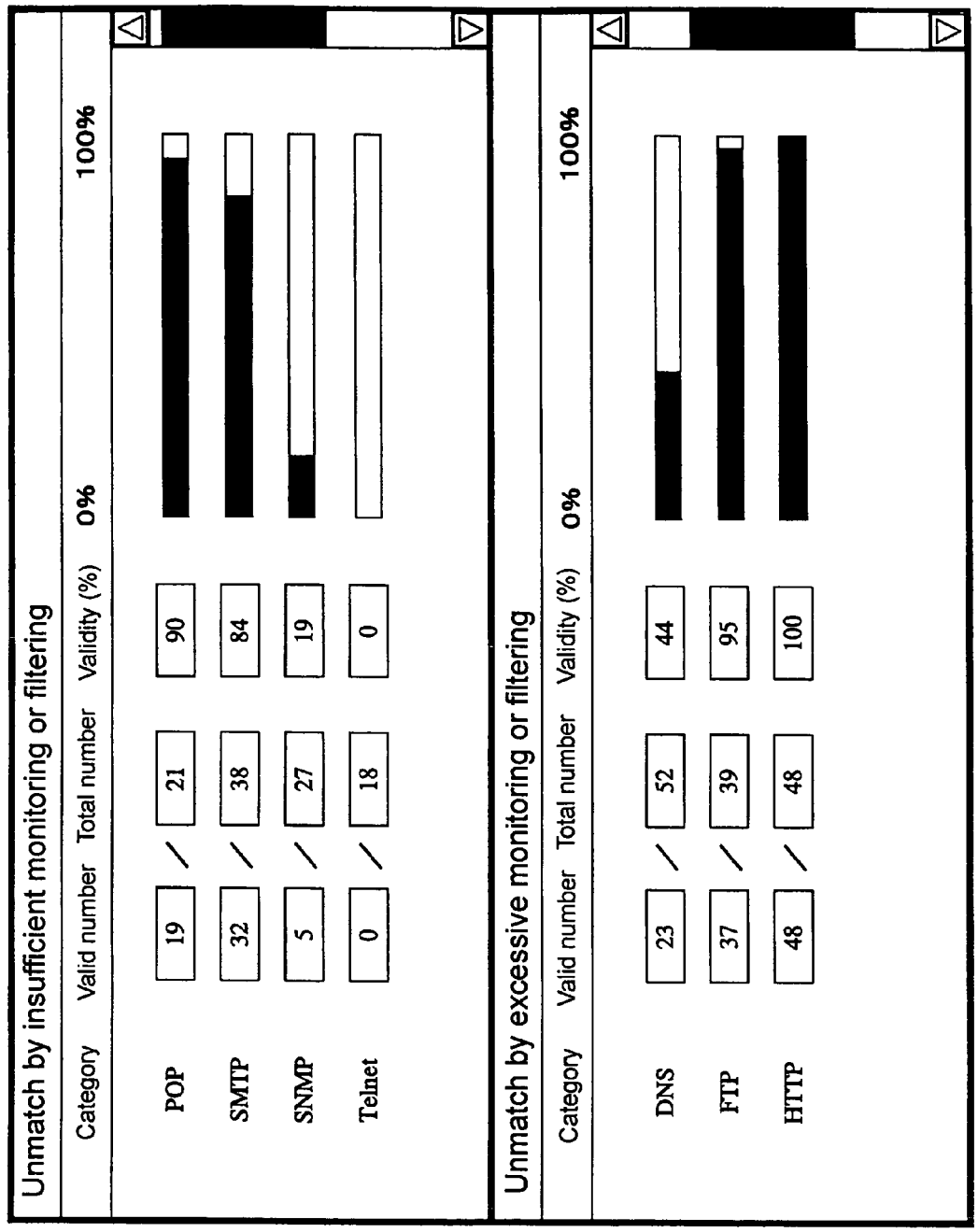
FIG. 62 is a diagram showing an example of an output image of detected results of an unmatch between a packet filtering policy and an NIDS policy.

FIG. 62 shows an example of an output image of detected results of an unmatch between a packet filtering policy and an NIDS policy. In the output image shown in FIG. 62, the "insufficient monitoring or filtering unmatched list" is displayed in an upper image area. Specifically, as with the example shown in FIG. 58, a valid number, a total number, and a validity percentage are calculated and displayed for each category that is identified by the combination of Protocol, SrcPort, and DestPort stored in the "insufficient monitoring or filtering unmatched list". In the output image shown in FIG. 62, furthermore, the "excessive monitoring or filtering unmatched list" is displayed in a lower image area. Specifically, as with the example shown in FIG. 58, a valid number, a total number, and a validity percentage are calculated and displayed for each category that is identified by the combination of Protocol, SrcPort, and DestPort stored in the "excessive monitoring or filtering unmatched list".

The displayed "insufficient monitoring or filtering unmatched list" as shown in FIG. 62 makes it possible to present to the security manager that though packets are permitted to pass by the packet filtering policy, the packets are not sufficiently monitored by the NIDS policy. Specifically, it is possible to present to the security manager that if the packet filtering policy is correct, then packet monitoring in NIDS is not sufficient, and an omission in the monitoring is occurring, with a possible setting failure of NIDS. When all the signatures belonging to the category are invalidated, it is also possible to present to the security manager that if the NIDS policy is correct, then packets to be inhibited from passing by packet filtering are permitted to pass, or stated otherwise, an omission is possibly occurring in packet filtering.

Based on the displayed lists, the security manager may confirm the packet filtering policy, and may correct the NIDS policy for sufficient packet monitoring in NIDS if the security manager judges that the packet filtering policy is correct. Specifically, the security manager may change the description of Enabled from false to true. For example, if all signatures belonging to a category, such as the category Telnet, are invalidated, then the security manager may confirm whether a service with regard to that category is being performed, and may correct the packet filtering policy to prevent packets of the service from passing if the service is not being performed.

The displayed "excessive monitoring or filtering unmatched list" as shown in FIG. 62 makes it possible to present to the security manager that though packets are inhibited from passing by the packet filtering policy, the packets are excessively monitored by the NIDS policy. Specifically, it is possible to present to the security manager that if the packet filtering policy is correct, then packet monitoring in NIDS is excessive, with a possible setting failure of NIDS. When all the signatures belonging to the category are validated, it is also possible to present to the security manager that if the NIDS policy is correct, then packets to be permitted to pass by packet filtering are inhibited from passing, or stated otherwise, packet filtering is performed excessively.

Based on the displayed lists, the security manager may confirm the packet filtering policy, and may correct the NIDS policy for avoiding excessive packet monitoring in NIDS if the security manager judges that the packet filtering policy is correct. Specifically, the security manager may change the description of Enabled from true to false. For example, if all signatures belonging to a category, such as the category HTTP, are validated, then the security manager may confirm whether a service with regard to that category is being performed, and may correct the packet filtering policy to permit packets of the service to pass if the service is being performed.

FIG. 63 shows another example of an output image of detected results of an unmatch between a packet filtering policy and an NIDS policy. In the output image shown in FIG. 63, when one unmatch in the displayed unmatch list is selected, a corresponding unmatched portion of the packet filtering policy and a corresponding unmatched portion of the NIDS policy are displayed. The output image shown in FIG. 63 includes an unmatched category display area 91, an unmatched NIDS policy ID display area 92, an unmatched packet filtering ID display area 93, a NIDS policy display area 94, and a packet filtering policy display area 95.

The security policy interlinking unit 113 displays a category which is causing an unmatch of "insufficient monitoring or filtering" and an unmatch of "excessive monitoring or filtering" in the unmatched category display area 91.

In the unmatched category display area 91 shown in FIG. 63, details of Protocol, SrcPort, and DestPort are also displayed. "TransportLayer" shown in FIG. 63 represents Protocol. A category displayed in the unmatched category display area 91 is selected by the mouse of the I/O unit 110 and output to the security policy interlinking unit 113. In FIG. 63, "HTTP" is selected.

The security policy interlinking unit 113 extracts the "NIDS policy attribute policyID list" (see FIG. 61) corresponding to the selected category in the unmatched category display area 91 from the "insufficient monitoring or filtering unmatched list" or the "excessive monitoring or filtering unmatched list", and displays the extracted "NIDS policy attribute policyID list" in the unmatched NIDS policy ID display area 92. Similarly, the security policy interlinking unit 113 extracts the "packet filtering policy attribute policyID list" (see FIG. 61) corresponding to the selected category in the unmatched category display area 91 from the "insufficient monitoring or filtering unmatched list" or the "excessive monitoring or filtering unmatched list", and displays the extracted "packet filtering policy attribute policyID list" in the unmatched packet filtering ID display area 93. Therefore, the attributes policyID are displayed in the unmatched NIDS policy ID display area 92 and the unmatched packet filtering ID display area 93. In the example shown in FIG. 63, since the selected category, i.e., HTTP, corresponds to insufficient monitoring or filtering, the "NIDS policy attribute policyID list" and the "packet filtering policy attribute policyID list" corresponding to HTTP are extracted from the "insufficient monitoring or filtering unmatched list", and displayed respectively in the unmatched NIDS policy ID display area 92 and the unmatched packet filtering ID display area 93. Attributes policyID displayed in the unmatched NIDS policy ID display area 92 and the unmatched packet filtering ID display area 93 are selected by the mouse and output to the security policy interlinking unit 113.

The security policy interlinking unit 113 displays Policy identified by attribute policyID selected in the unmatched NIDS policy ID display area 92, among the Policies described in the general-purpose security policy derived from NIDS, in the NIDS policy display area 94. The security policy interlinking unit 113 receives not only the analyzed result shown in FIG. 57, but also the general-purpose security policy itself from the security policy analyzer 105. Therefore, the security policy interlinking unit 113 can display the Policies described in the general-purpose security policy in the NIDS policy display area 94. Likewise, the security policy interlinking unit 113 displays Policy identified by attribute policyID selected in the unmatched packet filtering policy ID display area 93, among the Policies described in the general-purpose security policy derived from a packet filtering security device, in the packet filtering policy display area 95.

The security policy interlinking unit 113 may not only display Policies in the NIDS policy display area 94 and the packet filtering policy display area 95, but also be supplied with corrective actions for the Policies displayed in the areas 94, 95. Specifically, if Policies displayed in the NIDS policy display area 94 and the packet filtering policy display area 95 are edited by the security manager, then the general-purpose security policies may be corrected according to the editing details. For example, if Policies displayed in the NIDS policy display area 94 are edited by the security manager, then the general-purpose security policy derived from NIDS may be corrected according to the editing details. Similarly, if Policies displayed in the packet filtering policy display area 95 are edited by the security manager, then the general-purpose security policy derived from the packet filtering security device may be corrected according to the editing details. With this arrangement, the security manager can manually eliminate an unmatch in the image shown in FIG. 63.

If an unmatch is detected, the security policy interlinking unit 113 may automatically correct the unmatch, and re-set a corrected general-purpose security policy for a security device. For example, the security policy interlinking unit 113 may correct a general-purpose security policy. In one example, the security policy interlinking unit 113 may collectively correct a NIDS policy depending on a packet filtering policy. In this case, all signatures belonging to a category of NIDS which corresponds to packets that are permitted to pass by a packet filtering policy may be validated, and all signatures belonging to a category of NIDS which corresponds to packets that are inhibited from passing by a packet filtering policy may be invalidated. Settings of NIDS may then be changed based on the general-purpose security polity after the signatures have been corrected.

Figure 64:
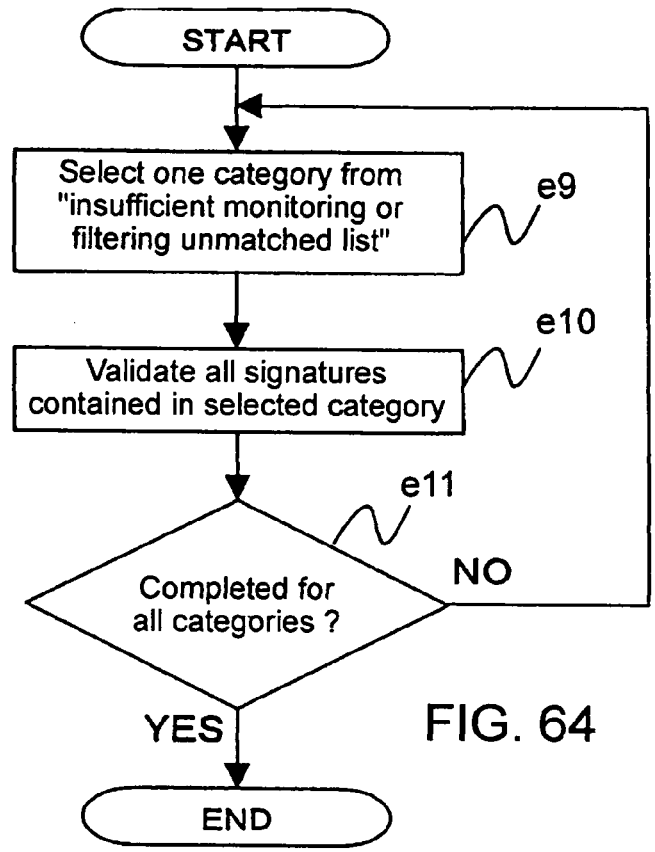
FIG. 64 is a flowchart illustrating a process for collectively correcting an NIDS policy depending on a packet filtering policy.
Figure 65:
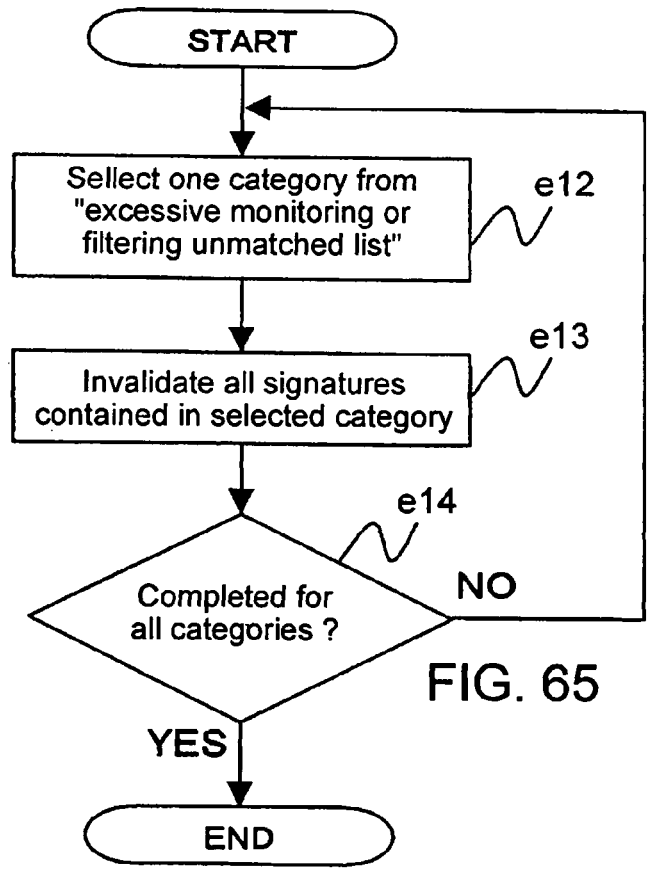
FIG. 65 is a flowchart illustrating a process for collectively correcting an NIDS policy depending on a packet filtering policy.

FIGS. 64 and 65 show processes for collectively correcting a NIDS policy depending on a packet filtering policy. FIG. 64 shows a process of correcting an unmatch in a category stored in the "insufficient monitoring or filtering unmatched list". For correcting an unmatch in a category stored in the "insufficient monitoring or filtering unmatched list", the security policy interlinking unit 113 selects one of the categories stored in the "insufficient monitoring or filtering unmatched list" in step e9. Then, in step e10, the security policy interlinking unit 113 validates all the signatures contained in the selected category. In step e10, the security policy interlinking unit 113 searches for Policy corresponding to the category selected in step e9 from the Policies described in the general-purpose security policy derived from NIDS. In the searching process, the security policy interlinking unit 113 may select a combination of Protocol, SrcPort, and DestPort in step e9 and search for Policy whose described details are the same as the combination. The security policy interlinking unit 113 may correct the description of Enabled into true in all Policies that have been searched. Then, in step e11, the security policy interlinking unit 113 determines whether all categories stored in the "insufficient monitoring or filtering unmatched list" have been selected or not. If all the categories have been selected, then the correcting process is put to an end. If there is a category which has not yet been selected, then control goes back to step e9, repeating the processing from step e9.

FIG. 65 shows a process of correcting an unmatch in a category stored in the "excessive monitoring or filtering unmatched list". For correcting an unmatch in a category stored in the "excessive monitoring or filtering unmatched list", the security policy interlinking unit 113 selects one of the categories stored in the "excessive monitoring or filtering unmatched list" in step e12. Then, in step e13, the security policy interlinking unit 113 invalidates all the signatures contained in the selected category. In step e13, the security policy interlinking unit 113 searches for Policy corresponding to the category selected in step e12 from the Policies described in the general-purpose security policy derived from NIDS. In the searching process, the security policy interlinking unit 113 113 may select a combination of Protocol, SrcPort, and DestPort in step e12 and search for Policy whose described details are the same as the combination. The security policy interlinking unit 113 may correct the description of Enabled into false in all Policies that have been searched. Then, in step e14, the security policy interlinking unit 113 determines whether all categories stored in the "excessive monitoring or filtering unmatched list" have been selected or not. If all the categories have been selected, then the correcting process is put to an end. If there is a category which has not yet been selected, then control goes back to step e12, repeating the processing from step e12.

The automatic correcting processes shown in FIGS. 64 and 65 may be carried out after step e8, for example. For example, steps e9 to e11 may be carried out after step e8, and the processing from step e12 may be carried out if YES is selected in step e1.

The detection of an unmatch between an object described in MonitoredObject of a NIDS policy and a packet passage permission or inhibition setting in a packet filtering policy has been described above. For detecting an unmatch between a NIDS policy and a packet filtering policy, an unmatch between an action described in Response of a NIDS policy and a packet passage setting in a packet filtering policy may be detected.

The detection of an unmatch between an action described in Response of a NIDS policy and a packet passage setting in a packet filtering policy will be described below. There are various types of actions that are taken by NIDS if a packet agreeing with a signature is detected, and such actions vary from NIDS product to NIDS product. Typical examples of such actions include e-mail transmission and SNMP trap. The e-mail transmission is an action for transmitting e-mail to an indicated mail account to given an alert when a packet agreeing with a signature is detected. SNMP represents a standard protocol for managing network devices, and includes an SNMP agent that resides in an individual network device and collects information of the network device, and an SNMP manager for operating the SNMP agent and collecting and managing information collected by the SNMP agent. The SNMP trap refers to the transmission of information from the SNMP agent on its own to the SNMP manager. NIDS serves as the SNMP agent and sends an alert to the SNMP manager by the SNMP trap when a packet agreeing with a signature is detected.

As described above, actions that are made by NIDS when a packet agreeing with a signature is detected are described in the portion between the paired <Responses> tags in the general-purpose security policy. The paired <Responses> tags have <Response> tags representing respective actions, as child elements.

Figure 66:
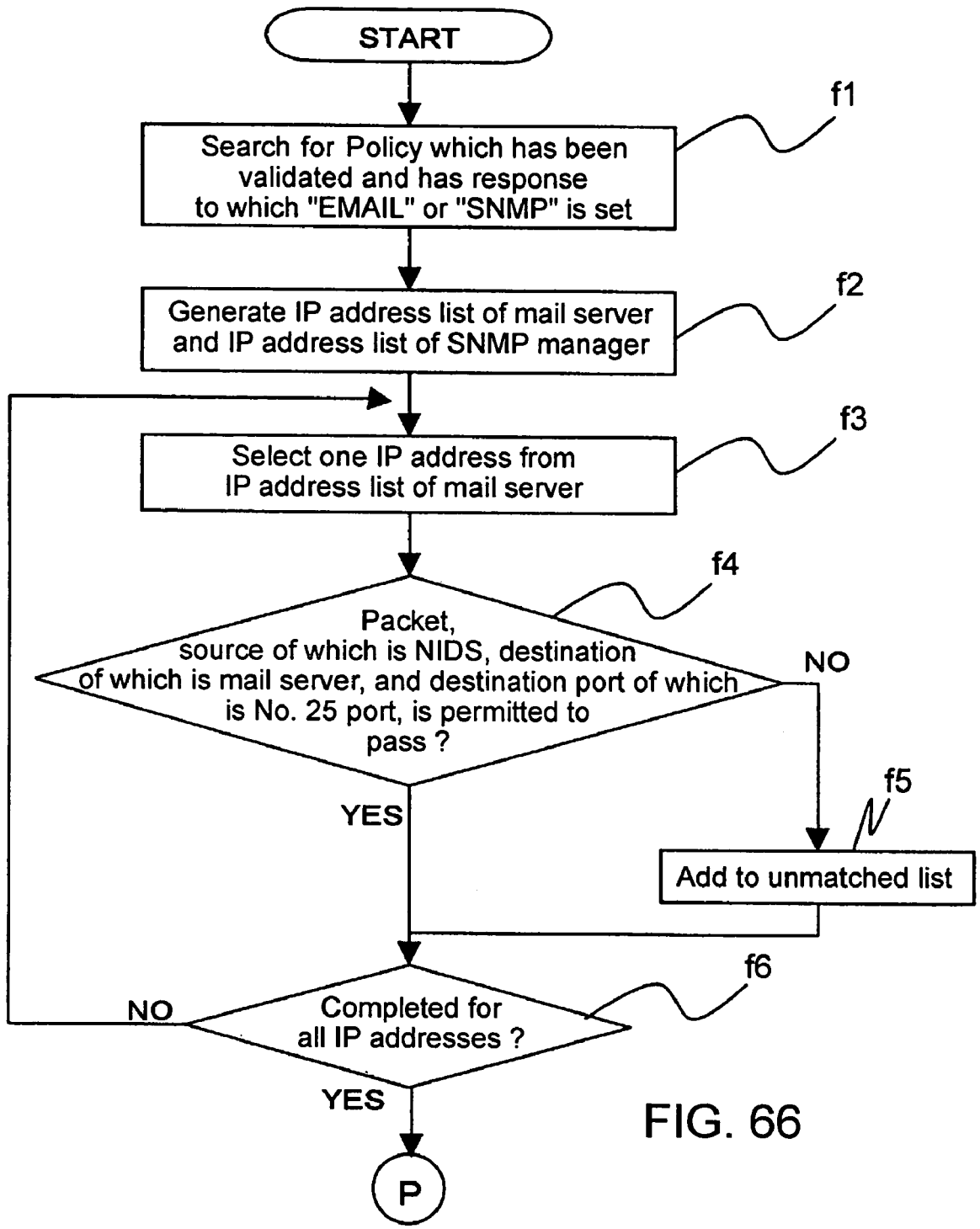
FIG. 66 is a flowchart illustrating a process for detecting an unmatch between an action based on an NIDS policy and a packet passage setting in a packet filtering policy.
Figure 67:
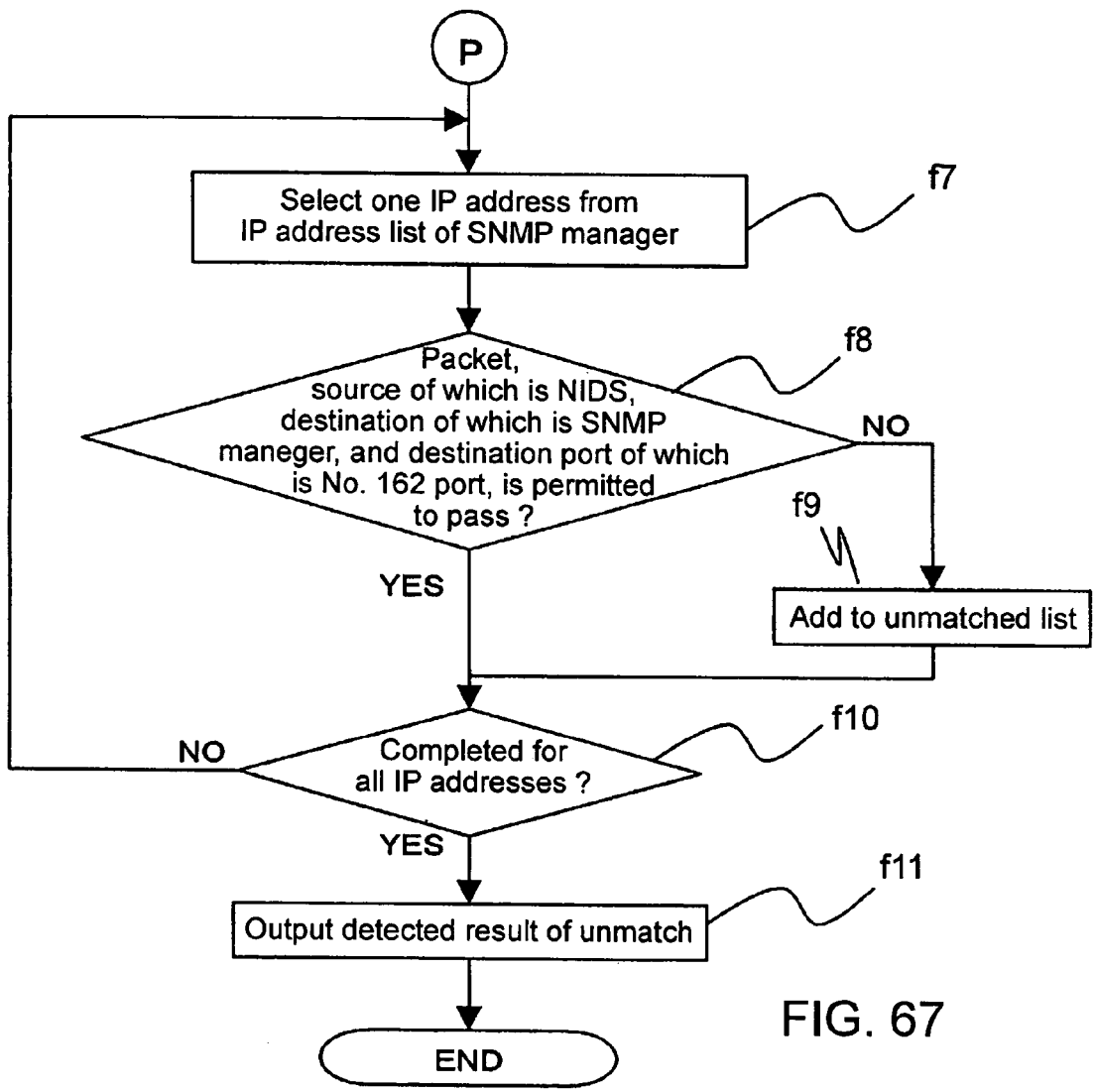
FIG. 67 is a flowchart illustrating the process for detecting an unmatch between an action based on an NIDS policy and a packet passage setting in a packet filtering policy.

FIGS. 66 and 67 show is a process for detecting an unmatch between an action based on an NIDS policy and a packet passage setting in a packet filtering policy according to the interlinking process, on the assumption that actions according to the NIDS policy are e-mail transmission and SNMP trap. It is assumed below that the security management system according to the present embodiment stores in advance the IP address of NIDS itself. For example, the security management system is supplied with the IP address of NIDS from the security manager through the I/O unit 110, and stores the IP address in a storage device (not shown in FIG. 50).

In step f1, the security policy interlinking unit 113 searches for Policy which has been validated and has "EMAIL" or "SNMP" indicated as an action when a packet agreeing with a signature is detected, from the analyzed result of the NIDS policy. Specifically, the security policy interlinking unit 113 searches for Policy whose description of Enabled is true and which includes <Response> tags having "EMAIL" as child elements or <Response> tags having "SNMP" as child elements in the portion between the paired <Responses> tags.

After step f1, if the Policy which has been searched for contains the description of a <Response> tag having "EMAIL" as a child element, then the security policy interlinking unit 113 reads the IP addresses of mail servers from the description of "Gateway" which is a grandchild element of the <Response> tag. In step f2, the security policy interlinking unit 113 generates a list of IP addresses of mail servers read from the Policy containing the description of a <Response> tag having "EMAIL" as a child element. An e-mail is sent to the mail servers when a packet agreeing with a signature is detected. If the description of a <Response> tag having "SNMP" as a child element is contained in the Policy which has been searched for, then the security policy interlinking unit 113 reads the IP addresses of SNMP mangers from the description of "Manager" which is a grandchild element of the <Response> tag. The security policy interlinking unit 113 generates a list of IP addresses of SNMP managers read from the Policy containing the description of a <Response> tag having "SNMP" as a child element.

Then, in step f3, the security policy interlinking unit 113 selects an IP address from the list of IP addresses of mail servers generated in step f2. In step f4, the security policy interlinking unit 113 determines whether packets in which the IP address of NIDS is the source IP address, the IP address of the selected mail server is the destination IP address, and the destination port number is 25 that is the port number used for e-mail transmission, are permitted to pass or not based on the general-purpose security policy derived from the packet filtering security device. If the packets are inhibited from passing, then the security policy interlinking unit 113 acquires, in step f4, an attribute PolicyID of Policy which is indicative of the inhibition of passage of packets in which the IP address of NIPS is the source IP address, the IP address of the selected mail server is the destination IP address, and the destination port number is 25. If the packets are permitted to pass in step f4, then control goes to step f6, and if the packets are inhibited from passing in step f4, then control goes to step f5.

In step f5, the security policy interlinking unit 113 adds the attribute PolicyID of Policy which describes the IP address of the mail server selected in step f3 to the unmatch list. At this time, the security policy interlinking unit 113 also adds the attribute PolicyID acquired in step f4, in association with the attribute PolicyID of Policy which describes the IP address of the mail server, to the unmatch list. After step f5, control goes to step f6.

In step f6, the security policy interlinking unit 113 determines whether all the IP addresses included in the list of IP addresses of mail servers generated in step f2 have been selected or not. If there is an IP address not yet selected, then control goes back to step f3, repeating the processing from step f3. If all the IP addresses included in the list of IP addresses of mail servers have been selected, then control goes to step f7 (see FIG. 67).

In step f7, the security policy interlinking unit 113 then selects an IP address from the list of IP addresses of SNMP managers generated in step f2. In step f8, the security policy interlinking unit 113 determines whether packets in which the IP address of NIDS is the source IP address, the IP address of the selected SNMP manager is the destination IP address, and the destination port number is 162 that is the port number used for SNMP trap, are permitted to pass or not based on the general-purpose security policy derived from the packet filtering security device. If the packets are inhibited from passing, then the security policy interlinking unit 113 acquires, in step f8, an attribute PolicyID of Policy which is indicative of the inhibition of passage of packets in which the IP address of NIDS is the source IP address, the IP address of the selected SNMP manager is the destination IP address, and the destination port number is 162. If the packets are permitted to pass in step f8, then control goes to step f10, and if the packets are inhibited from passing in step f8, then control goes to step f9.

In step f9, the security policy interlinking unit 113 adds the attribute PolicyID of Policy which describes the IP address of the SNMP manager selected in step f7 to the unmatch list. At this time, the security policy interlinking unit 113 also adds the attribute PolicyID acquired in step f8, in association with the attribute PolicyID of Policy which describes the IP address of the SNMP manager, to the unmatch list. After step f9, control goes to step f10.

In step f10, the security policy interlinking unit 113 determines whether all the IP addresses included in the list of IP addresses of SNMP managers generated in step f2 have been selected or not. If there is an IP address not yet selected, then control goes back to step f7, repeating the processing from step f3. If all the IP addresses included in the IP address list of the mail server have been selected, then control goes to step f11 in which the security policy interlinking unit 113 outputs the detected unmatch using the unmatch lists generated in steps f5, f9.

A specific example of the detection of an unmatch between an action according to the NIDS policy and a packet passage setting according to the packet filtering policy will be described below. FIG. 68 shows an example of a general-purpose security policy derived from a packet filtering security device. In the example shown in FIG. 68, in the second Policy, the source IP address is in the range from 200.100.100.0 to 200.100.100.255, the destination IP address is 200.100.200.100, and packets having a destination port number of 25 are inhibited from passing.

FIG. 69 shows an example of an analyzed result produced by analyzing an NIDS policy. In the example shown in FIG. 69, the description of Enabled is true, validating the monitoring of events. A <Response> tag having "EMAIL" as a child element is described, and its grandchild element "Gateway" is given as "200.100.200.100". That is, the analyzed result indicates that when a packet agreeing with a signature is detected, an e-mail is sent to a mail server having an IP address "200.100.200.100".

It is assumed that the IP addresses of NIDS stored in advance by the security policy management system range from 200.100.100.0 to 200.100.100.255. At this time, though the NIDS policy indicates that NIDS sends e-mails to mail servers, packets are inhibited from passing by packet filtering. That is, an alert sent by an e-mail from NIDS cannot pass due to packet filtering as if no alert issued actually. In this case, the security policy interlinking unit 113 adds the attribute policyID (packetMonitoringO188 in the example shown in FIG. 69) of Policy of the NIDS policy and the attribute policyID (packet_filtering 501 in the example shown in FIG. 68) of Policy which is indicative of the inhibition of passage of packets to the unmatch list, and outputs the detected unmatch. In the example shown in FIG. 68, the attribute policyID of Policy which is indicative of the inhibition of passage of packets is packet_filtering501. In the example shown in FIG. 69, the attribute policyID of Policy of the NIDS policy is packetMonitoring0188.

Figure 70:
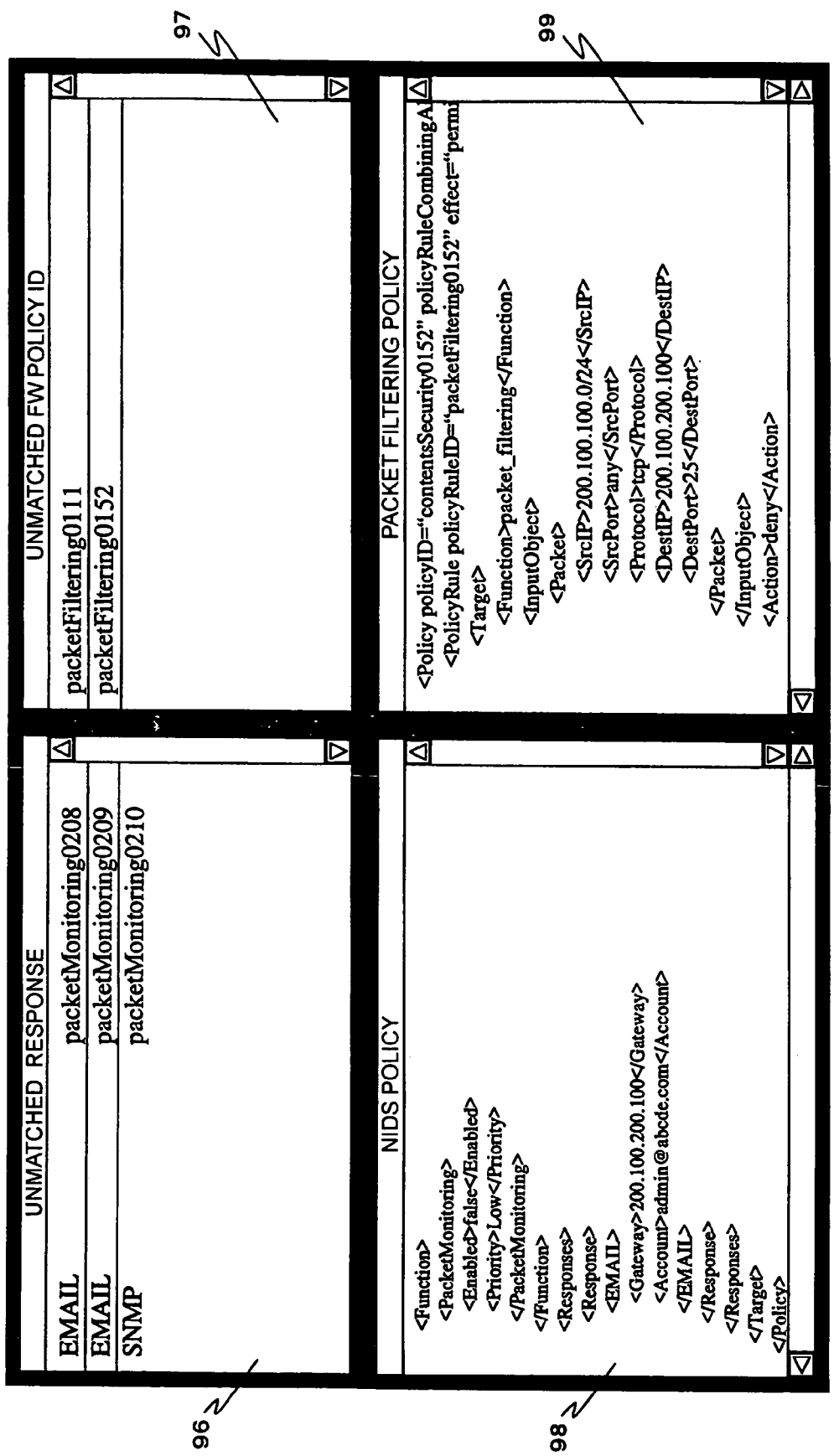
FIG. 70 is a view showing an example of an output image of a detected unmatch between an action based on an NIDS policy and a packet passage setting in a packet filtering policy.

FIG. 70 shows an example of an output image of a detected unmatch between an action described in Response of an NIDS policy and a packet passage setting in a packet filtering policy. The output image shown in FIG. 70 includes an unmatched NIDS policy ID display area 96, an unmatched packet filtering ID display area 97, a NIDS policy display area 98, and a packet filtering policy display area 99.

The security policy interlinking unit 113 displays an attribute policyID acquired from the analyzed result of the NIDS policy, among the attribute policyID added to the unmatch list in step f5 or step f9, in the unmatched NIDS policy ID display area 96. The attribute policyID acquired from the analyzed result of the NIDS policy is the attribute policyID of Policy which describes the IP address selected in step f3 or the step f7. The attribute policyID displayed in the unmatched NIDS policy ID display area 96 is selected by the mouse, for example, and outputted to the security policy interlinking unit 113. In FIG. 70, packetMonitoring0209 is selected in the unmatched NIDS policy ID display area 96.

The security policy interlinking unit 113 displays Policy identified by the attribute policyID selected in the unmatched NIDS policy ID display area 96, among Policies described in the general-purpose security policy derived from NIDS, in the NIDS policy display area 98. As described above, the security policy interlinking unit 113 receives not only the analyzed result, but also the general-purpose security policy itself from the security policy analyzer 105. Therefore, the security policy interlinking unit 113 can display the Policies described in the general-purpose security policy in NIDS policy display area 98.

When an attribute policyID is selected in the unmatched NIDS policy ID display area 96, the security policy interlinking unit 113 displays an attribute policyID which corresponds to the selected attribute policyID in the unmatched packet filtering ID display area 97. The attribute policyID displayed in the unmatched packet filtering ID display area 97 is selected by the mouse, for example, and outputted to the security policy interlinking unit 113. In FIG. 70, packetFiltering0152 is selected in the unmatched packet filtering ID display area 97.

The security policy interlinking unit 113 displays Policy identified by the attribute policyID selected in the unmatched packet filtering ID display area 97, among Policies described in the general-purpose security policy derived from the packet filtering security device, in the packet filtering policy display area 99.

The output image of the detected unmatch shown in FIG. 70 allows the security manager to easily grasp an unmatch between the packet filtering policy and the NIDS policy.

As with the image shown in FIG. 63, the security policy interlinking unit 113 may not only display Policies in the NIDS policy display area 98 and the packet filtering policy display area 99, but also be supplied with corrective actions for the Policies displayed in the areas 98, 99. Specifically, if Policies displayed in the NIDS policy display area 98 and the packet filtering policy display area 99 are edited by the security manager, then the general-purpose security policies may be corrected according to the editing details. With this arrangement, the security manager can manually eliminate an unmatch in the image shown in FIG. 70.

If an unmatch is detected, the security policy interlinking unit 113 may automatically correct the unmatch and reset a corrected general-purpose security policy for a security device. For example, the security policy interlinking unit 113 corrects a general-purpose security policy The security policy management system according to the fifth embodiment, which has been described above, generates general-purpose security policies not depending the types of security devices from setting information having expressions inherent in the security devices, and then performs an interlinking process on the general-purpose security policies. In the interlinking process, the security policies are interlinked using the relationship between objects and attributes thereof described in the general-purpose security policies (or analyzed results thereof). Therefore, settings of security devices having different security functions can be interlinked without concern over the differences between the security functions and the formats of setting descriptions inherent in the security devices. Furthermore, a setting failure that cannot be detected by individually analyzing general-purpose security policies rather than interlinking them can easily be detected.

The interlinking process is not limited to the detection of an unmatch. An example of the interlinking process other than the detection of an unmatch is the detection of a related policy. The detection of a related policy means that when one Policy is indicated, another Policy described with regard to an object described in the indicated Policy is detected. This process can be realized by listing Policies having descriptions of the same object in the process of detecting an unmatch. By detecting a related policy, it is possible to grasp Policy that is affected when details of a certain Policy are changed, without concern over the differences between security functions and the formats of setting descriptions inherent in security devices.

A process of automatically correcting a general-purpose security policy when an unmatch shown in FIG. 64 or 65 is also another example of the interlinking process. Still another example of the interlinking process is a dynamic policy changing. According to the dynamic policy changing, when a certain rule is applied, another rule is automatically changed, and the changed rule is applied. According to a specific example of the dynamic policy changing, if a false packet is detected by a NIDS policy while a network system including NIDS and a firewall is in operation, then details of a packet filtering policy which permits the packet to pass are changed to inhibit the packet from passing. This dynamic policy changing is effective to minimize damage subsequent to the detection of the false packet.

In step E3 (see FIG. 51), setting information is extracted and collected from a plurality of security devices. However, if there is a general-purpose security policy which has been generated in advance or an analyzed result of a general-purpose security policy, then setting information may be extracted and collected from at least one security device. The general-purpose security policy which has been generated in advance or the analyzed result may be stored in a storage device (not shown in FIG. 50). In step E7, the general-purpose security policy which has been generated in advance or the analyzed result may be read from the storage device, and the interlinking process may be performed thereon.

The preferred embodiments of the present invention have been described above. In each of the above embodiments of the present invention, the setting information extractor 101 corresponds to a setting information inputting means. The setting information extracting subroutine 102 corresponds to a setting information inputting subroutine. The output device included in the I/O unit 101 corresponds to an outputting means. The storage device (not shown in FIGS. 1, 15, 29, 34, and 50, see FIG. 73 described below) of the data processing apparatus 100 corresponds to a setting information inputting subroutine storage means, a security policy generating subroutine storage means, a security policy analyzing subroutine storage means, a comparing subroutine storage means, an integrating subroutine storage means, and an interlinking subroutine storage means.

In each of the above embodiments, a setting information extracting subroutine and a security policy generating subroutine are stored in association with security devices. The setting information extractor 101 and the general-purpose security policy generator 103 read corresponding subroutines and operate according to those subroutines with respect to each of the security devices. If a new security device is added, then a setting information extracting subroutine and a security policy generating subroutine which correspond to the new security device are additionally stored, allowing setting information to be extracted from the new security device and also allowing a general-purpose security policy to be generated depending on setting information of the new security device.

In each of the above embodiments, a security policy analyzing subroutine, a comparing subroutine, and an integrating subroutine are stored in association with security functions. The security policy analyzer 105, the security policy comparator 107, and the security policy integrator 111 read corresponding subroutines and operate according to those subroutines with respect to each of the security functions. If a new security function is added, a security policy analyzing subroutine, a comparing subroutine, and an integrating subroutine which correspond to the new security function are additionally stored, allowing the new security function to be analyzed, allowing analyzed results to be compared, and allowing analyzed results to be integrated.

Similarly, according to the fifth embodiment, an interlinking subroutine is stored in association with a combination of security functions. The security policy interlinking unit 113 reads a corresponding subroutine and operates according to the subroutine with respect to each combination of security devices. If a new security device is added, then an interlinking subroutine corresponding to a combination of security functions including the security function of the new security device is additionally stored, allowing an interlinking process to be performed on the combination of security functions including the security function of the new security device.

Figure 71:
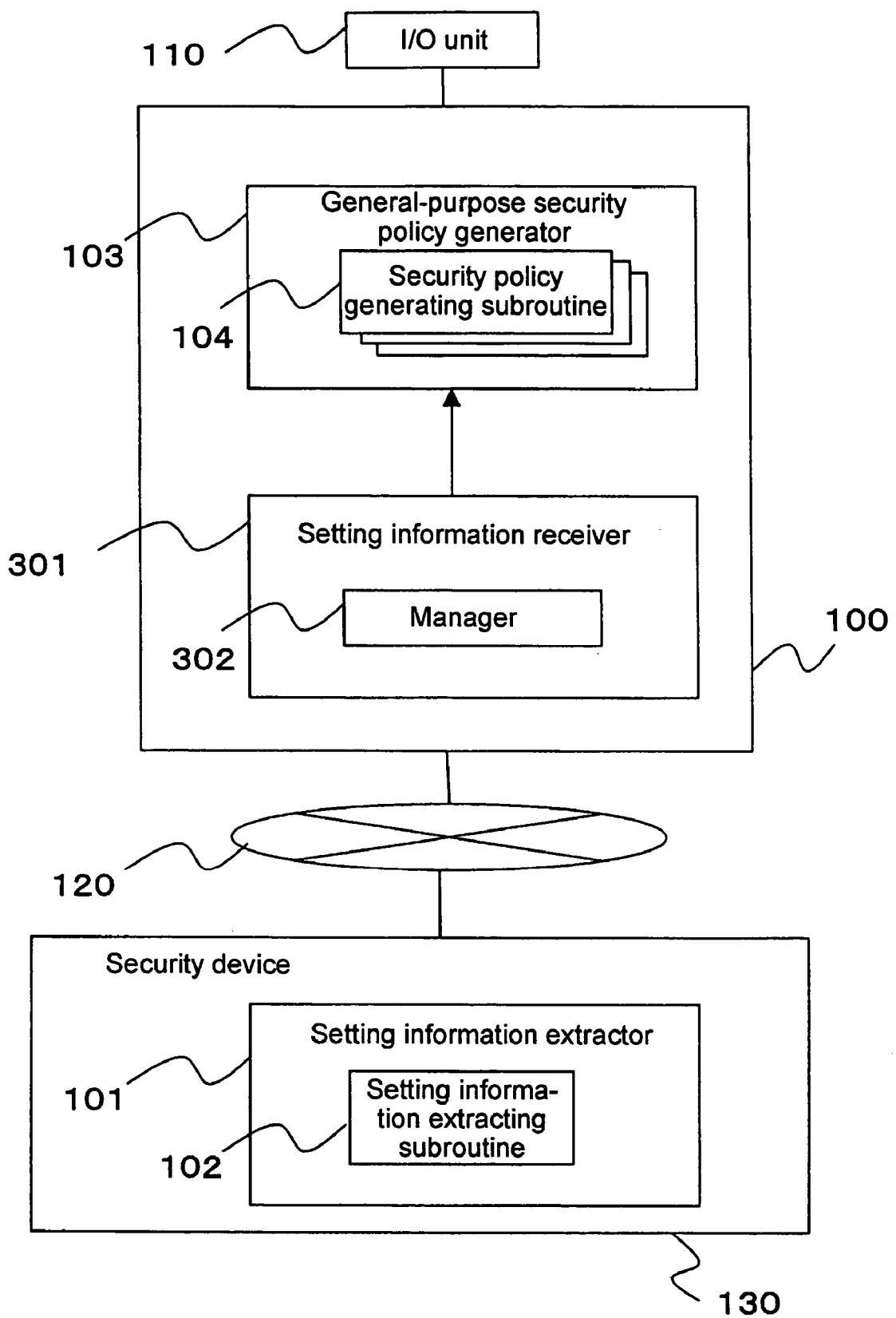
FIG. 71 is a block diagram illustrating a security policy management system with a security device which stores setting information in advance.

In the first to fifth embodiments, the data processing apparatus 100 has the setting information extractor 101, which extracts and collects setting information from the security devices 130. However, each of the security devices 130 may have the setting information extractor 101, which extracts and collects setting information from the security device 130 itself and sends the setting information to the data processing apparatus 100. FIG. 71 shows in block form such an arrangement. In FIG. 71, a security device 130 has a setting information extractor 101 which operates according to a setting information extracting subroutine 102. The setting information extracting subroutine 102 is stored as an agent in a storage device (not shown) of the security device 130, for example. The setting information extractor 101 calls the setting information extracting subroutine 102 from the storage device and operates according to the setting information extracting subroutine 102. The setting information extractor 101 is realized by a CPU that is provided in the security device 130.

A data processing apparatus 100 has software 302 for communicating with the security device 130, stored in advance in a storage device (not shown). The software 302 for communicating with the security device 130 is referred to as a manager. The data processing apparatus 100 has a setting information receiver 301 which operates according to the manager 302. The setting information receiver 301 is realized by a CPU, for example. The setting information receiver 301 requests the security device 130 to send setting information. In response to the request, the setting information extractor 101 calls the setting information extracting subroutine 102, and extracts setting information according to the setting information extracting subroutine 102. Then, the setting information extractor 101 sends the extracted setting information to the data processing apparatus 100. The setting information receiver 301 receives the setting information. The general-purpose security policy generator 103 of the data processing apparatus 100 may operate according to the processing from step A3 (or step B3, step C4, step D4, or step E4) using the setting information. In FIG. 71, the security policy analyzer 105, the security policy comparator 107, the security policy integrator 111, and the security policy interlinking unit 113 are not shown. However, the data processing apparatus 100 shown in FIG. 71 may have the security policy analyzer 105, the security policy comparator 107, the security policy integrator 111, and the security policy interlinking unit 113. In this case, the setting information extractor 101 of the security device 130 corresponds to a setting information sending means, and the setting information receiver 301 corresponds to a setting information inputting means.

In the first to fifth embodiments, setting information may be input through the I/O unit 110. The system administrator may generate a file having the same details as the setting information which the security device has, through a cut-and-paste process. The data processing apparatus 100 may be supplied with the file, i.e., the setting information, through the I/O unit 110. The general-purpose security policy generator may operate according to the processing from step A3 (or step B3, step C4, step D4, or step E4) using the setting information supplied through the I/O unit 110. In this case, the I/O unit 110 corresponds to a setting information inputting means.

Figure 72:
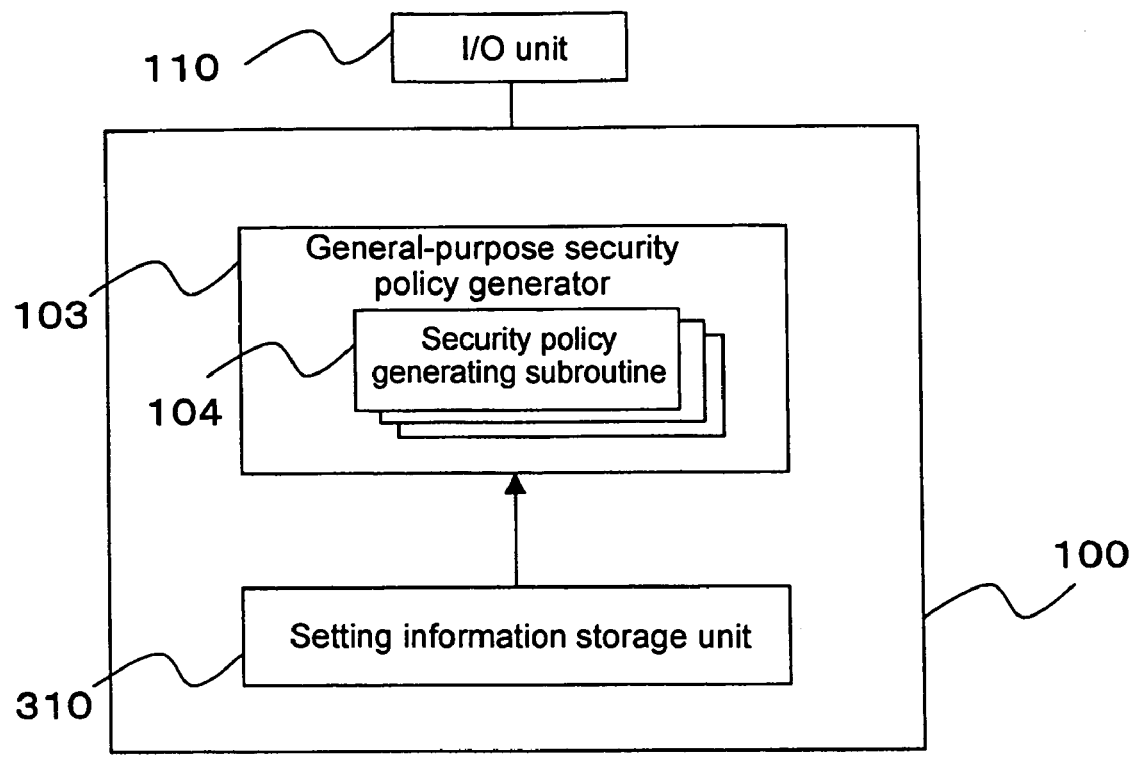
FIG. 72 is a block diagram illustrating a security policy management system with data processing apparatus which stores setting information in advance.

In the first to fifth embodiments, the data processing apparatus 100 may store in advance setting information of an external security device 130, and a general-purpose security policy may be generated based on the setting information stored in the data processing apparatus 100. FIG. 72 shows in block form an arrangement for the data processing apparatus 100 to store setting information in advance. In FIG. 72, a setting information storage unit 310 stores in advance setting information of an external security device 130. The general-purpose security policy generator 103 operates in the same manner as with the first to fifth embodiments. However, the general-purpose security policy generator 103 shown in FIG. 72 generates a general-purpose security policy using the setting information stored in the setting information storage unit 310. In FIG. 72, the security policy analyzer 105, the security policy comparator 107, the security policy integrator 111, and the security policy interlinking unit 113 are not shown. However, the data processing apparatus 100 shown in FIG. 72 may have the security policy analyzer 105, the security policy comparator 107, the security policy integrator 111, and the security policy interlinking unit 113.

With the arrangement shown in FIG. 72, since the setting information storage unit 310 stores setting information in advance, the data processing apparatus 100 may not have the setting information extractor 101 (see FIG. 1) or the setting information receiver 301 (see FIG. 71). The data processing apparatus 100 shown in FIG. 72 may have the setting information extractor 101 or the setting information receiver 301, and the setting information extracted by the setting information extractor 101 (or the setting information received by the setting information receiver 301 or the setting information input from the I/O unit 110) may be stored in the setting information storage unit 310. The general-purpose security policy generator 103 may generate a general-purpose security policy using the setting information stored in the setting information storage unit 310.

Figure 73:
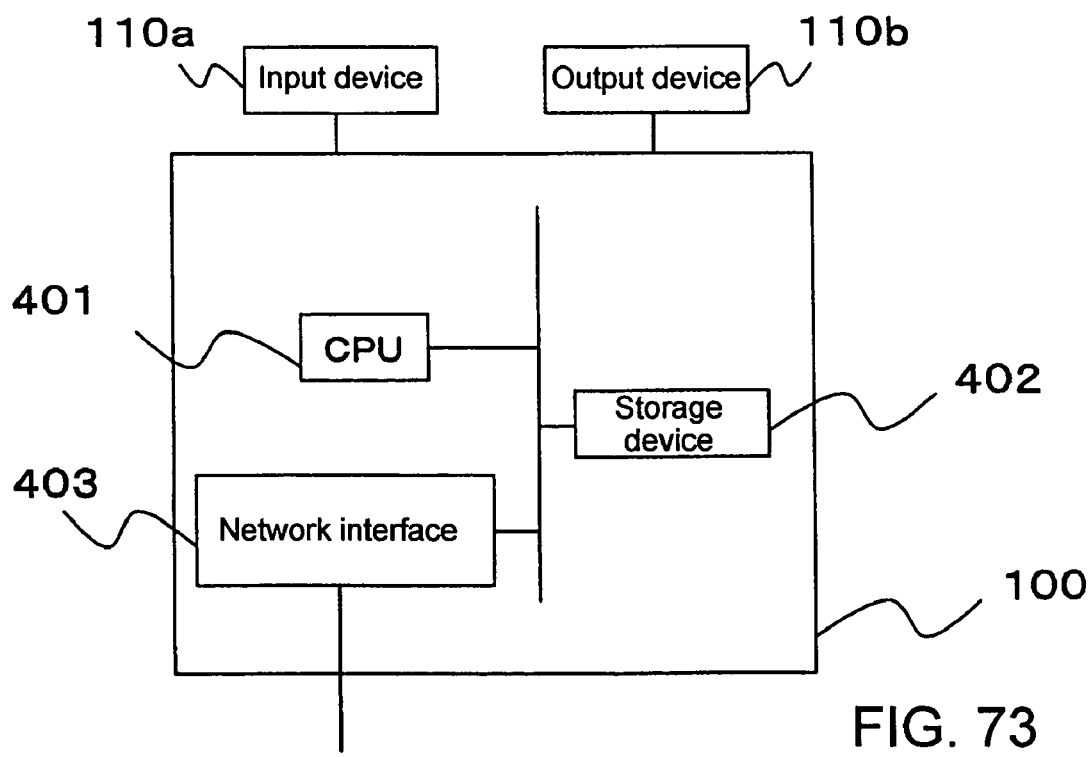
FIG. 73 is a block diagram illustrating an example of a specific arrangement of a security policy management system according to the present invention.

FIG. 73 shows in block form a specific arrangement of a security policy management system according to the present invention. In FIG. 73, an input device 110a such as a keyboard, a mouse, etc., and an output device 110b such as a display device or the like are connected to a data processing apparatus 100. The data processing apparatus 100 has a CPU 401, a storage device 402, and a network interface 403. The storage device 40 stores the setting information extracting subroutine 102 and the security policy generating subroutine 104. According to the second embodiment, the storage device 402 also stores the security policy analyzing subroutine 106. According to the third embodiment, the storage device 402 also stores the comparing subroutine 108. According to the fourth embodiment, the storage device 402 stores the integrating subroutine 112 instead of the comparing subroutine 108 in the third embodiment. According to the fifth embodiment, the storage device 402 stores the interlinking subroutine 114 instead of the comparing subroutine 108 in the third embodiment. The CPU 401 reads various subroutines from the storage device 402, and operates according to the subroutines. As a result, the CPU 401 operates as the setting information extractor 101 and the general-purpose security policy generator 103. According to the second embodiment, the CPU 401 also operates as the security policy analyzer 105. According to the third embodiment, the CPU 401 also operates as the security policy comparator 107. According to the fourth embodiment, the CPU 401 also operates as the security policy integrator 111. According to the fifth embodiment, the CPU 401 also operates as the security policy interlinking unit 113. The network interface 403 interfaces with the communication network 120. The CPU 401 extracts setting information from the security device through the network interface 403.

The security policy management system according to the present invention may be realized by recording a program which performs its functions in a computer-readable recording medium that can be read by a computer, reading the recorded program into a computer which is to serve as the security policy management system, and having the computer run the program. The computer-readable recording medium may be a recording medium such as a flexible disk, a magneto-optical disk, a CD-ROM, or the like, or a storage device such as a hard disk drive incorporated in a computer system or the like. The program may be read into the computer through a network such as the Internet. The scope of the present invention includes a program product comprising such a program.

While preferred embodiments of the present invention have been described using specific terms, such description is for illustrative purposes only, and it is to be understood that changes and variations may be made without departing from the spirit or scope of the following claims.

What is claimed is:

1. A security policy management system comprising:
a processor, configured to operate the security policy management system;
setting information storage means for storing setting information representing settings with regard to security functions of devices included in a network system to be managed; and
general-purpose security policy generating means for generating a security policy including a description expressed in a format independent of descriptions depending on particular devices, based on the setting information stored in said setting information storage means,
wherein the general-purpose security policy generating means describes a content of each item in a model obtained by modeling an operation of a device having a security function to generate the security policy, the model being represented as a set of items which are described in the security policy,
wherein the content of each item in the model is derived from an expression which is included in the setting information stored in the setting information storage means, by using knowledge with regard to descriptive specification for the setting information stored in the setting information storage means, and
wherein, when the setting information to an item for which a default value has been prescribed is omitted, the default value is used to describe the security policy with regard to the item for which the default value has been prescribed.

2. The system according to claim 1, further comprising:
setting information inputting means for inputting said setting information and storing said setting information in said setting information storage means.

3. The system according to claim 2, further comprising:
setting information inputting subroutine storage means for storing a setting information inputting subroutine for inputting said setting information, with regard to each of said devices;
wherein said setting information inputting means reads the setting information inputting subroutine corresponding to each of the devices from which the setting information is to be collected, and inputs said setting information according to the read setting information inputting subroutine.

4. The system according to claim 2, further comprising:
a device from which setting information is to be collected;
said device including setting information sending means for extracting setting information of the device and sending the extracted setting information to said setting information inputting means.

5. The system according to claim 2, further comprising:
security policy generating subroutine storage means for storing, with regard to each of said devices, a security policy generating subroutine for generating a security policy including a description expressed in a format independent of descriptions depending on particular devices;
wherein said general-purpose security policy generating means reads the security policy generating subroutine corresponding to a device holding said setting information from said security policy generating subroutine storage means based on the setting information inputted by said setting information inputting means, and generates said security policy according to said security policy generating subroutine.

6. The system according to claim 1, further comprising:
an analytical knowledge database for storing information used to analyze details of the security policy generated by said general-purpose security policy generating means; and
security policy analyzing means for analyzing details of the security policy generated based on said setting information, using the information stored in said analytical knowledge database.

7. The system according to claim 6, further comprising:
security policy analyzing subroutine storage means for storing, with regard to each of the security functions, a security policy analyzing subroutine for analyzing details of the security policy generated by said general-purpose security policy generating means;
wherein said security policy analyzing means reads said security policy analyzing subroutine for each of security functions from said security policy analyzing subroutine storage means, and analyzes details of the security policy generated by said general-purpose security policy generating means according to said security policy analyzing subroutine.

8. The system according to claim 7, wherein said security policy analyzing subroutine storage means stores a security policy analyzing subroutine for identifying information of a source of a packet and information of a destination of a packet, which information permits the packets to pass, as a security policy analyzing subroutine corresponding to a packet filtering function, based on information of a source of a packet, information of a destination of a packet, protocol information, and information as to whether packets are to pass or not, said information being described in the security policy; and
wherein said security policy analyzing means identifies information of a source of a packet and information of a destination of a packet, which information permits the packets to pass, according to said security policy analyzing subroutine.

9. The system according to claim 8, further comprising:
output means for outputting the analyzed result generated by said security policy analyzing means;
wherein said security policy analyzing means controls said output means to display a diagram representing the information of the source of the packet and the information of the destination of the packet, which information permits the packets to pass, in a two-dimensional area having a horizontal axis representing either values which can be taken by the information of the source of the packet or values which can be taken by the information of the destination of the packet, and a vertical axis representing the other values.

10. The system according to claim 8, further comprising:
output means for outputting the analyzed result generated by said security policy analyzing means;
wherein said security policy analyzing means controls said output means to display a diagram in an area defined by a first axis representing values which can be taken by the information of the source of the packet and a second axis representing values which can be taken by the information of the destination of the packet, said diagram representing, on the first axis, the information of the source of the packet, which information permits the packets to pass and representing, on the second axis, the information of the destination of the packet, which information permits the packets to pass.

11. The system according to claim 6, further comprising:
security policy comparing means for, when said security policy analyzing means generates a plurality of analyzed results of security policies with regard to one security function, comparing said analyzed results and identifying a difference between the security policies of respective devices which are analyzed by said security policy analyzing means.

12. The system according to claim 11, further comprising:
comparing subroutine storage means for storing, with regard to each of security functions, a comparing subroutine for comparing the analyzed results generated by said security policy analyzing means;
wherein said security policy comparing means reads said comparing subroutine for each of the security functions from said comparing subroutine storage means, and compares said analyzed results and identifies a difference between the security policies of respective devices which are analyzed by said security policy analyzing means, according to said comparing subroutine.

13. The system according to claim 6, further comprising:
analyzed result storage means for storing in advance an analyzed result of a security policy with regard to a security function; and
security policy comparing means for, when said security policy analyzing means generates at least one analyzed result of a security policy, comparing the analyzed result stored in said analyzed result storage means and the analyzed result generated by said security policy analyzing means with each other.

14. The system according to claim 6, further comprising:
security policy integrating means for, when said security policy analyzing means generates a plurality of analyzed results of security policies with regard to the same type of security function, further analyzing said analyzed results and deriving an analyzed result for entire security policies.

15. The system according to claim 14, further comprising:
integrating subroutine storage means for storing, with regard to each of the security functions, an integrating subroutine for further analyzing the analyzed results;
wherein said security policy integrating means reads the integrating subroutine for each of the security functions from said integrating subroutine storage means, further analyzes said analyzed results and derives an analyzed result for entire security policies according to the integrating subroutine.

16. The system according to claim 14, wherein said security policy integrating means further analyzes the respective analyzed results of security policies generated based on setting information of a plurality of devices for performing packet filtering, and identifies packets which are permitted to pass through said devices.

17. The system according to claim 6, further comprising:
analyzed result storage means for storing in advance an analyzed result of a security policy with regard to a security function; and
security policy integrating means for, when said security policy analyzing means generates at least one analyzed result of a security policy, analyzing the analyzed result stored in said analyzed result storage means and the analyzed result generated by said security policy analyzing means, and deriving an analyzed result for entire security policies.

18. The system according to claim 6, further comprising:
security policy interlinking means for referring to security policies generated based on setting information of a plurality of devices having different security functions or analyzed results of said security policies, and relating the security policies generated based on the setting information of said devices to each other.

19. The system according to claim 18, further comprising:
interlinking subroutine storage means for storing, with regard to each combination of the different security functions, an interlinking subroutine for relating the security policies generated based on the setting information of a plurality of devices having different security functions to each other;
wherein said security policy interlinking means reads the interlinking subroutine for each combination of the different security functions from said interlinking subroutine storage means, and relates said security policies to each other according to said interlinking subroutine.

20. The system according to claim 18, wherein said interlinking subroutine storage means identifies an unmatch between the security policies generated based on the setting information of a plurality of devices having different security functions.

21. The system according to claim 1, wherein generating the security policy includes the steps of:
obtaining the model;
defining objects and actions on the model; and
describing rules included in the setting information of one of the device as attributes to the objects and the actions.

22. A security policy management system comprising:
a processor, configured to operate the security policy management system;
setting information inputting means for inputting setting information representing settings with regard to security functions of devices included in a network system to be managed; and
general-purpose security policy generating means for generating a security policy including a description expressed in a format independent of descriptions depending on particular devices, based on the setting information inputted by said setting information inputting means, wherein the general-purpose security policy generating means describes a content of each item in a model obtained by modeling an operation of a device having a security function to generate the security policy, the model being represented as a set of items which are described in the security policy, wherein the content of each item in the model is derived from an expression which is included in the setting information stored in the setting information storage means, by using knowledge with regard to descriptive specification for the setting information stored in the setting information storage means, and wherein, when the setting information to an item for which a default value has been prescribed is omitted, the default value is used to describe the security policy with regard to the item for which the default value has been prescribed.

23. The system according to claim 22, further comprising:

setting information inputting subroutine storage means for storing a setting information inputting subroutine for inputting said setting information, with regard to each of said devices;

wherein said setting information inputting means reads the setting information inputting subroutine corresponding to each of the devices from which the setting information is to be collected, and inputs said setting information according to the read setting information inputting subroutine.

24. The system according to claim 22, further comprising:

a device from which setting information is to be collected;

said device including setting information sending means for extracting setting information of the device and sending the extracted setting information to said setting information inputting means.

25. The system according to claim 22, further comprising:

security policy generating subroutine storage means for storing, with regard to each of said devices, a security policy generating subroutine for generating a security policy including a description expressed in a format independent of descriptions depending on particular devices;

wherein said general-purpose security policy generating means reads the security policy generating subroutine corresponding to a device holding said setting information from said security policy generating subroutine storage means based on the setting information inputted by said setting information inputting means, and generates said security policy according to said security policy generating subroutine.

26. The system according to claim 22, further comprising:

an analytical knowledge database for storing information used to analyze details of the security policy generated by said general-purpose security policy generating means; and security policy analyzing means for analyzing details of the security policy generated based on said setting information, using the information stored in said analytical knowledge database.

27. The system according to claim 26, further comprising:

security policy analyzing subroutine storage means for storing, with regard to each of the security functions, a security policy analyzing subroutine for analyzing details of the security policy generated by said general-purpose security policy generating means;

wherein said security policy analyzing means reads said security policy analyzing subroutine for each of security functions from said security policy analyzing subroutine storage means, and analyzes details of the security policy generated by said general-purpose security policy generating means according to said security policy analyzing subroutine.

28. The system according to claim 27, wherein said security policy analyzing subroutine storage means stores a security policy analyzing subroutine for identifying information of a source of a packet and information of a destination of a packet, which information permits the packets to pass, as a security policy analyzing subroutine corresponding to a packet filtering function, based on information of a source of a packet, information of a destination of a packet, protocol information, and information as to whether packets are to pass or not, said information being described in the security policy; and wherein said security policy analyzing means identifies information of a source of a packet and information of a destination of a packet, which information permits the packets to pass, according to said security policy analyzing subroutine.

29. The system according to claim 28, further comprising:

output means for outputting the analyzed result generated by said security policy analyzing means;

wherein said security policy analyzing means controls said output means to display a diagram representing the information of the source of the packet and the information of the destination of the packet, which information permits the packets to pass, in a two-dimensional area having a horizontal axis representing either values which can be taken by the information of the source of the packet or values which can be taken by the information of the destination of the packet, and a vertical axis representing the other values.

30. The system according to claim 28, further comprising:

output means for outputting the analyzed result generated by said security policy analyzing means;

wherein said security policy analyzing means controls said output means to display an image in an area defined by a first axis representing values which can be taken by the information of the source of the packet and a second axis representing values which can be taken by the information of the destination of the packet, said diagram representing, on the first axis, the information of the source of the packet, which information permits the packets to pass and representing, on the second axis, the information of the destination of the packet, which information permits the packets to pass.

31. The system according to claim 26, further comprising:

security policy comparing means for, when said security policy analyzing means generates a plurality of analyzed results of security policies with regard to one security function, comparing said analyzed results and identifying a difference between the security policies of respective devices which are analyzed by said security policy analyzing means.

32. The system according to claim 31, further comprising:

comparing subroutine storage means for storing, with regard to each of security functions, a comparing subroutine for comparing the analyzed results generated by said security policy analyzing means;

wherein said security policy comparing means reads said comparing subroutine for each of the security functions from said comparing subroutine storage means, and compares said analyzed results and identifies a difference between the security policies of respective devices which are analyzed by said security policy analyzing means, according to said comparing subroutine.

33. The system according to claim 26, further comprising:
analyzed result storage means for storing in advance an analyzed result of a security policy with regard to a security function; and
security policy comparing means for, when said security policy analyzing means generates at least one analyzed result of a security policy, comparing the analyzed result stored in said analyzed result storage means and the analyzed result generated by said security policy analyzing means with each other.

34. The system according to claim 26, further comprising:
security policy integrating means for, when said security policy analyzing means generates a plurality of analyzed results of security policies with regard to the same type of security function, further analyzing said analyzed results and deriving an analyzed result for entire security policies.

35. The system according to claim 34, further comprising:
integrating subroutine storage means for storing, with regard to each of the security functions, an integrating subroutine for further analyzing the analyzed results;
wherein said security policy integrating means reads the integrating subroutine for each of the security functions from said integrating subroutine storage means, further analyzes said analyzed results and derives an analyzed result for entire security policies according to the integrating subroutine.

36. The system according to claim 34, wherein said security policy integrating means further analyzes the respective analyzed results of security policies generated based on setting information of a plurality of devices for performing packet filtering, and identifies packets which are permitted to pass through said devices.

37. The system according to claim 26, further comprising:
analyzed result storage means for storing in advance an analyzed result of a security policy with regard to a security function; and
security policy integrating means for, when said security policy analyzing means generates at least one analyzed result of a security policy, analyzing the analyzed result stored in said analyzed result storage means and the analyzed result generated by said security policy analyzing means, and deriving an analyzed result for entire security policies.

38. The system according to claim 26, further comprising:
security policy interlinking means for referring to security policies generated based on setting information of a plurality of devices having different security functions or analyzed results of said security policies, and relating the security policies generated based on the setting information of said devices to each other.

39. The system according to claim 38, further comprising:
interlinking subroutine storage means for storing, with regard to each combination of the different security functions, an interlinking subroutine for relating the security policies generated based on the setting information of a plurality of devices having different security functions to each other;
wherein said security policy interlinking means reads the interlinking subroutine for each combination of the different security functions from said interlinking subroutine storage means, and relates said security policies to each other according to said interlinking subroutine.

40. The system according to claim 38, wherein said interlinking subroutine storage means identifies an unmatch between the security policies generated based on the setting information of a plurality of devices having different security functions.

41. The system according to claim 22, wherein generating the security policy includes the steps of:
obtaining the model;
defining objects and actions on the model; and
describing rules included in the setting information of one of the device as attributes to the objects and the actions.

42. A method of managing a security policy, comprising the steps of:
storing setting information representing settings with regard to security functions of devices included in a network system to be managed in a setting information storage unit; and
generating a security policy including a description expressed in a format independent of descriptions depending on particular devices, by describing a content of each item in a model based on the stored setting information with a general-purpose security policy generating unit, the model being obtained by modeling an operation of a device having a security function, and the model being represented as a set of items which are described in the security policy,
wherein the content of each item in the model is derived from expression which is included in the setting information, by using knowledge with regard to descriptive specification for the setting information, and
wherein, when the setting information to an item for which a default value has been prescribed is omitted, the default value is used to describe the security policy with regard to the item for which the default value has been prescribed.

43. The method according to claim 42, wherein generating the security policy includes the steps of:
obtaining the model;
defining objects and actions on the model; and
describing rules included in the setting information of one of the device as attributes to the objects and the actions.

44. A method of managing a security policy, comprising the steps of:
inputting setting information representing settings with regard to security functions of devices included in a network system to be managed into setting information storage unit; and
generating a security policy including a description expressed in a format independent of descriptions depending on particular devices, by describing a content of each item in a model based on the inputted setting information with a general-purpose security policy generating unit, the model being obtained by modeling an operation of a device having a security function, and the model being represented as a set of items which are described in the security policy,
wherein the content of each item in the model is derived from expression which is included in the setting information, by using knowledge with regard to descriptive specification for the setting information, and
wherein, when the setting information to an item for which a default value has been prescribed is omitted, the default value is used to describe the security policy with regard to the item for which the default value has been prescribed.

45. The method according to claim 44, wherein generating the security policy includes the steps of:

obtaining the model;

defining objects and actions on the model; and describing rules included in the setting information of one of the device as attributes to the objects and the actions.

46. A computer-readable medium having a program product for enabling a computer to execute a process comprising the steps of:

storing setting information representing settings with regard to security functions of devices included in a network system to be managed; and generating a security policy including a description expressed in a format independent of descriptions depending on particular devices, by describing a content of each item in a model based on the stored setting information, the model being obtained by modeling an operation of a device having a security function, and the model being represented as a set of items which are described in the security policy, wherein the content of each item in the model is derived from an expression which is included in the setting information, by using knowledge with regard to descriptive specification for the setting information, and wherein, when the setting information to an item for which a default value has been prescribed is omitted, the default value is used to describe the security policy with regard to the item for which the default value has been prescribed.

47. The computer-readable medium according to claim 46, wherein generating the security policy includes the steps of:

obtaining the model;

defining objects and actions on the model; and describing rules included in the setting information of one of the devices as attributes to the objects and the actions.

48. A computer-readable medium having a program product for enabling a computer to execute a process comprising the steps of:

inputting setting information representing settings with regard to security functions of devices included in a network system to be managed; and generating a security policy including a description expressed in a format independent of descriptions depending on particular devices, by describing a content of each item in a model based on the inputted setting information, the model being obtained by modeling an operation of a device having a security function, and the model being represented as a set of items which are described in the security policy, wherein the content of each item in the model is derived from an expression which is included in the setting information, by using knowledge with regard to descriptive specification for the setting information, and wherein, when the setting information to an item for which a default value has been prescribed is omitted, the default value is used to describe the security policy with regard to the item for which the default value has been prescribed.

49. The computer-readable medium according to claim 48, wherein generating the security policy includes the steps of:

obtaining the model;

defining objects and actions on the model; and describing rules included in the setting information of one of the devices as attributes to the objects and the actions.

* * * * *